US008969509B2

(12) United States Patent
Liu et al.

(10) Patent No.: US 8,969,509 B2
(45) Date of Patent: Mar. 3, 2015

(54) SIGNAL AMPLIFIED BIOLOGICAL DETECTION WITH CONJUGATED POLYMERS

(75) Inventors: Bin Liu, Singapore (SG); Chun Wang, Singapore (SG); Ruoyu Zhan, Singapore (SG); Glenn P. Bartholomew, San Diego, CA (US); Janice W. Hong, San Diego, CA (US); Jean M. Wheeler, San Diego, CA (US); Brent S. Gaylord, San Diego, CA (US)

(73) Assignee: Sirigen, Inc., San Diego, CA (US)

( * ) Notice: Subject to any disclaimer, the term of this patent is extended or adjusted under 35 U.S.C. 154(b) by 446 days.

(21) Appl. No.: 13/378,989

(22) PCT Filed: Jun. 25, 2010

(86) PCT No.: PCT/US2010/040051
§ 371 (c)(1),
(2), (4) Date: May 14, 2012

(87) PCT Pub. No.: WO2010/151807
PCT Pub. Date: Dec. 29, 2010

(65) Prior Publication Data
US 2012/0252986 A1    Oct. 4, 2012

Related U.S. Application Data
(60) Provisional application No. 61/269,685, filed on Jun. 26, 2009.

(51) Int. Cl.
C08G 67/02    (2006.01)
C08G 67/00    (2006.01)
(52) U.S. Cl.
USPC .......................................... 528/392; 528/425

(58) Field of Classification Search
CPC ........................................................ C08G 61/00
USPC .................................................. 528/392, 425
See application file for complete search history.

(56) References Cited

U.S. PATENT DOCUMENTS

| 4,486,530 | A | 12/1984 | David et al. |
| 5,143,854 | A | 9/1992 | Pirrung et al. |
| 5,288,514 | A | 2/1994 | Ellman |

(Continued)

FOREIGN PATENT DOCUMENTS

| CA | 2365814 | 6/2003 |
| EP | 1281744 A3 | 2/2003 |

(Continued)

OTHER PUBLICATIONS

Mikroyannidis et al; Novel electroluminescent—and its precursor; John Wiley & Sons, inc.; 2007; Chem abstract 146: 462600.*

(Continued)

*Primary Examiner* — Duc Truong
(74) *Attorney, Agent, or Firm* — Wilson, Sonsini, Goodrich & Rosati

(57) ABSTRACT

The devices and method are provided for detecting labeled and label-free analytes, such as nucleic acids and proteins, employing conjugated cationic, anionic and neutral polymers. The analytes can be immobilized on a solid support material. The solid support material can be disposed in the pre-fabricated patterns on a substrate. The chemical structures of the polymers employed by the various embodiments of the present invention are described herein.

21 Claims, 26 Drawing Sheets

(56) References Cited

U.S. PATENT DOCUMENTS

| | | | |
|---|---|---|---|
| 5,384,261 | A | 1/1995 | Winkler et al. |
| 5,424,186 | A | 6/1995 | Fodor et al. |
| 5,677,195 | A | 10/1997 | Winkler |
| 5,807,974 | A | 9/1998 | Kim |
| 5,990,479 | A | 11/1999 | Weiss et al. |
| 6,263,286 | B1 | 7/2001 | Gilmanshin et al. |
| 6,280,933 | B1 | 8/2001 | Glazer et al. |
| 6,350,431 | B1 | 2/2002 | Snow et al. |
| 6,951,682 | B1 | 10/2005 | Zebala |
| 6,998,241 | B2 | 2/2006 | Boga |
| 7,141,437 | B2 | 11/2006 | Dvornic et al. |
| 7,144,950 | B2 | 12/2006 | Bazan et al. |
| 7,208,122 | B2 | 4/2007 | Swager et al. |
| 7,214,489 | B2 | 5/2007 | Bazan |
| 7,241,512 | B2 | 7/2007 | Li et al. |
| 7,282,514 | B1 | 10/2007 | Belfield et al. |
| 7,666,594 | B2 | 2/2010 | Bazan |
| 8,158,444 | B2 | 4/2012 | Gaylord et al. |
| 2003/0087311 | A1 | 5/2003 | Wolf |
| 2004/0009506 | A1 | 1/2004 | Stephan et al. |
| 2004/0023248 | A1 | 2/2004 | O'Malley |
| 2004/0023317 | A1 | 2/2004 | Motamedi et al. |
| 2004/0142344 | A1 | 7/2004 | Bazan et al. |
| 2004/0219556 | A1 | 11/2004 | Bazan et al. |
| 2005/0003386 | A1 | 1/2005 | Bazan et al. |
| 2005/0059168 | A1 | 3/2005 | Bazan et al. |
| 2005/0196775 | A1 | 9/2005 | Swager et al. |
| 2006/0073607 | A1 | 4/2006 | Rose et al. |
| 2006/0127929 | A1 | 6/2006 | Swager et al. |
| 2006/0175193 | A1 | 8/2006 | Inganas et al. |
| 2006/0183140 | A1 | 8/2006 | Bazan et al. |
| 2006/0204984 | A1 | 9/2006 | Bazan et al. |
| 2006/0216734 | A1 | 9/2006 | Bazan et al. |
| 2006/0216759 | A1 | 9/2006 | Naasani |
| 2007/0178470 | A1 | 8/2007 | Bissonnette |
| 2007/0281289 | A1 | 12/2007 | Moon |
| 2008/0038751 | A1 | 2/2008 | Asberg et al. |
| 2008/0293164 | A1 | 11/2008 | Gaylord |
| 2011/0256549 | A1 | 10/2011 | Bartholomew et al. |
| 2011/0256550 | A1 | 10/2011 | Bartholomew et al. |
| 2011/0257374 | A1 | 10/2011 | Bartholomew et al. |
| 2012/0028828 | A1 | 2/2012 | Gaylord et al. |
| 2012/0029155 | A1 | 2/2012 | Gaylord et al. |

FOREIGN PATENT DOCUMENTS

| | | |
|---|---|---|
| EP | 708837 B1 | 3/2006 |
| EP | 1279023 B1 | 2/2007 |
| JP | 2006-510389 | 3/2006 |
| WO | WO 90-15070 | 12/1990 |
| WO | WO-92-10092 A1 | 6/1992 |
| WO | WO 93-09668 A1 | 5/1993 |
| WO | WO-93-10507 A1 | 5/1993 |
| WO | WO-93-22684 A1 | 11/1993 |
| WO | WO-94-09169 A1 | 4/1994 |
| WO | WO-99-26299 A1 | 5/1999 |
| WO | WO-00-66790 A1 | 11/2000 |
| WO | WO-02-079268 A2 | 10/2002 |
| WO | WO-02-081735 A2 | 10/2002 |
| WO | WO-02-081735 A3 | 4/2003 |
| WO | WO-02-079268 A3 | 8/2003 |
| WO | WO-2004-037886 | 5/2004 |
| WO | WO-2006-034081 A2 | 3/2006 |
| WO | WO-2006-034081 A3 | 5/2006 |
| WO | WO-2008-100344 | 8/2008 |
| WO | WO-2006-092063 A1 | 9/2008 |
| WO | WO-2010-151807 A1 | 12/2010 |
| WO | WO-2011-091086 | 7/2011 |

OTHER PUBLICATIONS

Mikroyannidis et al; New highlgly luminescent—neutral precursors; John Wiley & Sons, Inc.; 2007, Chem Abstract 147: 10286.*
U.S. Appl. No. 07/624,120, filed Dec. 6, 1990, Fodor.
U.S. Appl. No. 60/642,901, filed Jan. 10, 2005, Bazan.
An et al., "A fluorescence ratiometric protein assay using light-harvesting conjugated polymers," Macromolecular Rapid Communications 27(13):993-997 (2006).
Ausebel et al., eds., Current Protocols in Molecular Biology, vols. I, II, and III. 1997.
Ausubel et al., eds., Short Protocols in Molecular Biology: A Compendium of Methods from Current Protocols in Molecular Biology, $5^{th}$ ed., John Wiley & Sons, Inc., 2002.
Bailey et al., "Masked Micheal Acceptors in Poly(phenyleneethynylene)s for Facile Conjugation," Macromolecules 39:2815-2818 (2006).
Bruchez et al., "Semiconductor nanocrystals as fluorescent biological labels," Science 281:2013-2016 (1998).
Chen et al., "Highly sensitive biological and chemical sensors based on reversible fluorescence quenching in a conjugated polymer," PNAS USA 96(220:12287-12292 (1999).
Delagrave et al., "Isolated mutants of cloned Aequorea victoria GFP that had red-shifted excitation spectra," Bio/Tech 13:151-154 (1995).
Fodor et al,, "Light-directed, spatially addressable parallel chemical synthesis," Science 251(4995):767-773 (1991).
Gaylord et al., "SNP detection using peptide nucleic acid probes and conjugated polymers: application in neurodegenerative disease identification," PNAS USA 102(1):34-39 (2005).
Gaylord et al., "DNA hybridization detection with water-soluble conjugated polymers and chromophore-labeled single-stranded DNA," J Am Chem Soc 124(4):896-900(2003).
Gaylord et al., "DNA detection using water-soluble conjugated polymers and peptide nucleic acid probes," PNAS USA 99(17):10954-10957 (2002).
Geierstanger and Wemmer, "Complexes of the minor groove of DNA," Annu Rev Biophys Biomol Struct 24:463-493 (1995).
Glumoff and Goldman, Nucleic Acids in Chemistry and Biology, $2^{nd}$ ed., Blackburn and Gait, eds., Oxford University Press, Oxford, 1996, pp. 375-441.
Heeger et al., "Making sense of polymer-based biosensors," PNAS USA 96(22):12219-12221 (1999).
Heim et al., "Improved green fluorescence," Nature 373:663-664 (1995).
Heim et al., "Wavelength mutations and post-translational autoxidation of green fluorescent protein," PNAS USA 91:12501-12504 (1994).
Ho et al., "Direct molecular detection of nucleic acids by fluorescence signal amplification," J Am Chem Soc 127(36):12673-12676 (2005).
Ho et al., "Colorimetric and fluorometric detection of nucleic acids using cationic polythiophene derivatives," Angewandte Chemie International Edition 41(9):1548-1551 (2002).
Innis et al., eds., PCR Protocols: A Guide to Methods and Applications, Elsevier Science & Technology Books 1990.
Invitrogen —Molecular Probes, available at www.probes.com, accessed Dec. 19, 2007.
Invitrogen —available at www.invitrogen.com, accessed Dec. 19, 2007.
Kanehisa, "Use of statistical criteria for screening potential homologies in nucleic acid sequences," Nucleic Acids Research 12(1 Pt 1):203-213 (1984).
Kreuzer et al., "LightCycler technology fo rthe quantitation of bcr/abl fusion transcripts," Cancer Research 59(13):3171-3174 (1999).
Kreyenschmidt et al., "A New Soluble poly(p-phenylene) with Tetrahydropryrene Repeating Units," Macromolecules 28:4577-4582 (1995).
Larson and Verdine, Bioorganic Chemistry: Nucleic Acids, Hecht ed., Oxford University Press: New York 1996 pp. 324-346.
Laurendeau et al., "TaqMan PCR-based gene dosage assay for predictive testing in individuals from a cancer family with INK4 locus haploinsufficiency," Clin Chem 45(7):982-986 (1999).
Laurendeau et al., "Quantitation of MYC gene expression in sporadic breast tumors with a real-time reverse transcription PCR assay," Cancer Res 59(12):2759-2765 (1999).
LeClerc, "Polyfluorenes: Twenty Years of Progress," Polym Sci Part A: Polym Chem 39:2867-2873 (2001).

(56) References Cited

OTHER PUBLICATIONS

Lee, Kangwon. "Functionalized Conjugated Polymers for Signal Amplifying Biosensors and Sensor Arrays." Dissertation, The Unviersity of Michigan, 2008.

Lee et al., "Synthesis and Characterization of Oligo(9,9-dihyexyl-2,7-fluorene ethynylene)s: For Application as Blue Light-Emitting Diode," Org Lett 3:2005-2007 (2001).

Liu et al., "Optimization of the molecular orbital energies of conjugated polymers for optical amplification of fluorescent sensors," J Am Chem Soc 128:1188-1196 (2006).

Liu et al., "Methods for strand-specific DNA detection with cationic conjugated polymers suitable for incorporation into DNA chips and microarrays," PNAS USA 102(3):589-593 (2005).

Liu et al., "Interpolyelectrolyte complexes of conjugated copolymers and DNA: platforms for multicolor biosensors," J Am Chem Soc 126(7):1942-1943 (2004).

Liu et al., Characterization of tectoRNA assembly with cationic conjugated polymers, J Am Chem Soc 126(13):4076-4077 (2004).

Liu et al., "Shape-adaptable water-soluble conjugated polymers," J Am Chem Soc 124(44):13306-13307 (2003).

Mikroyannidis et al., J Polym Sci Part A:Polym Chem 45:4661-4670 (2007).

Pei et al., "Efficient Photoluminescence and Electroluminescence from a Soluble Polyfluorene," J Am Chem Soc 118:7416-7417 (1996).

Pierce, Biotechnology, available at www.piercenet.com, accessed Dec. 19, 2007.

Sambrook et al., Molecular Cloning: A Laboratory Manual, 3rd ed., Cold Spring Harbor Laboratory Press, 2000.

Sekar et al., "Phycobiliproteins as a commodity: trends in applied research, patents and commercialization," J Appl Phycol 20:113-136 (2008).

Sonogashira et al., "A convenient synthesis of acetylenes: catalytic substitutions of acetylenic hydrogen with bromoalkenes, iodoarenes and bromopyridines,"Tetra Lett 16:4467-4470 (1975).

Wang et al., "Collective optical behavior of cationic water-soluble dendrimers," Advanced Materials 16(23-24):2127-2132 (2004).

Wang et al., "Fluorescein provides a resonance gate for FRET from conjugated polymers to DNA intercalated dyes," J Am Chem Soc 126(17):5446-5451 (2004).

Wang et al., "Optimally amplified RNA-protein detection methods using light-harvesting conjugated polymers," Advanced Materials 15(17):1425-1428 (2003).

Wang et al., "Biosensors from conjugated polyelectrolyte complexes," PNAS USA 99(1):49-53 (2002).

Wang, "From DNA biosensors to gene chips," Nucl Acids Res 28(16):3011-3016 (2000).

Wosnick et al., "Synthesis and application of poly(phenylen ethynylene)s for bioconjugation: a conjugated polymer-based fluorogenic proble for proteases," J Am Chm Soc 127:3400-3405 (2005).

Xu et al., "Magnetically assisted DNA assays: high selectivity using conjugated polymers for amplified fluorescent transduction," Nucl Acids Res 33(9):e83 (2005).

Yamamoto et al., "Preparation of π-Conjugated Poly(thiophene-2,5-diyl), Poly(p-phenylene), and Related Polymers Using Zerovalent Nickel Complexes. Linear Structure and Properties of the π-Conjugated Polymers," Macromolecules 25:1214-1223 (1992).

Zhou et al., "Polyfluorenes with phosphonate groups in the side chains as chemosensors and electroluminescent materials," Macromolecules 38:5416-5424 (2005).

PCT/US2011/21775 Search Rerport and Written Opinion dated May 19, 2011.

EP 07873316 Supplemental Search Report dated Aug. 3, 2010.

JP2009-531642 Office Action mailed dated Mar. 22, 2012.

PCT/US2010/40051 International Search Report dated Sep. 30, 2010.

* cited by examiner

SIGNAL AMPLIFIED BIOLOGICAL DETECTION WITH CONJUGATED POLYMERS

CROSS-REFERENCE TO RELATED APPLICATIONS

The present application is a U.S. National Stage Entry of PCT/US2010/040051, filed Jun. 25, 2010, which claims priority to U.S. Provisional Patent Application No. 61/269,685 filed Jun. 26, 2009; all of which are herein incorporated by reference in their entireties.

BACKGROUND OF THE INVENTION

The present invention relates to ultra sensitive detection methods for biomolecules. Methods for the detection of biomolecules such as nucleic acids, proteins and cellular markers are highly significant not only in identifying specific targets, but also in understanding their basic function. Hybridization probe technologies in particular continue to be one of the most essential elements in the study of gene-related biomolecules. They are useful for a variety of both commercial and scientific applications, including the identification of genetic mutations or single nucleotide polymorphisms (SNP's), medical diagnostics, gene delivery, assessment of gene expression, and drug discovery. Heterogeneous formats for performing such hybridization probe assays have become increasingly common and powerful with the advancement of gene chip and DNA microarray technologies. Such systems allow for high throughput screening of hundreds to thousands of genes in a single experiment. Homogenous formats commonly rely on the output of small molecule fluorescent dyes appended to hybridization probes to indicate the presence or absence of target analyte.

Conjugated polymers (CPs) are efficient light-gathering molecules with properties desirable for a variety of applications. Conjugated polymers can serve as light harvesting materials and signal transducers in fluorescent biosensor applications. These molecules can detect, transduce and/or amplify chemical, biological or physical information into optical and/or electrical signals. Conjugated polymers can provide the advantage of collective response relative to non-interacting small molecule reporters. This collective response influences optoelectronic properties, such as Forster resonance energy transfer (FRET), electrical conductivity and fluorescence efficiency, properties which can be used to report, or "transduce," target analyte presence.

Water solubility of CPs, a prerequisite for interrogating biological substrates, is usually achieved by charged groups attached to the CP backbone. To date, however, most of the available ionic conjugated polymers are polyanions containing sulfonate or carboxylate functionalities, or polycations containing quarternary amines. Non-charged or neutral groups appended to the CP backbone would be desirable in cases where it is important to reduce or control non-specific electrostatic interactions with biomolecules which typically contain a large number of charged functional groups (amino acids, phosphates, etc.).

Conjugated polymers frequently take the form of rigid-rod structures which have limited flexibility and consequently have a limited ability to adapt to particular three dimensional shapes, thus limiting their ability to conform to the shape of biologically-derived molecules. For example, proteins and nucleic acids, although also polymeric, do not typically form extended-rod structures but rather fold into higher-order three-dimensional shapes to which CPs cannot typically conform.

Majority of the currently available cationic water-soluble conjugated polymers have generally linear "rigid-rod" polymer backbones and therefore experience a limited twist angle between monomer units along the polymer main chain. A consequence of this torsional restriction is that the polymer has a "rigid rod" structure with limited conformations and ability to adapt to the secondary structures of bio-molecules. Additionally, when cationic conjugated polymers are used as light-harvesting molecules, they can deleteriously exhibit fluorescence self-quenching when they cluster near negatively charged biomolecules. Neutral biomolecule/probe conjugates would help address this issue by better isolating the chromophores.

There is a need in the art for novel CPs, for methods of making and using them, and for compositions and articles of manufacture comprising such compounds.

SUMMARY OF THE INVENTION

The present invention relates to the design of novel CP materials adapted for biological detection in a variety of formats including immunoassays (flow cytometry, immunohistochemisry, ELISA, lateral flow, protein arrays, etc.) and nucleic acid assays (arrays, PCR, FISH, etc.). These include the incorporation of covalent conjugation sites and revised modifications to improve water solubility and reduce non-specific assay interactions.

In some embodiments, a method for detecting nucleic acids with oligonucleotides attached to polystyrene (PS) beads and the application of conjugated polymers (CPs) as the signal reporter or signal amplifier is presented. The method provided by the present invention combines the micro-patterning of polystyrene beads in pre-fabricated microwells with conjugated polymers for label-free DNA detection. In addition, the developed method could also be used for labeled targets where the polymers are used to amplify the fluorescence signal from the label through fluorescence resonance energy transfer (FRET). The method of the present invention and products produced via this method will allow real-time detection of trace amount of nucleic acid, protein and other biomolecules with high sensitivity.

An objective of this invention is to develop an ultra sensitive detection method for DNA and other biomolecules. One of the key factors is to improve the specific detection sensitivity from the recognition event. In an array format this means increased signal output from the captured target (DNA, protein, analyte, etc.) and the reduced background signal. One embodiment of the present invention focuses on solving both problems simultaneously. First, patterned polystyrene beads were used instead of conventional planar microarrays. The patterned polystyrene beads provide high surface areas for immobilization of the probe DNA and therefore enable increased number of target binding to the capture DNA, which results in high signal output for both label-free and dye-labeled assays, upon addition of polymers. To reduce the background signal, new polymers have been designed that are compatible with the microarrays and have low cross talking between the excitation and emission wavelengths. In addition, these polymers are designed to match the excitation wavelength of the existing instruments.

The invention can be used to provide an ultra sensitive detection method for nucleic acid/protein detection. The detection limit of the present method is as low as $10^{-17}$ M of target DNA in the presence of a conjugated polymer (~300 copies). With this detection sensitivity, DNA can be detected without PCR amplification. Moreover, the analytes can be extended to other biomolecules, such as protein and peptide, etc.

Also provided in this invention is the adaptation of CP design to incorporate conjugation sites for direct covalent attachment of CPs to biomolecules such as proteins (antibodies, streptavidin, etc.), peptides and nucleic acids hybridization probes. Such modifications also enable the direct attachment to assay substrates and FRET acceptors. Multiple conjugation sites will allow for conjugation of multiple elements to the CP structure. This can be use to create polymer-biomolecule-dye tandem conjugates for multiplex or multicolor analysis.

Numerous examples exist which utilize non-specific interactions of CPs and biomolecules for detecting a biological recognition event (i.e. electrostatic interactions). Such methods are often indirect and control of unwanted interactions can be difficult. By conjugating directly to the biological probe the specificity of the assay is retained in the actual biological recognition event of interest, resulting in a more direct reporting event with the benefit of the collective optical properties of the CP. This further requires adaptation of the CP materials to ensure the polymers do not interact non-specifically with other components in the assay, allowing the specificity of the biomolecule to drive the interaction. New polymers were thus designed to improve solubility and reduce non-specific electrostatic interactions.

Presented are methods for conjugating CP materials to biomolecule probes for specific detection. The CP materials can act as direct fluorescent labels or as FRET donors in combination with a further appended label. The application of the CP conjugates is also presented in the context of specific immunoassay detection formats. Examples are provided with demonstrate the utilization of such conjugates in the detection of specific cell surface markers in flow cytometry or fluorescence activated cell sorting (FACS).

One embodiment of the present invention is directed to a polymer represented the following formula:

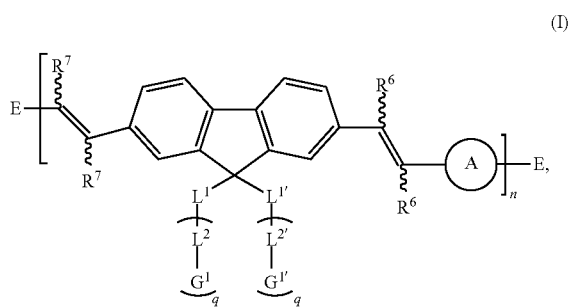

(I)

wherein:

E, for each occurrence, is independently selected from halogen, hydrogen, ethynyl, —$N_3$, vinylene group, a trialkylsiloxy or an aryl group optionally substituted with a reactive group or a pendent reactive group capable of undergoing chain extension, conjugation, or a crosslinking group;

A is an aryl or a heteroaryl, optionally substituted with one or more substituents selected from halogen, hydroxyl, C1-C12 alkyl, C2-C12 alkene, C2-C12 alkyne, C3-C12 cycloalkyl, C1-C12 haloalkyl, C1-C12 alkoxy, C6-C18 (hetero)aryloxy, C6-C18 (hetero)arylamino, a C6-C18 (hetero) aryl group and an ethylene glycol polymer; wherein the substituents for ring A are not ammonium group;

$L^1$, $L^{1'}$, $L^2$ and $L^{2'}$ are each independently a covalent bond, a C1-C12 alkylene, a C3-C12 cycloalkylene, a C2-C12 alkenylene, a C2-C12 alkynylene, a (C6-C18)aryl(C1-C12) alkylene, a (C6-C18)aryl(C2-C12)alkenylene, a (C6-C18) aryl(C1-C12)alkynylene, a C6-C18 arylene group, —$Y_1$—[O—$Y_2$]$_p$—, —O—$Y_1$—[O—$Y_2$]$_p$— wherein each C1-C12 alkylene, C3-C12 cycloalkylene, (C6-C18)aryl(C1-C12) alkylene, or C6-C18 arylene group is optionally substituted with one or more halogen, hydroxyl, C1-C12 alkyl, C2-C12 alkenyl, C2-C12 alkynyl group, C1-C12 alkoxy, C1-C12 haloalkyl, —$Y_1$—[O—$Y_2$]$_p$— or —O—$Y_1$—[O—$Y_2$]$_p$—;

q is 0 or an integer from 1 to 8;

p is 0 or an integer from 1 to 24;

$Y_1$ and $Y_2$ are each independently a covalent bond, or a C1-12 alkylene group, a C3-C12 cycloalkylene, a C6-C18 (hetero)arylene, a (C6-C18)aryl(C1-C12)alkylene, wherein each C1-12 alkylene group, a C3-C12 cycloalkylene, a C6-C18 (hetero)arylene, a (C6-C18)aryl(C1-C12)alkylene is optionally substituted with one or more halogen, hydroxyl, C1-C12 alkyl, C2-C12 alkenyl, C2-C12 alkynyl group, C1-C12 alkoxy, or C1-C12 haloalkyl;

each $R^6$ and $R^7$ is independently hydrogen, cyano, C1-C12 alkyl, C2-C12 alkene, C2-C12 alkyne, C3-C12 cycloalkyl or a C6-C18 (hetero)aryl group, wherein each C1-C12 alkyl, C2-C12 alkene, C2-C12 alkyne, C3-C12 cycloalkyl or a C6-C18 (hetero)aryl group is optionally substituted with one or more halogen, hydroxyl, C1-C12 alkyl, C2-C12 alkenyl, C2-C12 alkynyl group, C1-C12 alkoxy, C1-C12 haloalkyl, or C2-C12 (hetero)alkynl;

$G^1$ and $G^{1'}$ are each independently, hydrogen, C1-C6 alkyl, —OH, —COOH, —SH, —SR, —SHR$^+$, SR$_2^+$, —SO$_3^-$, —PO$_4^-$, Br, —NH$_2$, —NHR, —NR$_2$, —NH$_3^+$, —NH$_2$R$^+$, —NHR$_2^+$ or —NR$_3^+$, wherein and each R is independently a C1-C6 alkyl and —SHR$^+$, SR$_2^+$, —SO$_3^-$, —PO$_4^-$, —NH$_3^+$, —NH$_2$R$^+$, —NHR$_2^+$, —NR$_3^+$, ethynyl, or —N$_3$, each optionally has an associated counterion; and n is an integer from 1 to about 1,000.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
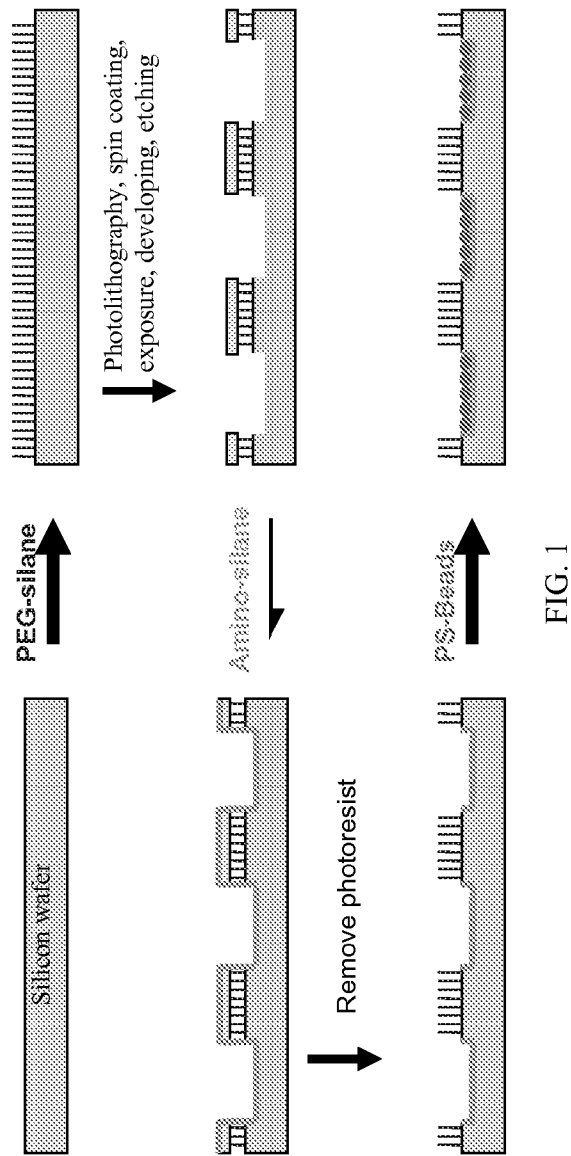
FIG. 1 is a scheme to pattern polystyrene beads on silicon wafer.

One embodiment of the present invention is directed a polymer represented by the formula (I) as described above.

In another embodiment, the polymer of the present invention is represented by the following formula:

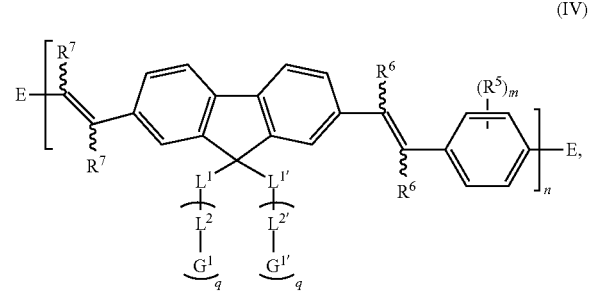

wherein:

each $R^5$ is independently a halogen, hydroxyl, C1-C12 alkyl, C2-C12 alkene, C2-C12 alkyne, C3-C12 cycloalkyl, C1-C12 haloalkyl, C1-C12 alkoxy, C6-C18 (hetero)aryloxy, C6-C18 (hetero)arylamino or a C6-C18 (hetero)aryl group, and wherein each C1-C12 alkyl, C2-C12 alkene, C2-C12 alkyne, C3-C12 cycloalkyl, C1-C12 haloalkyl, C1-C12 alkoxy, C6-C18 (hetero)aryloxy, C6-C18 (hetero)arylamino or a C6-C18 (hetero)aryl group is further optionally substituted with one or more one or more halogen, hydroxyl, C1-C12 alkyl, C2-C12 alkenyl, C2-C12 alkynyl group, C1-C12 alkoxy, or C1-C12 haloalkyl group;

m is 0 or an integer from 1 to 4;
and the remainder of the valuables are as described above for formula (I).

In another embodiment, the polymer of formula (I) comprises a repeat unit represented by the following formula:

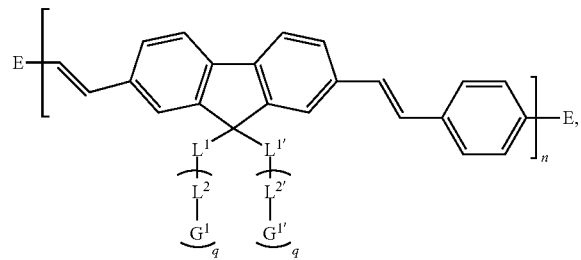

wherein the variables are as described above for formula (I). In some embodiments, $L^1$ and $L^{1'}$ are each independently a C1-C12 alkyl or $-Y_1-[O-Y_2]_p-$; $L^2$ and $L^{2'}$ are covalent bonds; $G^1$ and $G^{1'}$ are each independently $-Br$, $-NH_2$, $-NHR$, $-NR_2$, $-NH_3^+$, $-NH_2R^+$, $-NHR_2^+$ or $-NR_3^+$, wherein $-NH_3^+$, $-NH_2R^+$, $-NHR_2^+$ or $-NR_3^+$ each optionally has an associated counterion and each R is independently a C1-C6 alkyl. In other embodiments, $L^1$ and $L^{1'}$ are each independently C1-C6 alkyl or $-Y_1-[O-Y_2]_p-$, wherein $L^2$ and $L^{2'}$ are covalent bonds, $Y_1$ and $Y_2$ are each independently C1-C6 alkyl; and $G^1$ and $G^{1'}$ are both hydrogen, C1-C6 alkyl, $-OH$, $-COOH$, $-SH$, $-SR$, $-SHR^+$, $SR_2^+$, $-SO_3^-$, $-PO_4^-$, Br, $-NH_2$, $-NHR$, $-NR_2$, $-NH_3^+$, $-NH_2R^+$, $-NHR_2^+$ or $-NR_3^+$.

In another embodiment, the polymer of formula (I) comprises a repeat unit represented by the following formula:

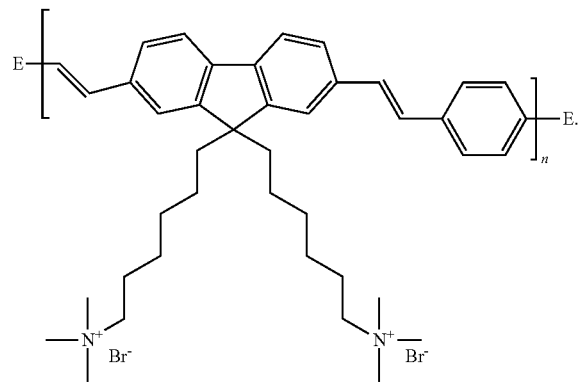

In one embodiment, for polymers represented by formulas (I) or (IV), two or more repeat units are covalently cross-linked via one or more $G^1$ and $G^{1'}$. For example, when $G^1$ or $G^{1'}$ is $-Br$, the $-Br$ groups in two or more repeat units can be cross-linked by reacting with an amine to form an ammonium group, such as a quaternary ammonium when a secondary amine is used.

In some embodiments for the polymers described herein, $G^1$ and $G^{1'}$, are each independently, $-SHR^+$, $SR_2^+$, $-NH_3^+$, $-NH_2R^+$, $-NHR_2^+$ or $-NR_3^+$. In other embodiments, $G^1$ and $G^{1'}$, are each independently, $-SHR^+$, $SR_2^+$, $-NH_3^+$, $-NH_2R^+$, $-NHR_2^+$ or $-NR_3^+$ with an associated counterion. In further embodiments, $G^1$ and $G^{1'}$, are each independently, $-NH_3^+$, $-NH_2R^+$, $-NHR_2^+$ or $-NR_3^+$.

In another embodiment, for polymer of formula (I) comprises a repeat unit represented by the following formula:

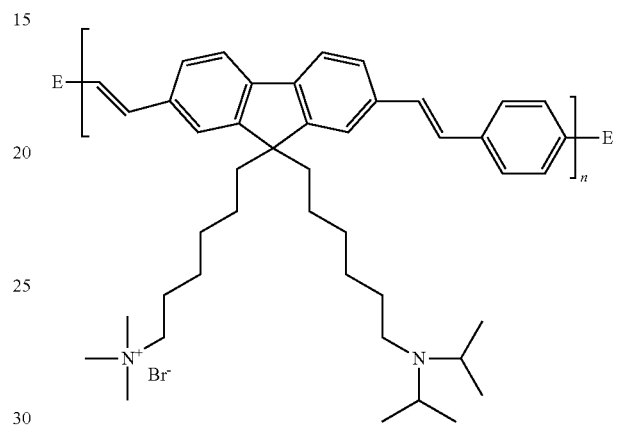

The polymer of the present invention can also be represented by formula (V):

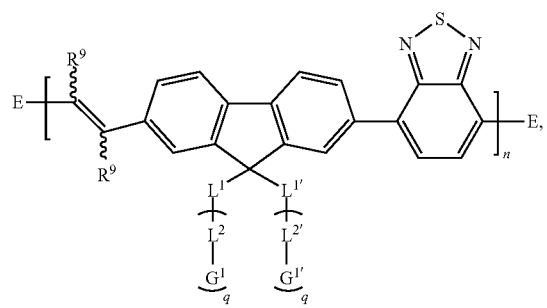

wherein:

E, for each occurrence, is independently halogen, hydrogen, vinylene group, ethynyl, $-N_3$, a trialkylsiloxy or an aryl group optionally substituted with a reactive group or a pendent reactive group capable of undergoing chain extension, conjugation, or crosslinking;

$L^1$, $L^{1'}$, $L^2$ and $L^{2'}$ are each independently a covalent bond, a C1-C12 alkylene, a C3-C12 cycloalkylene, a C2-C12 alkenylene, a C2-C12 alkynylene, a (C6-C18)aryl(C1-C12) alkylene, a (C6-C18)aryl(C2-C12)alkenylene, a (C6-C18) aryl(C1-C12)alkynylene, a C6-C18 arylene group, $-Y_1-[O-Y_2]_p-$, $-O-Y_1-[O-Y_2]_p-$ wherein each C1-C12 alkylene, C3-C12 cycloalkylene, (C6-C18)aryl(C1-C12) alkylene, or C6-C18 arylene group is optionally substituted with one or more halogen, hydroxyl, C1-C12 alkyl, C2-C12 alkenyl, C2-C12 alkynyl group, C1-C12 alkoxy, C1-C12 haloalkyl, $-Y_1-[O-Y_2]_p-$ or $-O-Y_1-[O-Y_2]_p-$;

q is 0 or an integer from 1 to 8;
p is 0 or an integer from 1 to 24;

$Y_1$ and $Y_2$ are each independently a covalent bond, or a C1-C12 alkylene group, a C3-C12 cycloalkylene, a C6-C18 (hetero)arylene, a (C6-C18)aryl(C1-C12)alkylene, wherein each C1-C12 alkylene group, a C3-C12 cycloalkylene, a C6-C18 (hetero)arylene, a (C6-C18)aryl(C1-C12)alkylene is optionally substituted with one or more halogen, hydroxyl, C1-C12 alkyl, C2-C12 alkenyl, C2-C12 alkynyl group, C1-C12 alkoxy, or C1-C12 haloalkyl;

each $R^9$ is, independently, hydrogen, cyano, C1-C12 alkyl, C2-C12 alkene, C2-C12 alkyne, C3-C12 cycloalkyl or a C6-C18 (hetero)aryl group, wherein each C1-C12 alkyl, C2-C12 alkene, C2-C12 alkyne, C3-C12 cycloalkyl or a C6-C18 (hetero)aryl group is optionally substituted with one or more halogen, hydroxyl, C1-C12 alkyl, C2-C12 alkenyl, C2-C12 alkynyl group, C1-C12 alkoxy, C1-C12 haloalkyl, or C2-C12 (hetero)alkynl;

each $G^1$ and $G^{1'}$ are, independently, ethynyl, —$N_3$, hydrogen, C1-C6 alkyl, —OH, —COOH, —SH, —SR, —$SHR^+$, $SR_2^+$, —$SO_3^-$, —$PO_4^-$, Br, —$NH_2$, —NHR, —$NR_2$, —$NH_3^+$, —$NH_2R^+$, —$NHR_2^+$ or —$NR_3^+$, wherein and each R is independently a C1-C6 alkyl and —$SHR^+$, $SR_2^+$, —$SO_3^-$, —$PO_4^-$, —$NH_3^+$, —$NH_2R^+$, —$NHR_2^+$ or —$NR_3^+$ each optionally has an associated counterion; and n is an integer from 1 to about 1,000.

In another embodiment, the polymer of formula (V) comprises a repeat unit represented by the following formula:

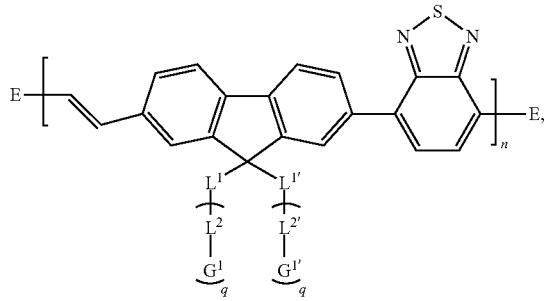

wherein the variables are as described above for formula (V). In some embodiments, $L^1$ and $L^{1'}$ are each independently a C1-C12 alkyl or —$Y_1$—[O—$Y_2$]$_p$—; $L^2$ and $L^{2'}$ are covalent bonds; $G^1$ and $G^{1'}$ are each independently —Br, —$NH_2$, —NHR, —$NR_2$, —$NH_3^+$, —$NH_2R^+$, —$NHR_2^+$ or —$NR_3^+$, wherein —$NH_3^+$, —$NH_2R^+$, —$NHR_2^+$ or —$NR_3^+$ each optionally has an associated counterion and each R is independently a C1-C6 alkyl. In other embodiments, $L^1$ and $L^{1'}$ are each independently C1-C6 alkyl or —$Y_1$—[O—$Y_2$]$_p$—, wherein $L^2$ and $L^{2'}$ are covalent bonds, $Y_1$ and $Y_2$ are each independently C1-C6 alkyl; and $G^1$ and $G^{1'}$ are both hydrogen, C1-C6 alkyl, —OH, —COOH, —SH, —SR, —$SHR^+$, $SR_2^+$, —$SO_3^-$, —$PO_4^-$, Br, —$NH_2$, —NHR, —$NR_2$, —$NH_3^+$, —$NH_2R^+$, —$NHR_2^+$ or —$NR_3^+$.

In another embodiment, the polymer of formula (V) comprises a repeat unit represented by the following formula:

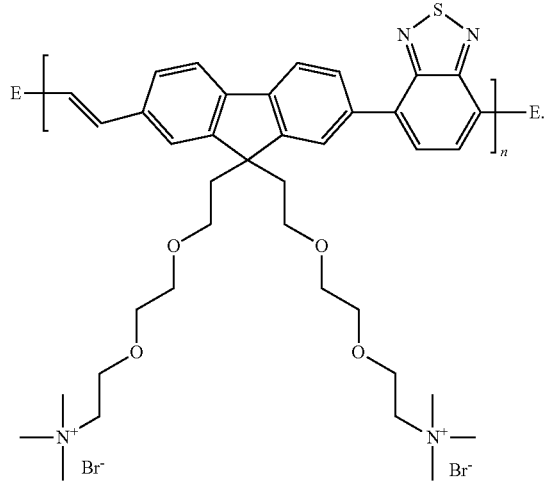

In another embodiment, the polymer of formula (V) comprises a repeat unit represented by the following formula:

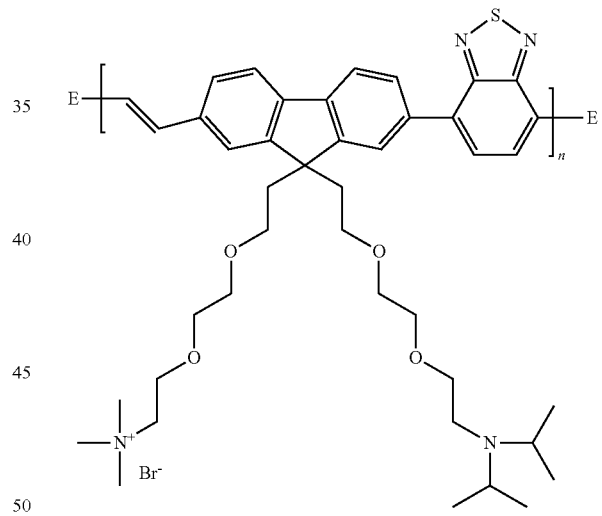

The polymer of the present invention can also be represented by formula (VII):

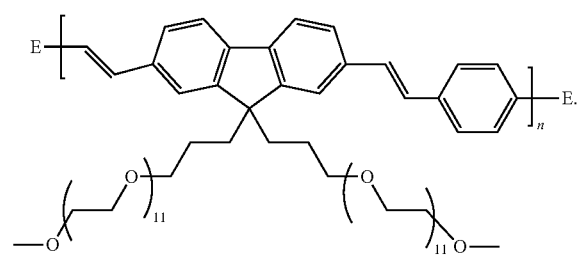

The polymer of the present invention can also be represented by formula (VIII):

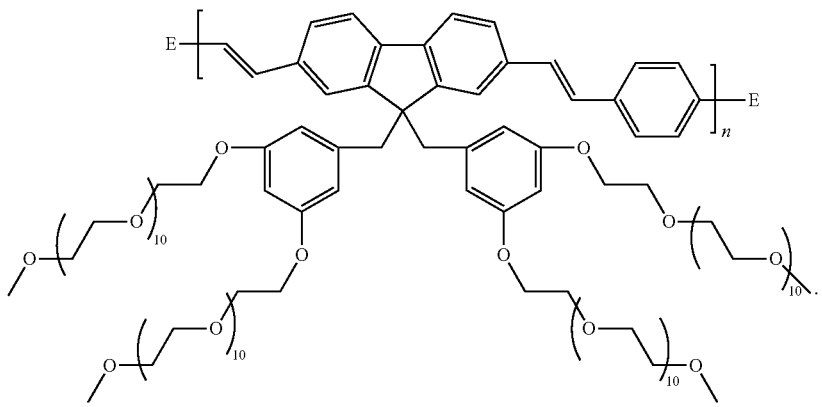

In some embodiments for polymers described herein, A, E, $L^1$, $L^{1'}$, $L^2$, $L^{2'}$, $G^1$ and/or $G^{1'}$ contain one or more reactive groups capable of undergoing chain extension, conjugation, or crosslinking.

In another embodiment, for polymers described herein, E is a halogen or a vinyl group. In other embodiments, E is —Br, —I, or —Cl. In yet other embodiments, E is —Br.

In yet another embodiment, for polymers described herein, E is independently represented by formula (VI):

wherein $R^{11}$ is a hydrogen, halogen, hydroxyl, C1-C12 alkyl, C2-C12 alkene, C2-C12 alkyne, C3-C12 cyclo alkyl, C1-C12 haloalkyl, C1-C12 alkoxy, C6-C18 (hetero)aryloxy, C6-C18 (hetero)arylamino, C6-C18 (hetero)aryl group, —[O—$CH_2$—$CH_2$]$_q$—Z, or (C1-C12)alkoxy-X;

and wherein Z is —OH or —COOH; X is —$NH_2$, —NH-COOH, —NHCOOC($CH_3$)$_3$, —NHCO(C3-C12)cycloalkyl (C1-C4)alkyl-N-maleimide; or —NHCO[$CH_2$—$CH_2$—O]$_k$$NH_2$; q is an integer from 1 to 20;

and k is an integer from 1 to 8.

In yet another embodiment, for polymers described herein, E is independently selected from the group consisting of a-k having the structure:

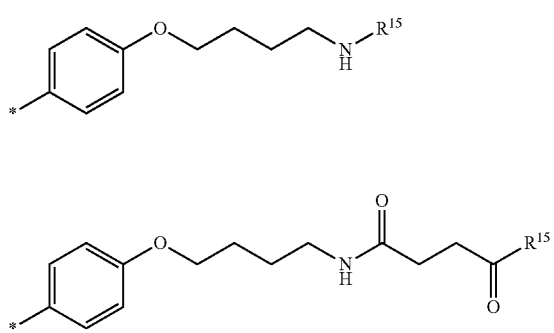

a

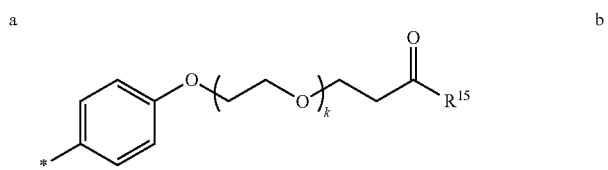

b

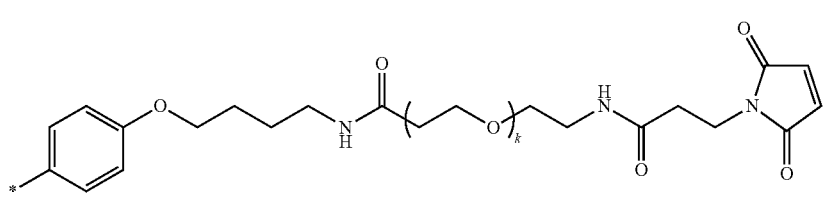

c

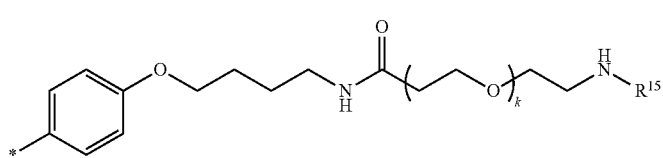

d e

-continued

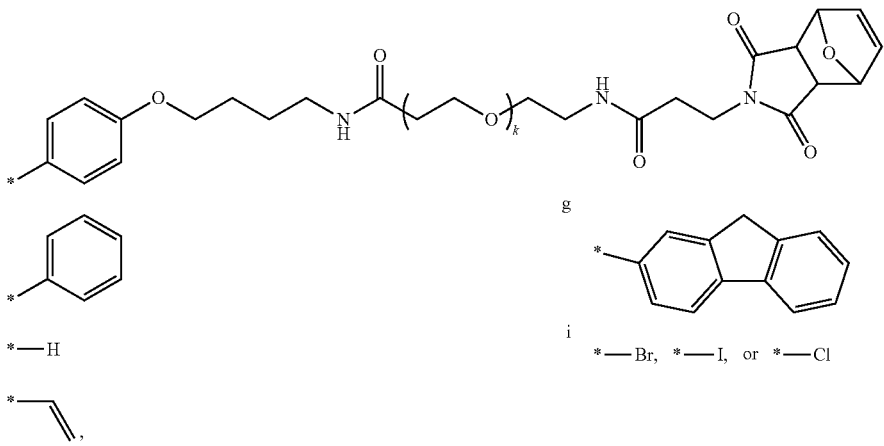

f g h i j k

* = site for covalent attachment wherein k=2, 4, 8, 12 or 24 and $R^{15}$ is selected from the group consisting of 1-t having the structure

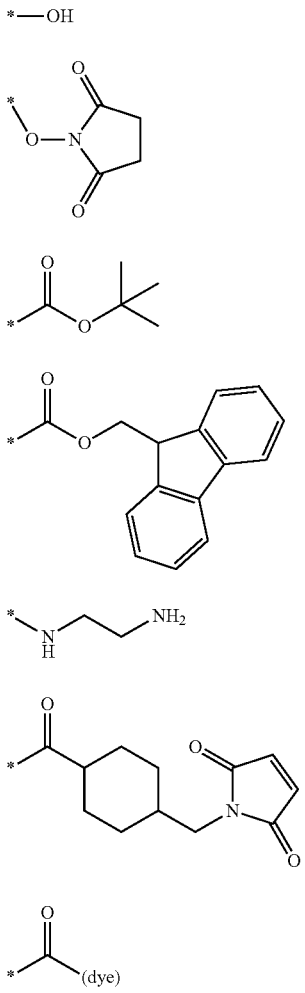

l m n o p q r s t

* = covalent attachment where (dye) is an organic dye with covalent linker.

Organic dyes with covalent linker include any chromophore or fluorophore described herein attached. Covalent linkage can be introduced by, but is not limited to, chemistry involving maleimide/thiol, succimidylester (NHS ester or other activated esters)/amine, azides, hydrazine/aldehyde, carboxy/EDC (1-Ethyl-3-[3-dimethylaminopropyl]carbodiimide Hydrochloride)/amine, amine/Sulfo-SMCC (Sulfosuccinimidyl 4-[N-maleimidomethyl]cyclohexane-1-carboxylate)/thiol, and/or amine/BMPH (N-[β-Maleimidopropionic acid]hydrazide•TFA)/thiol.

In another embodiment, for polymers of formula (I) or (IV), $G^1$ and $G^{1'}$ are both an ammonium group. In some embodiments, the ammonium group is $—NR_3^+$ or $—NHR_2$, wherein R is a C1-C3 alkyl. In other embodiments, $G^1$ and $G^{1'}$ are both $—NMe_3Br$ or $—N(CHMe_2)_2$.

In another embodiment, for polymers of formula (V), $G^2$ and $G^{2'}$ are both an ammonium group. In some embodiments, the ammonium group is $—NR_3^+$ or $—NHR_2$, wherein R is a C1-C3 alkyl. In other embodiments, $G^2$ and $G^{2'}$ are both $—NMe_3Br$ or $—N(CHMe_2)_2$.

In another embodiment, the present invention is directed to a method of detecting an analyte, comprising contacting the analyte with a cognate ligand under conditions which promote binding of the analyte to the cognate ligand; contacting the analyte bound to the cognate ligand with a polymer of the present invention (such as polymer represented by formula (I), (IV), (V), (VII) or (VIII)) under conditions that promote binding of the polymer to the analyte; exciting a fluorescent signal in the polymer bound to the analyte; and detecting the fluorescent signal emitted by the polymer.

In one embodiment, the cognate ligand is attached to a solid support material. The solid support material can be beads, hydrogel or porous materials.

In another embodiment, the present invention is directed to a device for detecting an analyte comprising:
a substrate;
a solid support material disposed on the substrate; a ligand, attached to the solid support material, said ligand being cognate to an analyte being detected; and
a polymer of present invention (such as polymer represented by formula (I), (IV), (V), (VII) or (VIII)) capable of binding to the analyte bound to the cognate ligand.

In another embodiment, the present invention is directed to a kit for detecting an analyte comprising:
a substrate;
a solid support material;
a ligand capable of being attached to the solid support material, said ligand being cognate to an analyte being detected; and
a polymer of the present invention (such as polymer represented by formula (I), (IV), (V), (VII) or (VIII), capable of binding to the analyte bound to the cognate ligand.

In further embodiments, polymers described herein are further conjugated to a primary antibody, secondary antibody, monoclonal antibody, polyclonal antibody, antibody fragment, streptavidin, or nucleic acid.

The present invention is also directed to a method of preparing a polymer represented by formula (I), comprising reacting a compound of formula (II)

Br-(A)-Br    (II), with a compound of formula (III)

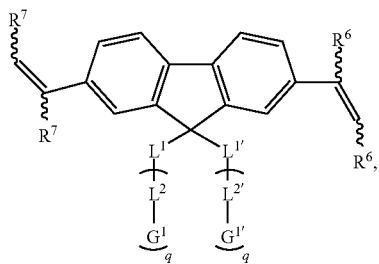

(III)

thereby producing a polymer represented by the following formula. Further embodiments of preparing a polymer represented by formula (I) are described in the following Examples.

In some embodiments of the invention described herein, the first step in the methods of the present invention is to fabricate silicon wafers as show in FIG. 1. An ultrathin layer of poly(ethylene glycol) (PEG) was first modified on the surfaces of silicon wafers using PEG-silane to improve biocompatibility and resist adhesion of biomolecules. This was followed by photolithography and etching carried out in clean room. Before removal of the photoresist, the etched areas were modified with 3-aminopropyltriethoxysilane (APTES) to render amino groups on the bottom and the surface of micro-wells. After removal of the photoresist using acetone and drying with compressed air, the silicon wafers presented special patterns on the surface. The pattern was composed of an array of etched micro-wells, and each micro-well was 50 micron meter in diameter and 500 nanometer in depth. The distance between the centers of two micro-wells was 150 micron. The surfaces inside the micro-wells were modified with amino groups to increase the hydrophilicity, while the surface outside the micro-wells showed hydrophobic property (contact angle 42.50°) due to the presence of a PEG layer.

Figure 2:
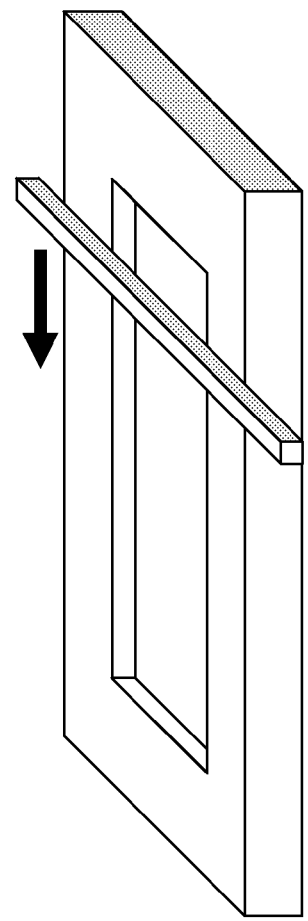
FIG. 2 is a scheme of the patterning chamber (made of PMMA) for beads self-assembly in the well. The dimension of the sunk part is 65×22×2 mm (length×width×depth).
Figure 3:
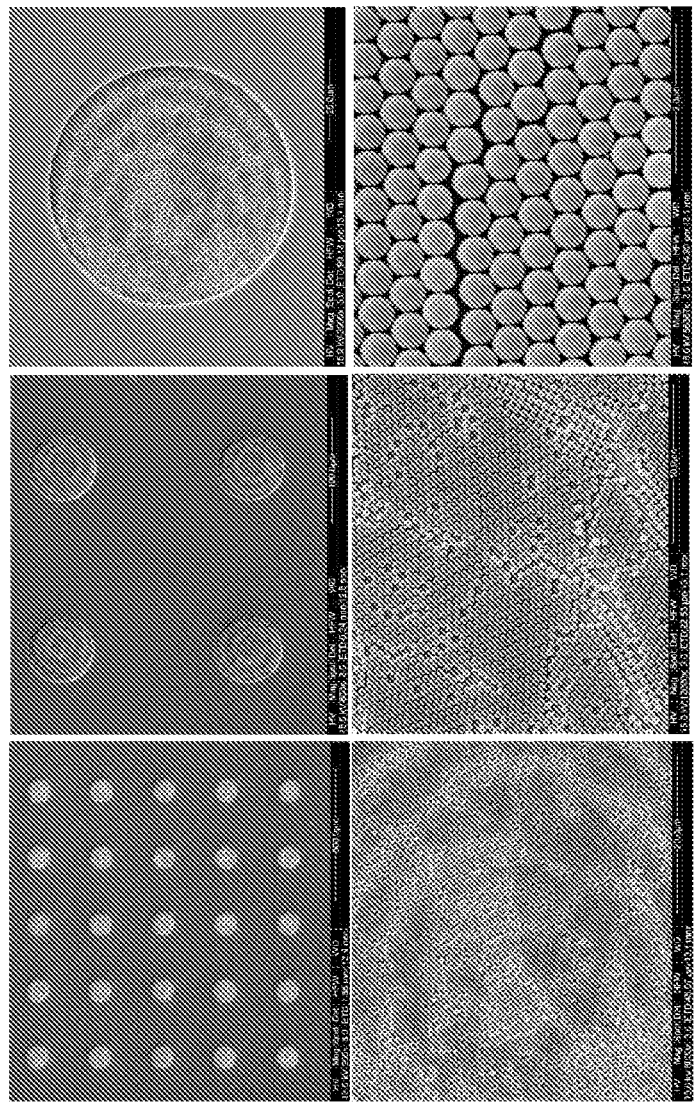
FIG. 3 shows SEM images for patterned PS beads.

The second step is to pattern the PS beads into the microwells on the silicon wafer. Monodispersed polystyrene (PS) beads (500 nanometer in diameter) have carboxylic groups on the surface. The diameter of PS beads has a good match to the depth of the micro-wells so that a monolayer of PS beads can be formed inside the micro-wells. PS beads were first activated with 1-Ethyl-3-(3-dimethylaminopropyl)-carbodiimide (EDC) so that the carboxylic groups on microsphere surfaces can react with amino groups on the etched micro-wells. A chamber was designed for PS beads pattern as shown in the FIG. 2, which is made of poly (methyl methacrylate) (PMMA). In the first step, a silicon wafer was placed in the chamber. A drop of the PS bead suspension was then added on top of the silicon wafer. A PMMA ruler was used to move excess PS suspension from the right to the left. Due to the hydrophobic surface of the silicon wafer, the PS bead droplet was easily removed from the wafer. Driven by the capillary force and the interaction between carboxylic groups and amino groups in the microwells, carboxylate PS beads were left in the micro-well while the silicon surface outside microwell was kept clean and bead free. FIG. 3 shows the SEM images of PS beads patterned in the wells. PS beads inside the micro-well formed a monolayer with closely packed arrangement.

Figure 4:
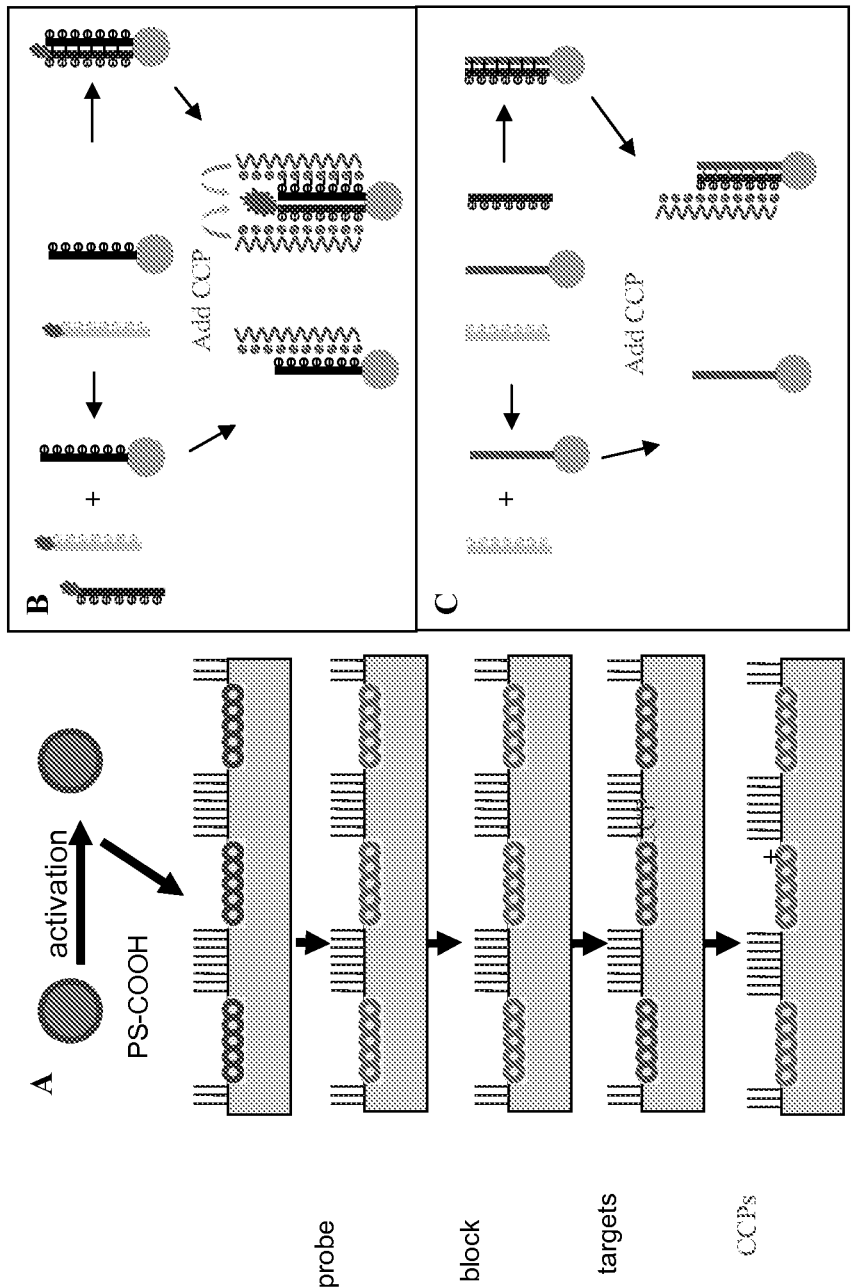
FIG. 4 depicts bead array fabrication scheme (A) and the detection schemes for labeled target (B) and label-free target (C). For DNA detection, the probe can be DNA or PNA in scheme A. In scheme B, ssDNA (black) is used as the probe, complementary DNA (blue) and non-complementary DNA (green) are labeled with Cy5 (red) to serve as the targets. For scheme B, PNA could also serve as the probe for labeled DNA detection. In scheme C, PNA (brown) is used as the probe, and complementary DNA (blue) or non-complementary DNA (green) is served as the target.

The third step is to configure the assay as shown in FIG. 4. Firstly, DNA or PNA probes were immobilized on the PS beads. For the application of FRET as shown in FIG. 4B, single stranded DNA modified with amino groups or PNA (peptide nucleic acid) modified lysine at the terminals were used as the probes to capture DNA targets. For the application of label-free assay as shown in FIG. 4C, PNA probes were used. The immobilization of PNA probes was conducted in 0.2 M borate buffer (pH 8.5) for 3 hours at room temperature. The PS beads were then blocked with 2-aminoethanol to deactivate the reactive sites on their surfaces. After washing with PBS buffer, the silicon wafer was placed in a hybridization chamber for DNA hybridization. For label free assays, the target DNA has no fluorescent labels. On the other hand, the targets could be labeled with a fluorescent dye. After the hybridization and washing steps, a solution of cationic conjugated polymers was applied to the PS bead pattern. Following by washed in DI water and dried with compressed air, the PS patterns were treated in $10^{-6}$ M conjugated polymer solution for 1-2 minutes at room temperature.

Figure 5:
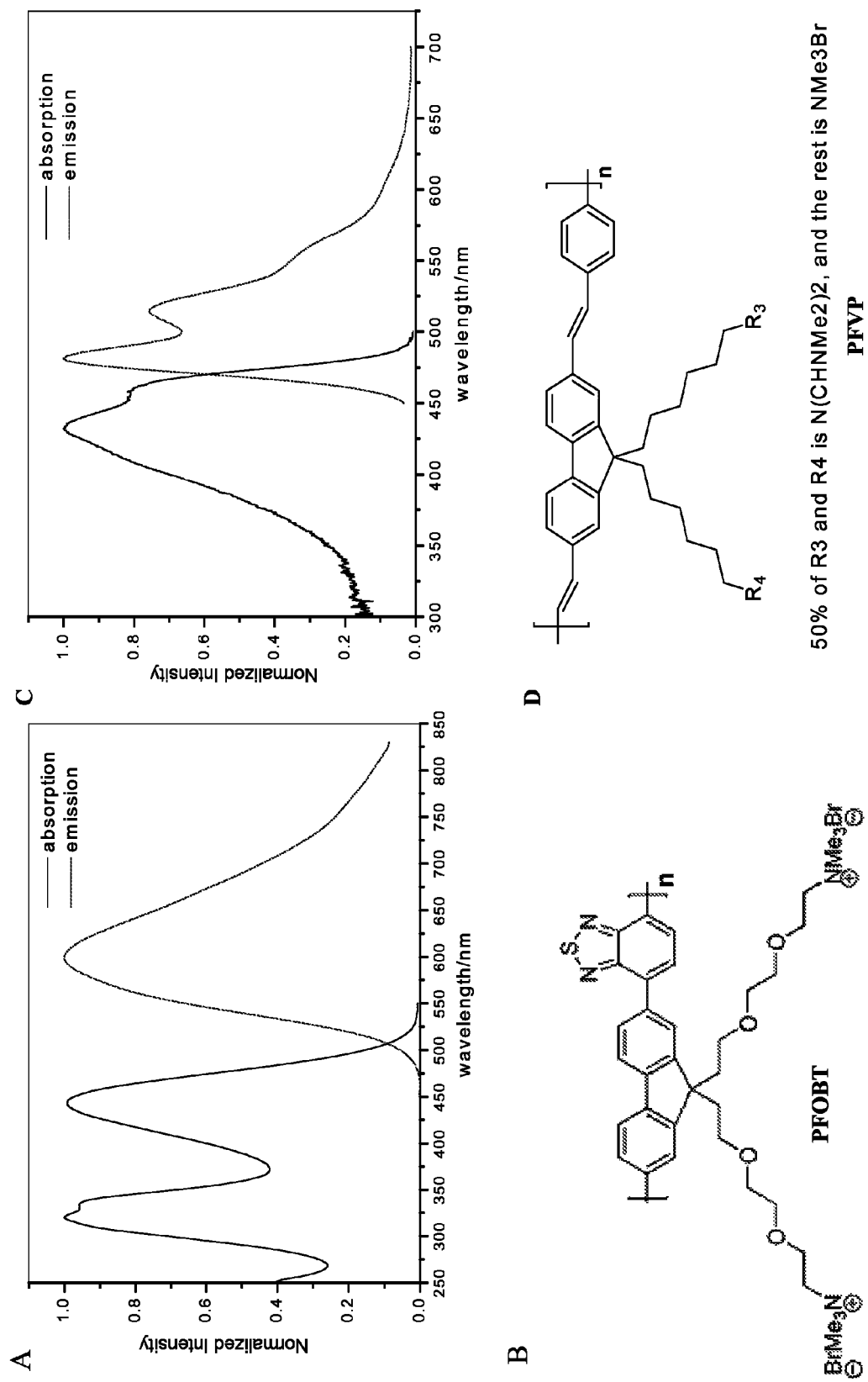
FIG. 5 is a plot showing the absorption and emission spectra of cationic conjugated polymers in solution. Panels A and B are the spectrum and structure of PFOBT. C and D are the spectrum and structure of polymer PFVP.
Figure 6:
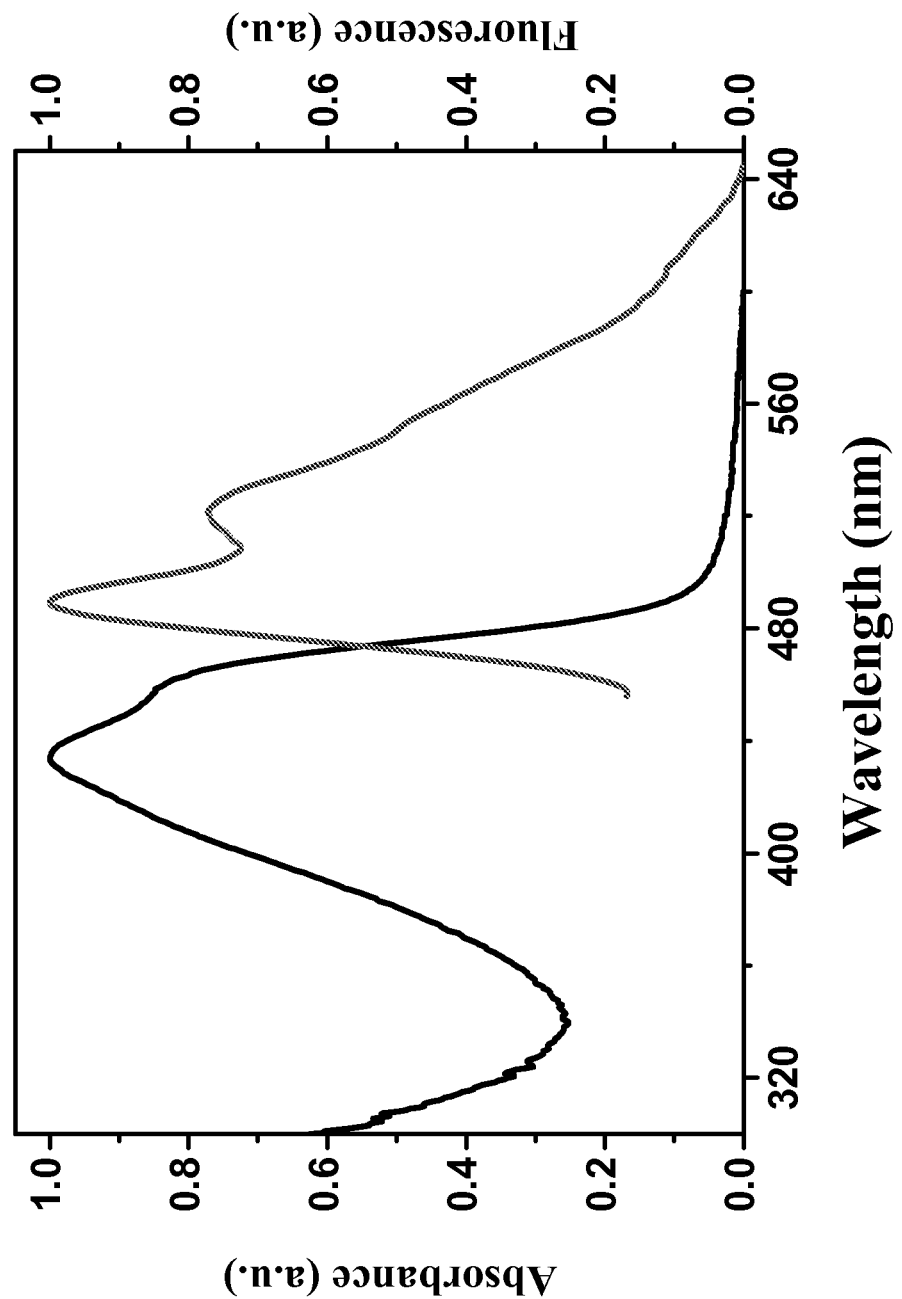
FIG. 6 is a plot showing the absorption and emission spectra of PFVP in solid state.

Cationic conjugated polymers (CCP) were designed for DNA detection. FIG. 5 shows the absorption and emission spectra and chemical structures of the polymer PFVP. The maximum absorbance of PFVP is at 408 nm and emission band is from 480 to 540 nm. The emission band overlapped the absorption band of the dye Cy5. So the fluorescence energy resonance transfer (FRET) occurred when PFVP polymer was excited at 408 nm. Due to FRET effect, Cy5 gave brighter fluorescence in the presence of PFVP. When unlabeled DNA probe is used as the target, both PFOBT and PFVP could serve as the reporter polymer. The absorption and emission spectra of PFVP are shown in FIG. 6.

Figure 7:
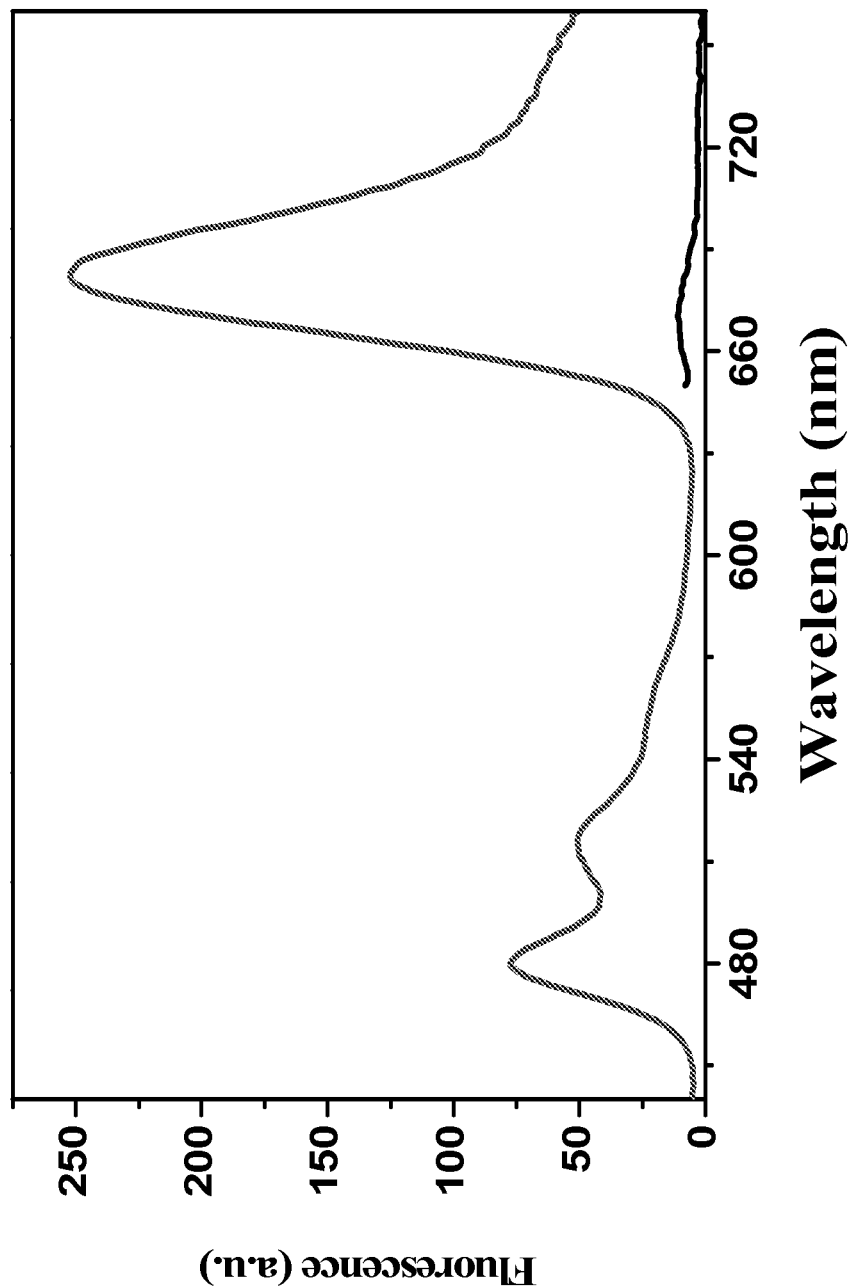
FIG. 7 (top) is a plot showing the emission spectra for solutions upon direct excitation of Cy5 at 649 nm in the absence of the polymer (black line) and that upon excitation of the polymer (dashed line) at 408 nm in 10 mM PBS buffer. In this figure, the concentration of the cy5-labeled 20 mer DNA is $5*10^{-9}$M. The polymer emission does not interfere with the Cy5 emission. Excitation at 408 nm gives slightly better results as compared to that at 457 nm. (Bottom), same experiment with additional dyes, Cy3 and Alexa 750.

FIG. 7 (top) shows the emission spectra for solutions upon direct excitation of Cy5 at 649 nm in the absence of PFVP (black line) and that upon excitation of PFVP (dashed line) at 408 nm in 10 mM PBS buffer. The concentration of Cy5-labeled 20 mer DNA is $5\times10^{-9}$M. Upon addition of $5\times10^{-7}$M PFVP, the polymer sensitized Cy5 emission is 25-fold higher than that upon direct excitation of the dye in the absence of the polymer. FIG. 7 (bottom) is the same experiment but with 2 additional dyes, Cy3 and Alexa 750. A significant red shift is seen based on the excitable polymer.

Figure 8:
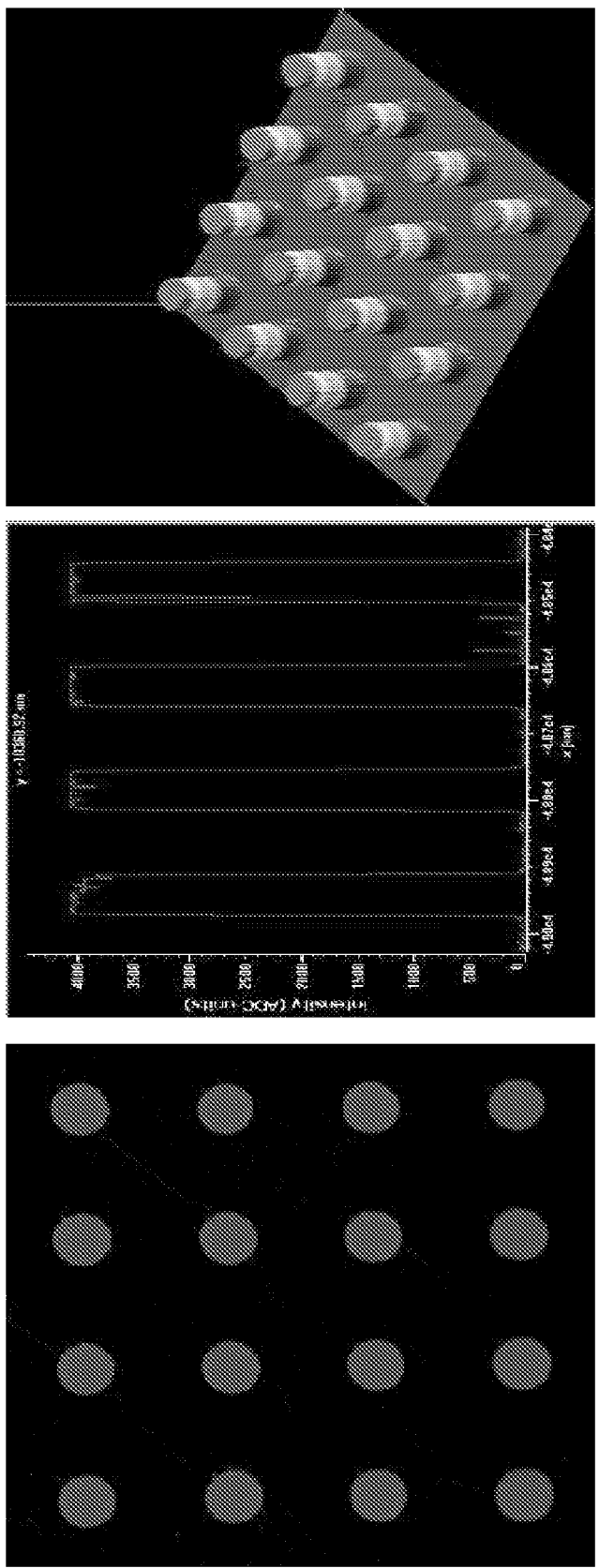
FIG. 8 shows confocal images of polymer amplified bead array for DNA detection. A) one-dimensional image; B) Intensity value for any four dots in a line; C) three-dimensional image. The DNA concentration used for hybridization is $1 \times 10^{-6}$ M.

FIG. 8 shows the confocal images of polymer amplified bead array for DNA detection. A) one-dimensional image; B) Intensity value for any four dots in a line; C) three-dimensional image.

The dot size is 50 µm, which contains self-assembly beads. The target DNA concentration is 1 µM. For application of PFVP in FRET assays, a 408 nm laser was used as the excitation source and the 560LP detector that only passes light above 640 nm was used to detect the fluorescence signals.

Figure 9:
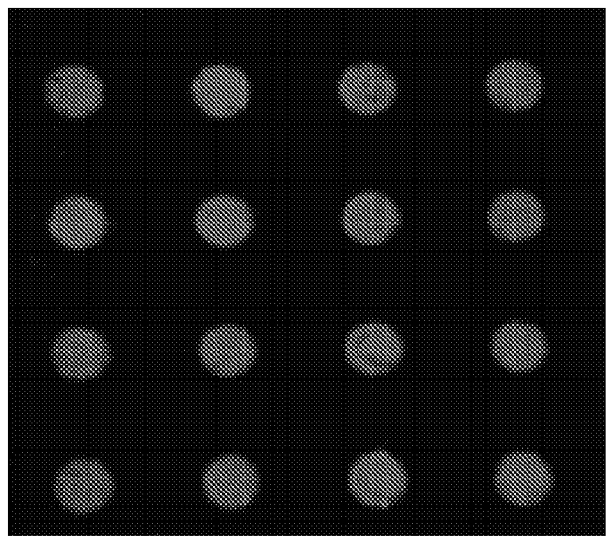
FIG. 9 shows fluorescence images of a planar surface after probe immobilization and Cy-5 DNA hybridization (A), PS bead patterning after hybridization of cy5 labeled target DNA without applying the polymer (B) and PS bead patterning after hybridization of cy5 labeled target DNA with the polymer (C). Excitation wavelength is 640 for A and B, 408 nm or 457 nm for C. The emission is collected at 650LP.
Figure 9:
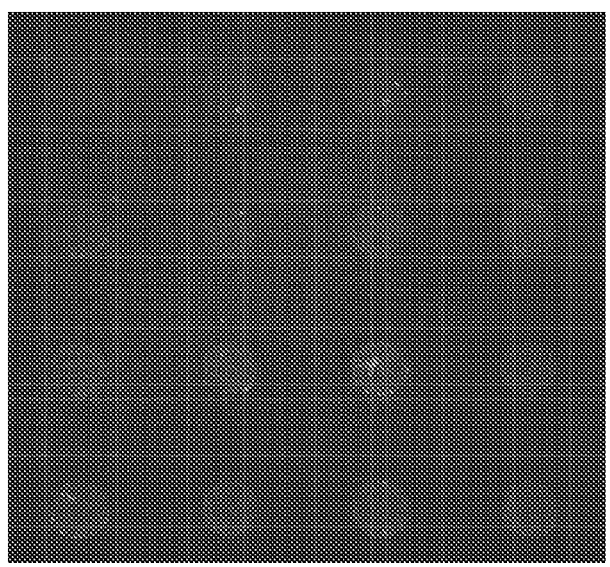
Figure 9:
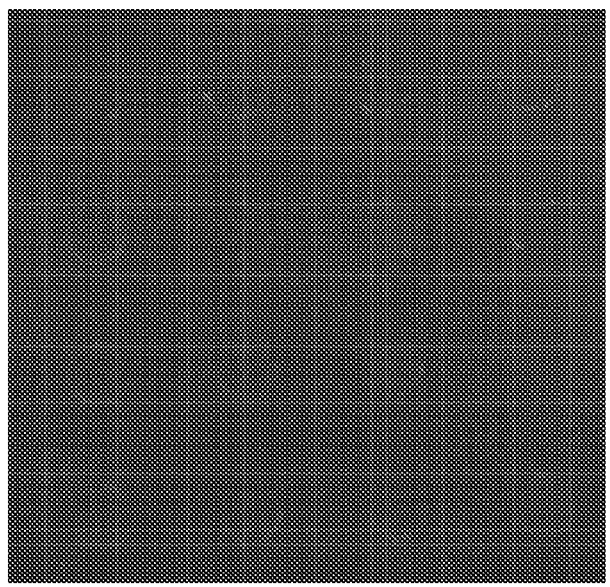

To demonstrate the Cy5 signal amplification on different substrates and in the absence and presence of the polymer (FIG. 9), the images are taken using confocal microscope with excitation laser of 408 nm or 457 nm. The gain is set for "C" to reach the maximum. Overall, the signal amplification provided by the described strategy is about 160 fold (bead array versus planar surface).

Figure 10:
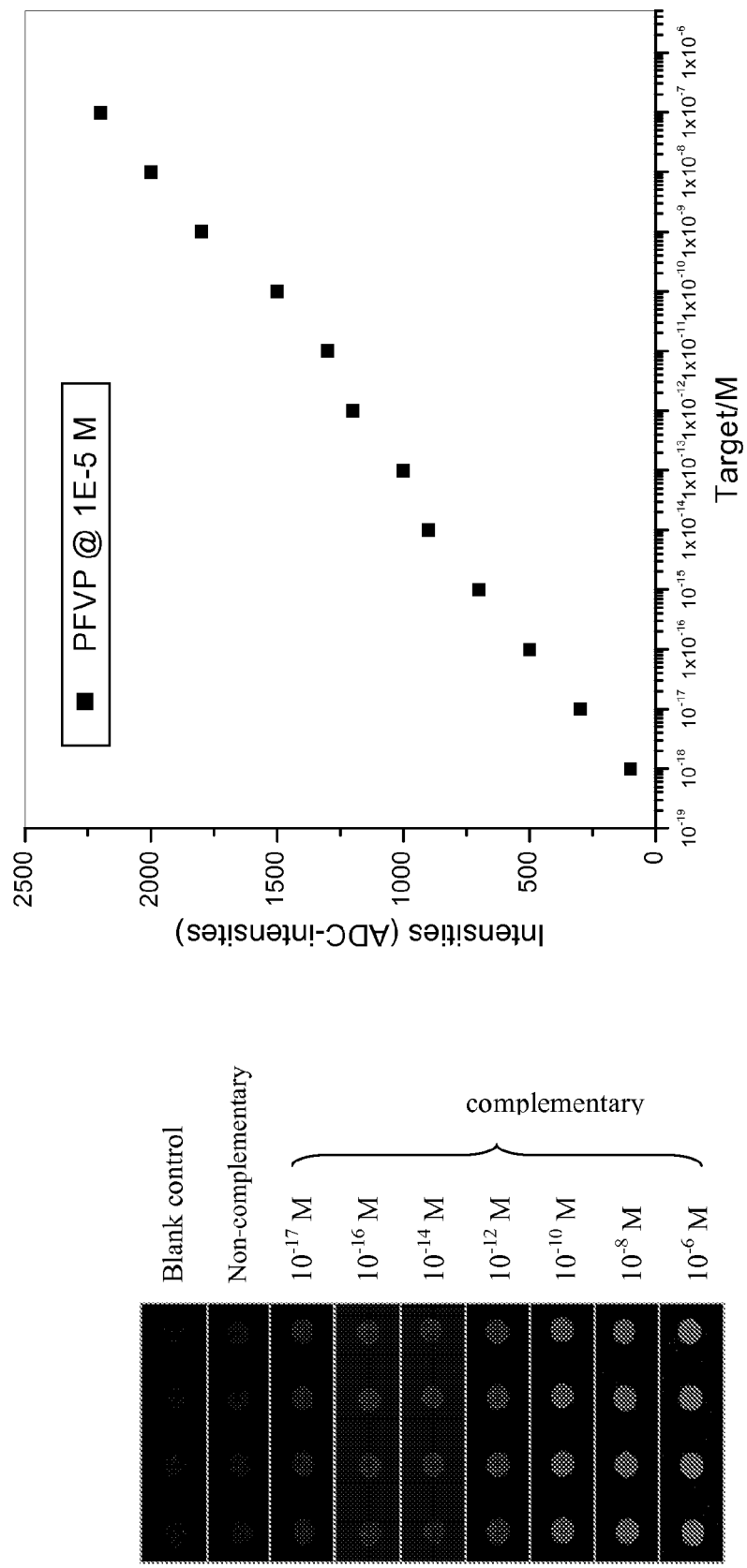
FIG. 10 shows fluorescence images (A) for blank control, non-complementary DNA (5'-Cy5-TGG AAG GAG GCG TTA TGA GGG CCA GCT AC-3', $10^{-6}$ M) and complementary targets (5'-Cy5-ATC TTG ACT ATG TGG GTG CT-3') at different concentrations with the polymer amplification. The calibration curve (B) for detection of DNA analytes. The probe is 5'-amino-AGC ACC CAC ATA GTC AAG AT-3'. Cationic conjugated polymer used is PFVP. Excited at 408 nm and detected at 650LP.

FIG. 10 shows the fluorescence signals and the calibration curve for FRET application in detecting the complementary targets at different concentrations. The probe immobilized on the NP surface is DNA, which hybridizes to Cy5 labeled complementary DNA or non-complementary DNA. The optical gain is set for the signal of [cDNA]=1 µM to reach the maximum. The detection limit is $10^{-17}$ M, which corresponds to 300 copies as the volume used is 300 µL. Reducing the volume to 30 µL has also been attempted, which corresponds to about 30 copies, however, the reproducibility drops to about 60%. For DNA/DNA based assay, the SNP signal is about 60-70% as that of the complementary DNA.

Figure 11:
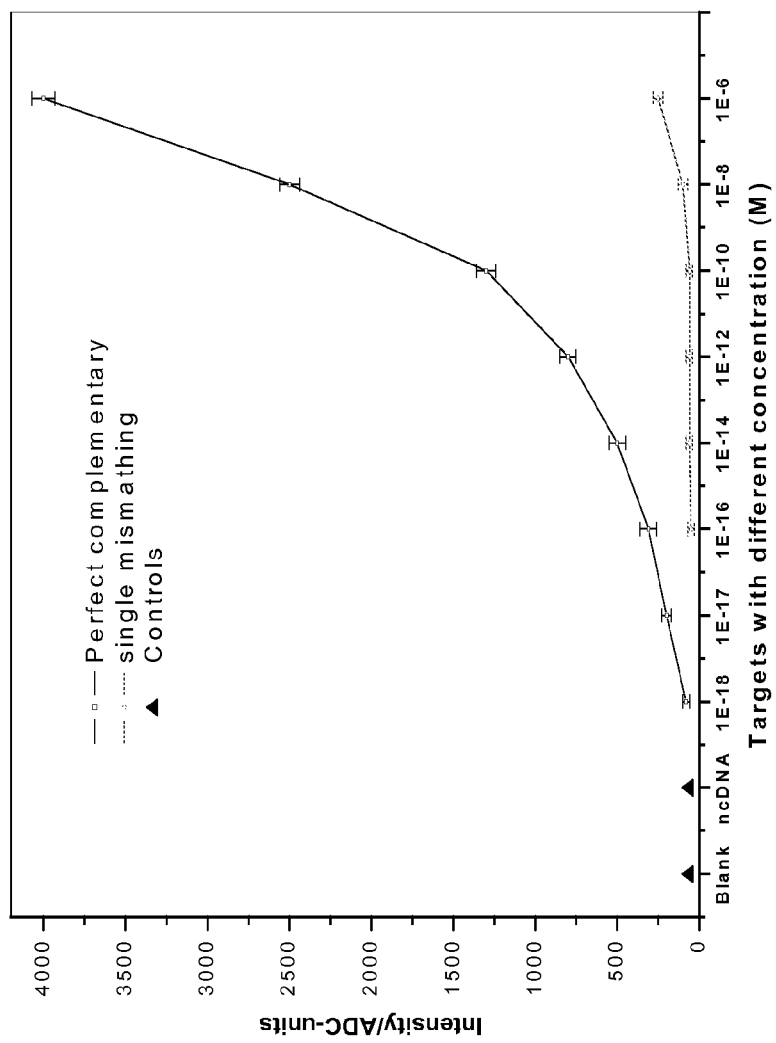
FIG. 11. A: confocal images and surface plots for the FRET strategy. Detector was at 650LP with excitation at 408 nm. 10-mer PNA (lys-lys-OO-GCT ACT GAC C—CONH$_2$) as probe, targets as blank (1), cDNA (5'Cy5-GGT CAG TAG C-3', 2: $10^{-6}$ M, 3: $10^{-8}$ M, 4: $10^{-10}$ M, 5: $10^{-12}$ M, 6: $10^{-14}$ M, 7: $10^{-16}$ M, 8: $10^{-17}$ M), ncDNA (5' Cy5-ATC TTG ACT TTG TGG GTG CT-3', 9: $10^{-6}$ M) and single mismatch DNA (5' Cy5-GGT CA<u>T</u> TAG C-3', 10: $10^{-6}$ M, 11: $10^{-8}$ M). B: The intensities extracted from confocal images for different targets.
Figure 11:
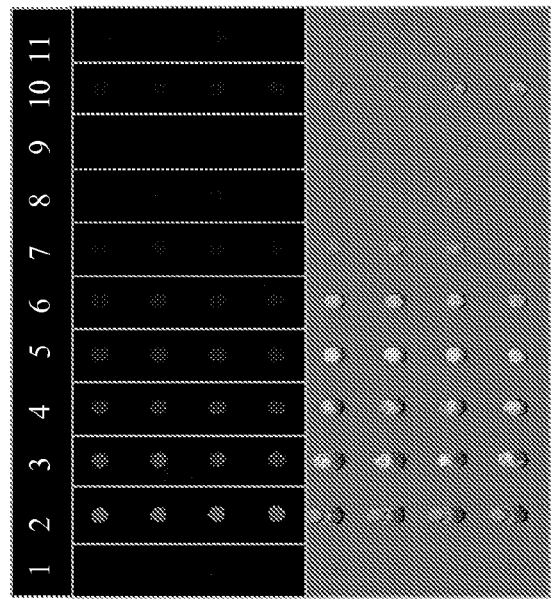
Figure 12:
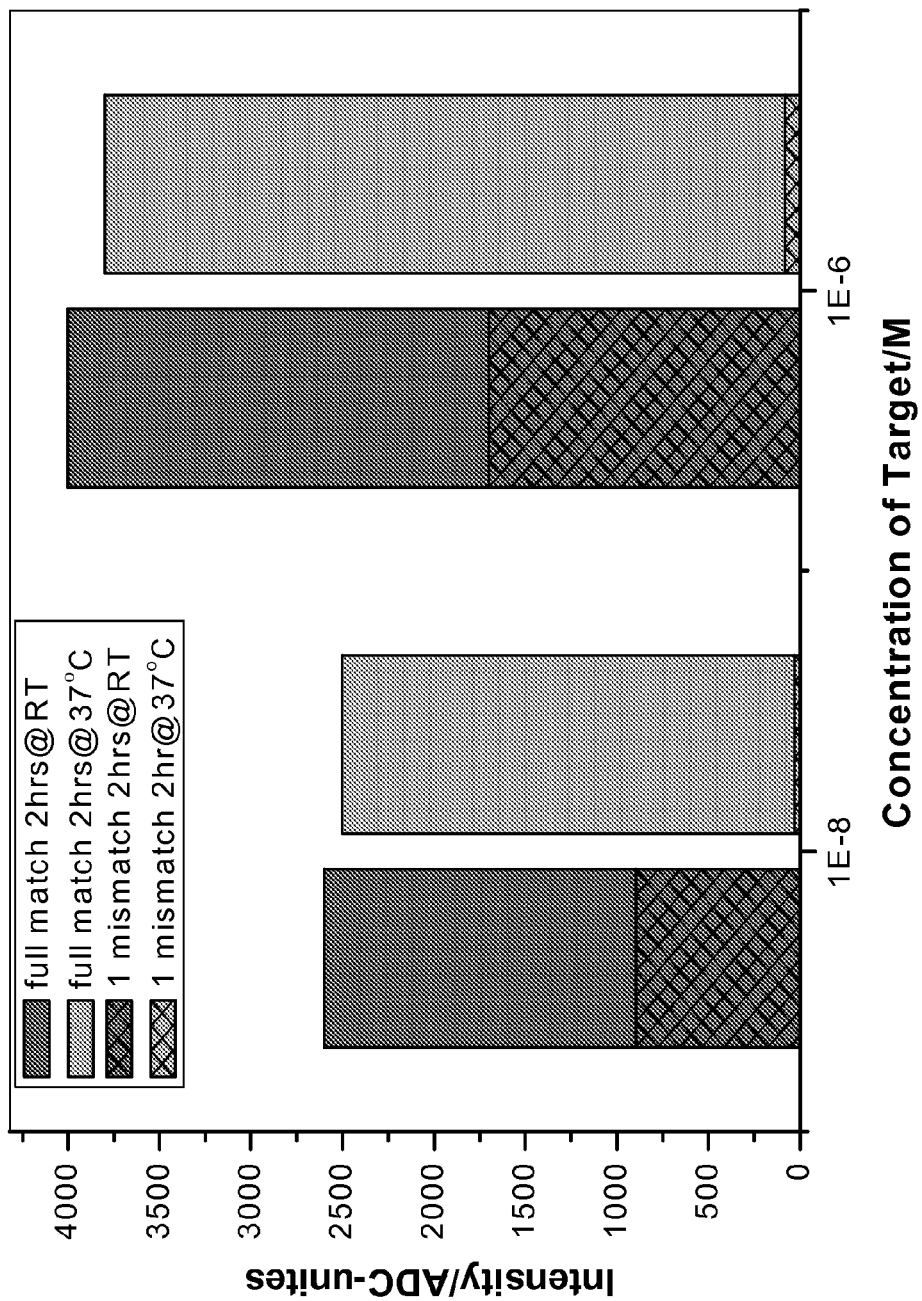
FIG. 12. Intensities for complementary ($10^{-6}$ M, $10^{-8}$ M, no patterned) and single mismatch ($10^{-6}$ M, $10^{-8}$ M, patterned) DNA at different hybridization condition. Detector was at 650LP with excitation at 408 nm. 10-mer PNA (lys-lys-OO-GCT ACT GAC C—CONH$_2$) as probe, complementary DNA (5'Cy5-GGT CAG TAG C-3'), single mismatch DNA (5' Cy5-GGT CA<u>T</u> TAG C-3').

When the probe immobilized on the NP surface is PNA, which hybridizes to Cy5 labeled complementary DNA or non-complementary DNA or SNP DNA. The optical gain is set for the signal of [cDNA]=1 µM to reach the maximum. The results are shown in FIG. 11. The detection sensitivity is 300 copies with very good SNP selectivity. The detector was at 650LP with excitation at 408 nm. 10-mer PNA (lys-lys-OO-GCT ACT GAC C—CONH$_2$) as probe, targets as blank (1), cDNA (5'Cy5-GGT CAG TAG C-3', 2: $10^{-6}$ M, 3: $10^{-8}$ M, 4: $10^{-10}$ M, 5: $10^{-12}$ M, 6: $10^{-14}$ M, 7: $10^{-16}$ M, 8: $10^{-17}$ M), ncDNA (5' Cy5-ATC TTG ACT TTG TGG GTG CT-3', 9: $10^{-6}$ M) and single mismatch DNA (5' Cy5-GGT CA$\underline{T}$ TAG C-3', 10: $10^{-6}$ M, 11: $10^{-8}$ M). B: The intensities extracted from confocal images for different targets. FIG. 12 shows the corresponding fluorescence response for single nucleotide polymorphism (SNP) detection.

Figure 13:
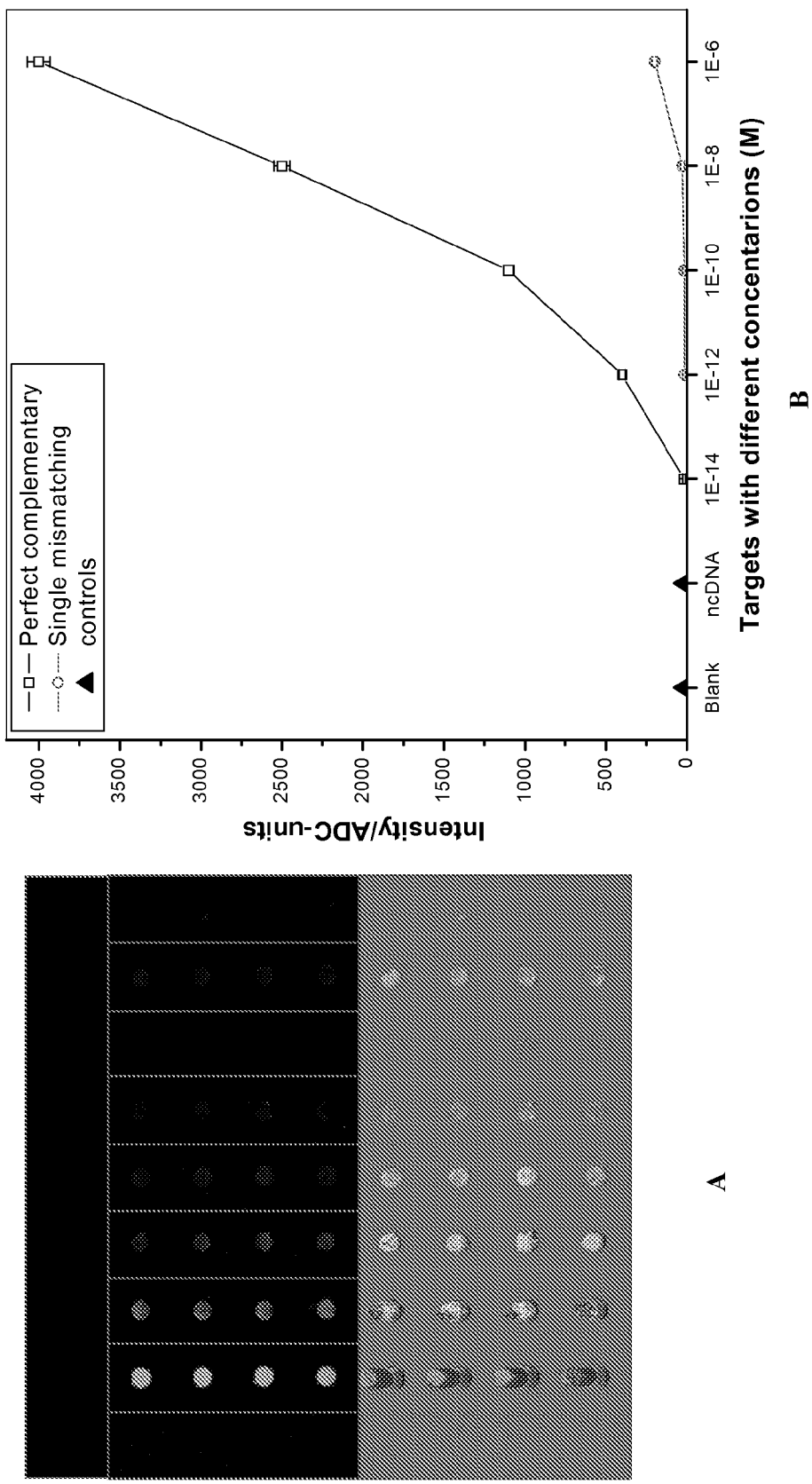
FIG. 13. A: confocal images and surface plots for the label-free strategy. Detector was at 515/30 with excitation at 408 nm. 10-mer PNA (lys-lys-OO-GCT ACT GAC C—CONH$_2$) as probe, blank (1), cDNA (5'-GGT CAG TAG C-3', 2: $10^{-6}$ M, 3: $10^{-8}$ M, 4: $10^{-10}$ M, 5: $10^{-12}$ M, 6: $10^{-14}$ M), ncDNA (5'-TCC TCC GCA A-3', 7: $10^{-6}$ M), single mismatch DNA (5'-GGT CA<u>T</u> TAG C-3', 8: $10^{-6}$ M, 9: $10^{-8}$ M), and. B: The intensities extracted from confocal images for DNA targets.
Figure 14:
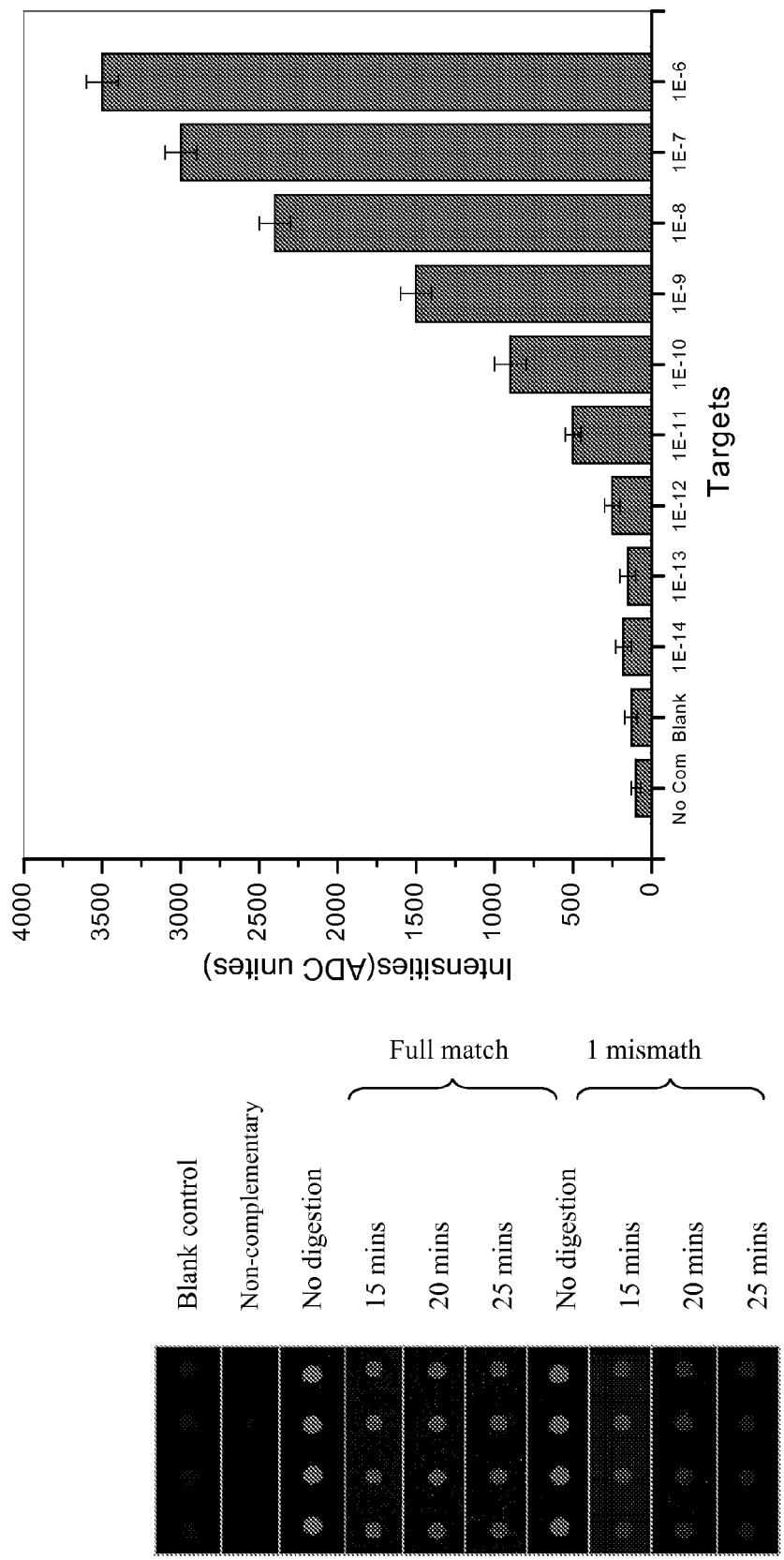
FIG. 14. Fluorescence images (A) for blank, non-complementary (5'-TCT CCT TCT CCT TG-3'), single base mismatched DNA (5'-GAA GGA <u>T</u>AA GGA GA) and the complementary DNA (5'-GAA GGA GAA GGA GA-3') with different digestion time. PNA probe used is TCC TTC T-O—O-lys-lys. PFOBT was used in label-free assay. Fluorescence intensities (B) for blank, non complementary ($10^{-6}$ M), and complementary DNA at different concentrations.

FIGS. 13 and 14 show the results of using conjugated polymers as signal reporters for label free detection. For label-free assays, the 488 nm laser was used as the excitation source and a 560LP detector was used to detect fluorescence signals when PFOBT was used as fluorescent reporters. Otherwise, the 408 nm laser was used as the excitation source and a 515/530 detector was used to detect fluorescence signals of PFVP. The probe immobilized on the NP surface is PNA, which hybridizes to label-free complementary DNA or non-complementary DNA or SNP DNA, and followed by polymer addition. The optical gain is set for the signal of [cDNA]=1 µM to reach the maximum. The detection sensitivity is $10^{-12}$ to $10^{-13}$ M.

For (SNP) detection, sometimes, an additional step is required to digest mismatched DNA, which was carried out in PBS buffer. By using a 10 mer PNA as the probe, the fluorescence intensities from Cy5-labeled fully complementary DNA and 1 base mismatched DNA had a similar intensity after polymer stain. After digestion by 51 nuclease in 51 buffer (50 mM pH 4.60) at 37° C. for different time, the fluorescence changes for both solutions were monitored. With the increased digestion time, the intensities for 1 base mismatched DNA target decreased remarkably to nearly zero, and there was only a slight decrease in intensities for the full complementary DNA target. The results are shown in FIG. 14.

Figure 15:
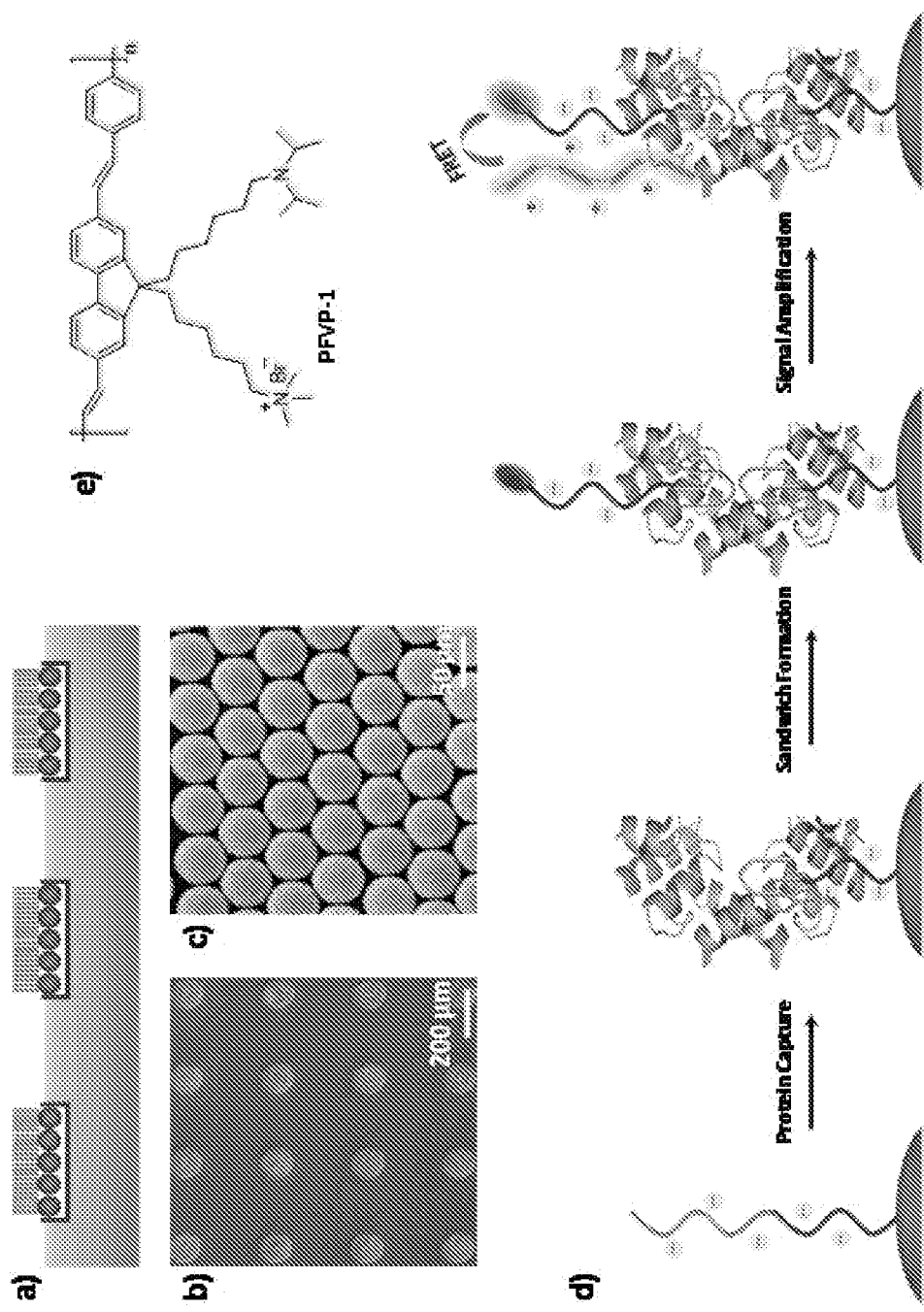
FIG. 15. Bead platform used for protein detection. Based on the platform shown in FIG. 3 (array size 5 mm×5 mm), 10 μl amino modified aptamer (5'-NH$_2$-T8GGTTGGTGTGGTTGG-3') was added to 300 μl 0.1 M MES buffer (pH 4.50, 1% EDAC and 1% sulfo-NHS) and soaked wafer in the well overnight at room temperature.

The same bead platform could also be used for protein detection (FIG. 15). Based on the platform shown in FIG. 3 (array size 5 mm×5 mm), 10 µl amino modified aptamer (5'-NH$_2$-T8GGTTGGTGTGGTTGG-3') was added to 300 µl 0.1 M MES buffer (pH 4.50, 1% EDAC and 1% sulfo-NHS) and soaked wafer in the well overnight at room temperature. The residual carboxyl groups were blocked with 2-aminoethanol and bovine serum albumin (BSA). Afterwards, wafers were washed in borate buffer 3 times and immersed in 25 mM 2-aminoethanol in 0.2 M borate buffer (pH 8.5) for 30 minutes at room temperature, followed by 10 mg/mL BSA treatment for blocking. After protein capturing and the dye labeled secondary aptamer treatment (5'-Cy5-GGTTGGTGTGGT-TGG-3'), following by washed in DI water and dried with compressed air, the PS patterns were treated in $10^{-6}$ M CCP solution for 1-2 minutes at room temperature.

Cationic conjugated polymers (CCP) were designed for protein detection. FIG. 15 shows the chemical structure of PFVP-1. The maximum absorbance of PFVP-1 is nearly the same as that for PFVP-1. The emission band overlapped the absorption band of the dye Cy5. So the fluorescence energy resonance transfer (FRET) occurred when PFVP-1 polymer was excited at 408 nm. Due to FRET effect, Cy5 gave brighter fluorescence in the presence of PFVP-1.

Figure 16:
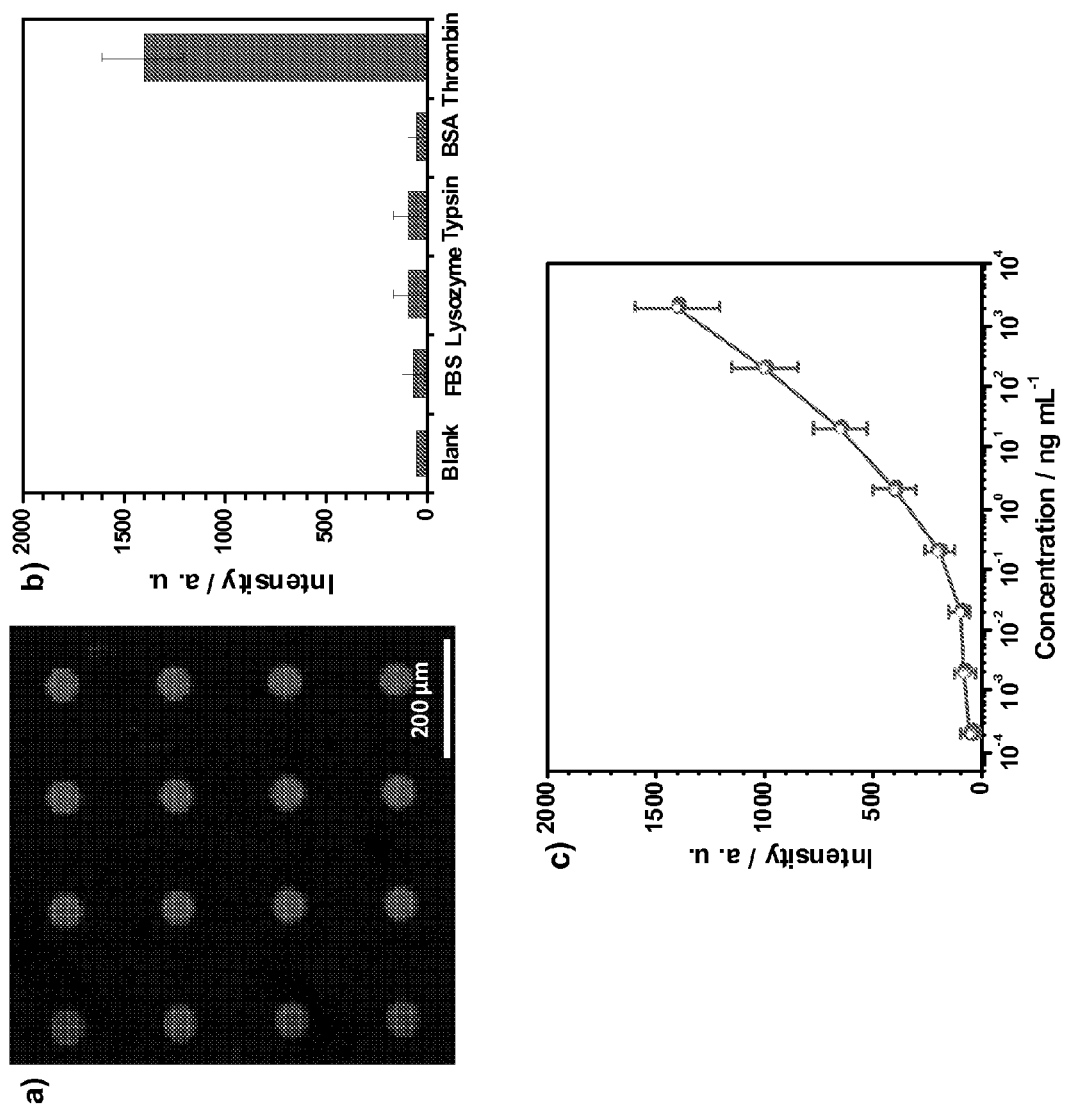
FIG. 16. Confocal images of polymer amplified bead array for DNA detection. (a) CLSM images of bead array immobilized with anti-thrombin probe upon excitation at 408 nm. (b) Fluorescence intensities of bead array treated with different proteins. [thrombin]=100 ng/mL. (c) The fluorescence intensities of bead array as a function of [thrombin]. The LOD for thrombin is calculated to be 0.5 pg/mL ($7 \times 10^{-13}$ M) according to the 3 times the standard deviation of the background fluorescence.

FIG. 16 shows the confocal images of polymer amplified bead array for DNA detection. (a) CLSM images of bead array immobilized with anti-thrombin probe upon excitation at 408 nm. (b) Fluorescence intensities of bead array treated with different proteins. [thrombin]=100 ng/mL. (c) The fluorescence intensities of bead array as a function of [thrombin]. The LOD for thrombin is calculated to be 0.5 pg/mL ($7\times10^{-13}$ M) according to the 3 times the standard deviation of the background fluorescence.

The dot size is 30 µm, which contains self-assembly beads. For application of PFVP-1 in FRET assays, a 408 nm laser was used as the excitation source and the 560LP detector that only passes light above 640 nm was used to detect the fluorescence signals.

Figure 17:
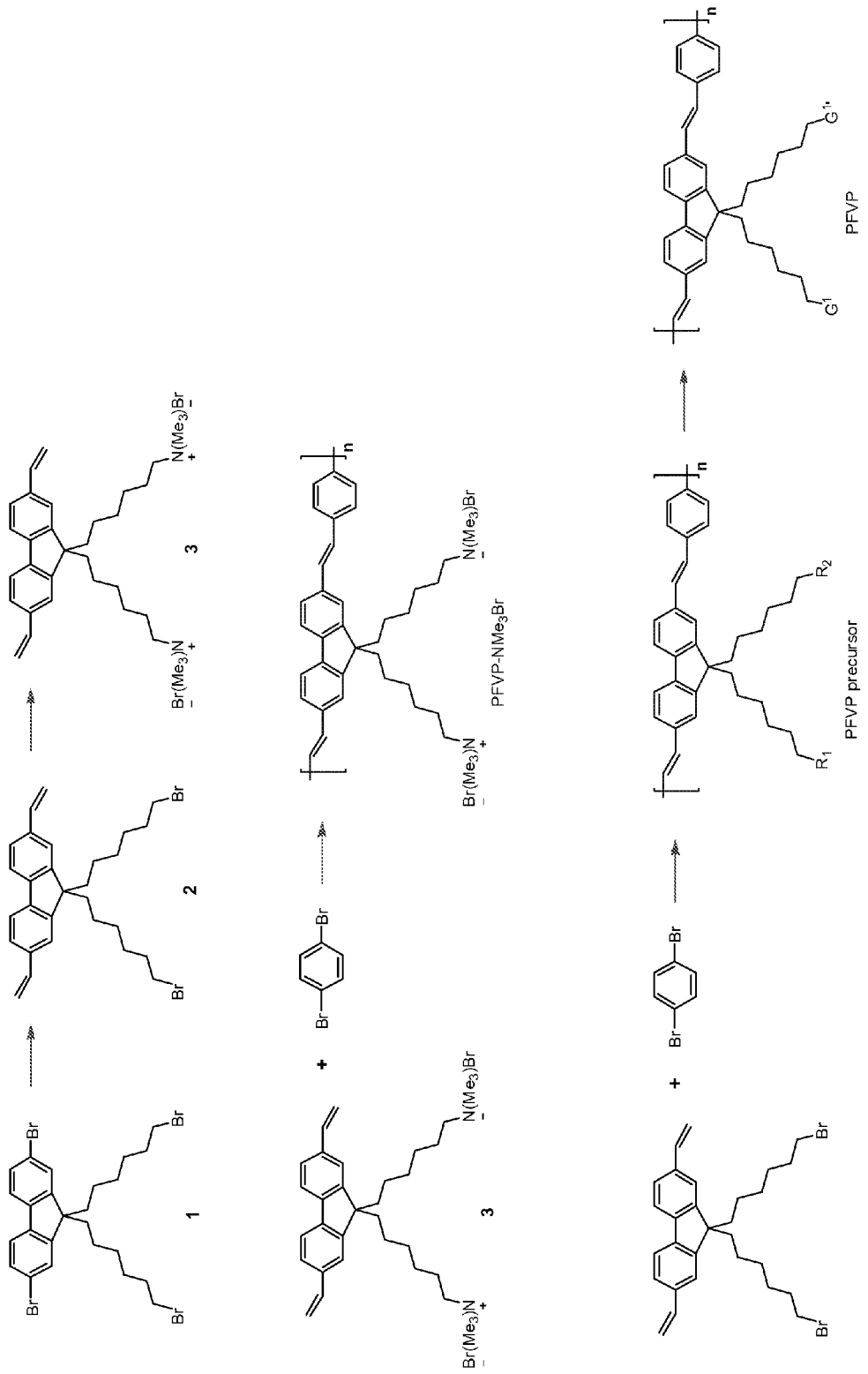
FIG. 17. A synthetic entry to embodiments of a polymer described herein.

A non-limiting polymer synthesis includes the following steps and is depicted in FIG. 17.

2,7-Dibromo-9,9-bis(6-bromohexyl)-9H-fluorene (1)

The reaction of 2,7-dibromo-9H-fluorene with 1,6-dibromohexane in the presence of potassium hydroxide and phase transfer catalyst tetra butyl ammonium bromide afforded 2,7-dibromo-9,9-bis(6-bromohexyl)-9H-fluorene in a yield of 75% after purification with columnar chromatography.

9,9-Bis(6'-bromohexyl)-2,7-divinylfluorene (2)

A flask with a stirring bar was charged with a mixture of compound 1 (1.000 g, 1.54 mmol), PdCl$_2$(PPh$_3$)$_2$ (0.0588 g, 0.065 mmol), a few crystals of 2,6-ditert-butylphenol, and toluene (15.0 mL). The mixture was heated to 100° C. under nitrogen, and tributylvinyltin (1.125 g, 3.534 mmol) was added dropwise. The mixture was further heated for 23 hours. It was subsequently diluted with 60 mL of ether and treated with KF solution (~10%). The mixture was stirred for 20 hours and followed by filtration to remove the insoluble solid. The organic layer was washed with water and dried over anhydrous MgSO$_4$. After removal of the solvent, the residue was purified by column chromatography with n-hexane as eluent to afford 0.650 g of compound 2.

9,9-Bis(6'-(N,N,N,-trimethylammonium)-hexyl)-2,7-divinylfluorene dibromide (3)

Condensed trimethylamine (2 mL) was added dropwise to a solution of 2 (300 mg) in THF (5 mL) at −78° C. The mixture was allowed to warm to room temperature and stirred for 24 hours. The precipitate was redissolved by the addition of methanol (5 mL). After the mixture was cooled to −78° C., additional trimethylamine (2 mL) was added. The mixture was stirred at room temperature for 8 hours. After removal of the solvent, acetone was added to precipitate 3, which was followed by washing with ethyl ether to yield 3 as white powders.

Preparation of PFVP-NMe₃Br

A reaction tube was charged with 9,9-Bis(6'-(N,N,N,-trimethylammonium)-hexyl)-2,7-divinylfluorene dibromide (100 mg), 1,4-dibromobenzene (35.6 mg), palladium (II) acetate (1.42 mg) and tri-o-tolyphosphine (11.3 mg). The tube was sealed, degassed and emerged in liquid nitrogen and 2.5 mL of DMF and 1.3 mL of water and 0.5 mL of diisopropylamine were added. The mixture was freezed-degassed-melt for three times. The mixture was stirred and heated at 100° C. for 4 hours under nitrogen. It was subsequently diluted with methanol followed by filtration to remove the insoluble part. The solution was concentrated and 70 mL of diethyl ether was added to precipitate the polymer. The precipitate part was dried under vacuum to yield 80 mg of PFVP as a yellowish powder.

Synthesis of the Precursor Copolymer for Partially Amine Terminated PFVP

The polymerization was carried out under a nitrogen atmosphere employing the Heck reaction. A reaction tube was charged with 9-bis(6-bromohexyl)-2,7-divinyl-9H-fluorene (110 mg), 1,4-dibromobenzene (47.66 mg), palladium (II) acetate (2.5 mg) and tri-o-tolyphosphine (16 mg). The tube was sealed, degassed and emerged in liquid nitrogen and 2.5 mL of DMF and 1.0 mL of diisopropylamine (99.5%, redistilled) were added. The mixture was freezed-degassed-melt for three times. The mixture was stirred and heated at 105° C. for 1.5 hours under nitrogen. It was subsequently diluted with THF followed by filtration to remove the insoluble parts. The solution was concentrated and 70 mL of diethyl ether was added to precipitate the polymer. The precipitate was dried under vacuum to yield yellowish powders (150 mg).

Preparation of the Cationic Copolymer for Partially Amine Terminated PFVP

A flask was charged with 43.5 mg of the precursor copolymer, 30 mL of THF and 10 mL of methanol. 2 ML of trimethylamine was then added dropwise. The mixture was stirred at room temperature for 24 hours. Additional 2 mL of trimethylamine was added, and the reaction was continued for another 24 hours at room temperature. The solvent was removed and the residue was added to 3 mL of acetone. The precipitate was collected and dried under vacuum for 24 hours before it was dissolved in methanol. The insoluble part was removed and the clear solution was concentrated to yield 40 mg of the final polymer.

Synthesis of 9-(6'-bromohexyl)-9'-(6'-diisopropylaminohexyl)-2,7-divinylfluorene (4)

Figure 18:
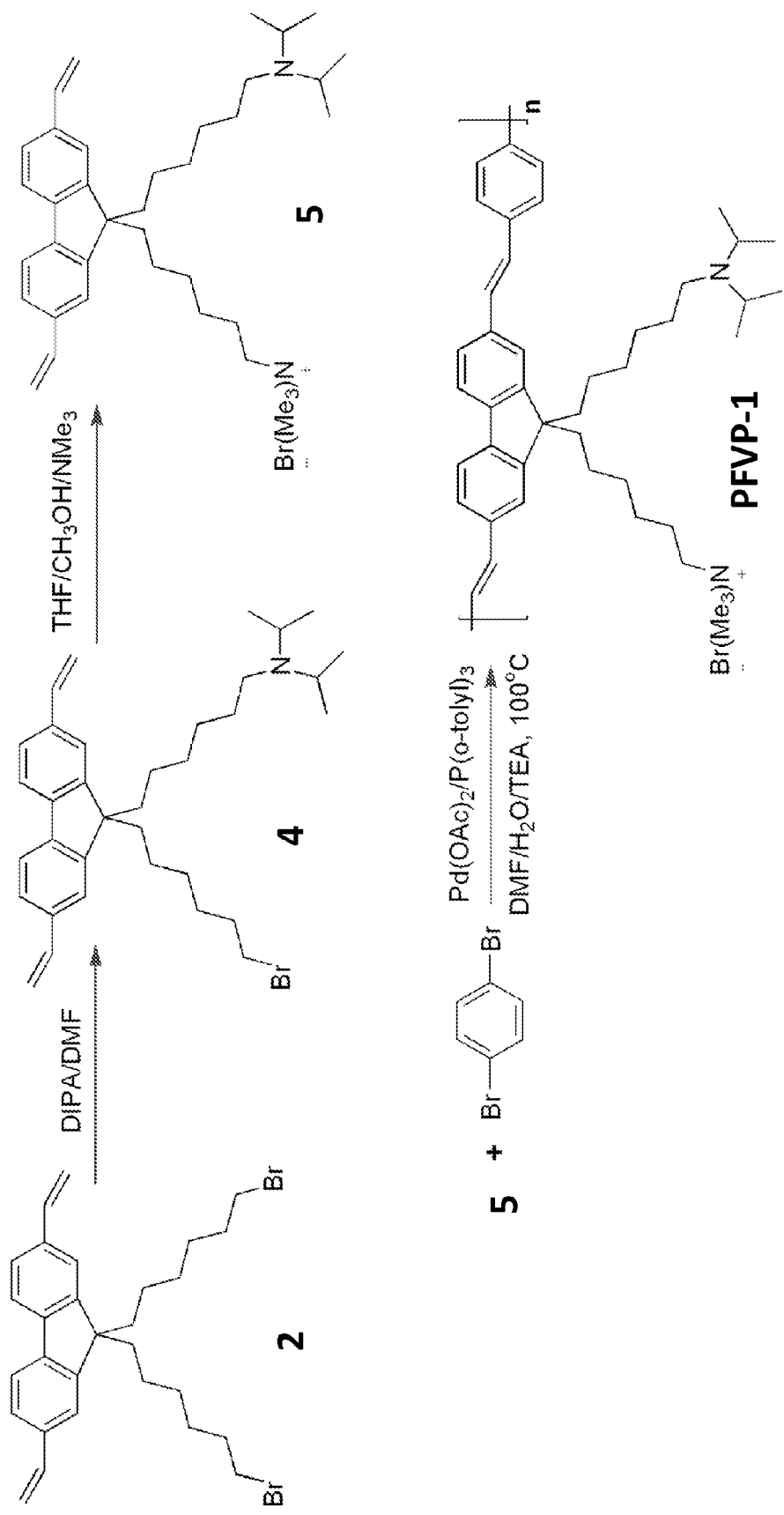
FIG. 18. A synthetic entry to one embodiment of PFVP-1.

FIG. 18. A Schlenk tube was charged with compound 2 (0.500 g). The tube was sealed, degassed and emerged in liquid nitrogen and 5.0 mL of DMF and 1.6 mL diisopropylamine (DIPA) were added. The mixture was freezed-degassed-melt for three times. The solution was stirred and heated at 105° C. for 1 h and 40 mins under argon. It was subsequently diluted with 150 mL dichloromethane and washed by 50 mL water for 5 times and dried over anhydrous MgSO₄. After solvent removal, the residue was purified by silica-gel chromatography using n-hexane:ethyl acetate=10:1, followed by ethyl acetate: methanol=100:1 as the eluent to afford 4 (0.320 g, 61.7%) as viscous oil.

Synthesis of 9-(6'-(N,N,N,-trimethylammonium)-hexyl)-9'-(diisopropylaminohexyl)-2,7-bromide (5)

FIG. 18. Condensed trimethylamine (2 mL) was added dropwise to a solution of monomer 4 (300 mg) in THF (5 mL) at −78° C. The mixture was allowed to warm to room temperature and stirred for 24 hours. Methanol (5 mL) was subsequently added and the mixture was cooled to −78° C., additional trimethylamine (2 mL) was added. The mixture was stirred at room temperature for another 8 hours. The solvent was removed to afford 5 (310 mg, 94%) as a foam-like compound after drying.

Synthesis of PFVP-1

FIG. 18. A Schlenk tube was charged with 5 (140 mg, 0.212 mmol), 1,4-dibromobenzene (50 mg, 0.212 mmol), Pd(OAc)₂ (2 mg, 9 µmmol) and P(o-tolyl)₃ (15 mg, 49 µmol) before it was sealed with a rubber septum. The Schlenk tube was degassed with three vacuum-argon cycles to remove air. Then, DMF (1 mL), H₂O (0.5 mL), and triethylamine (1 mL) was added to the Schlenk tube and the mixture was frozen, evacuated, and thawed three times to further remove air. The mixture was stirred and heated at 105° C. for 1.5 hours under nitrogen. It was then filtered through 0.22 µm syringe driven filter and the filtrate was poured into acetone. The precipitate was collected and dissolved in methanol. Finally, the polymer was purified by dialysis against Mill-Q water using a 6.5 kDa molecular weight cutoff membrane for 5 days. After freeze-drying, PFVP-1 (116 mg, 81%) was obtained as greenish fibers.

Synthesis of PFVP-1-NH₂

Figure 19:
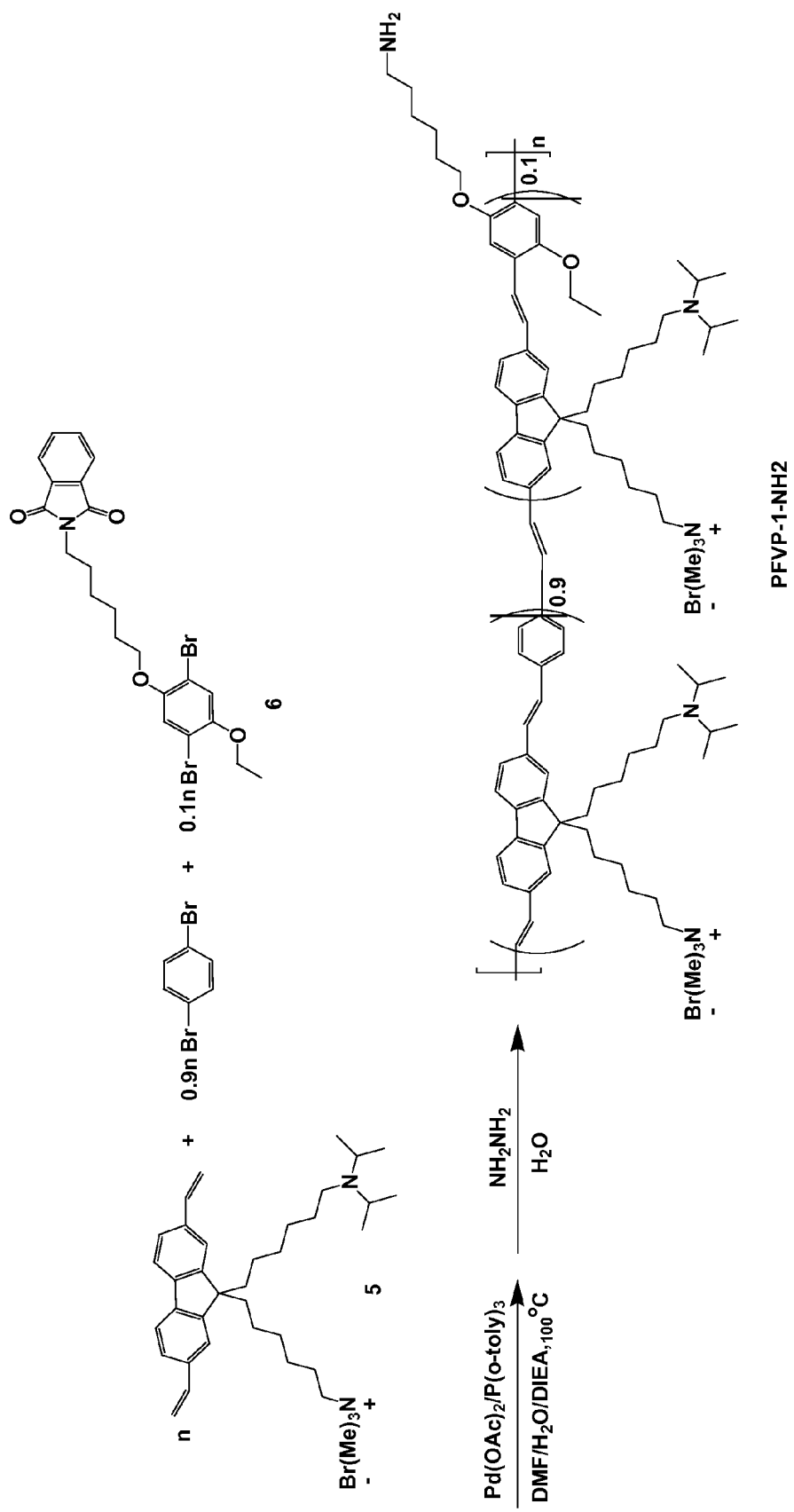
FIG. 19. A synthetic entry to one embodiment of PFVP-1-NH$_2$.

FIG. 19. A Schlenk tube was charged with 5 (110 mg, 0.226 mmol), 1,4-dibromobenzene (37.44 mg, 0.159 mmol), 6 (9.26 mg, 0.0176 mmol), Pd(OAc)₂ (2 mg, 9 µmmol) and P(o-tolyl)₃ (15 mg, 49 µmol) before it was sealed with a rubber septum. The Schlenk tube was degassed with three vacuum-argon cycles to remove air. Then, DMF (1.8 mL), H₂O (0.5 mL), and diisopropylethylamine (0.8 mL) was added to the Schlenk tube and the mixture was frozen, evacuated, and thawed three times to further remove air. The mixture was stirred and heated at 105° C. for 1.5 hours under nitrogen. It was then filtered through 0.22 µm syringe driven filter and the filtrate was poured into acetone. The precipitate was collected and dissolved in methanol. Finally, the polymer was purified by dialysis against Mill-Q water using a 6.5 kDa molecular weight cutoff membrane for 5 days. After freeze-drying, 103 mg (yield: 77.2%) of amine protected polymer was obtained as yellowish fibers. Subsequently, (30 mg, 0.051 mmol) of the obtained polymer was dissolved in 5 mL of water in a round bottom flask, and 2 mL of hydrazine (2 mL) was added dropwise. The mixture was stirred for 24 hours and was purified by dialysis against Mill-Q water using a 6.5 kDa molecular weight cutoff membrane for 3 days. After freeze-drying, PFVP-NH2 (25.0 mg, 85.2%) was obtained.

An objective of this invention is to develop an ultra sensitive detection method for DNA and other biomolecules. The key factors to improve the detection sensitivity of microarray include the increased density of captured target DNA and the reduced background signal. The present invention focuses on solving both problems simultaneously. First, polystyrene beads have been employed instead of conventional planar microarrays. Although planar microarrays have well-established protocols for immobilization of probe DNA and hybridization, the immobilization of probe DNA on microspheres is proved to be more efficient due to the larger surface areas for microspheres. When the probe DNA molecules are printed on the planar surface using a spot machine, the density of the probe DNA is mainly dependent on the surface properties of the plane substrates. Insufficient, smearing and spreading may result in low hybridization efficiency and irregular shapes of the spots. As the total fluorescence is based on the quantity of the hybridized targets, low hybridization efficiency indicates less target binding to the probe, which will in turn result in low signals. As a consequence, the substrate must be carefully modified to avoid the above mentioned shortcomings. The patterned PS beads provide high surface areas for immobilization of the probe DNA and therefore enable increased number of target binding to the capture DNA, which results in high signal for both label-free and dye-labeled assays. Furthermore, PS beads are restricted within micro-wells, which make regular spots for fluorescence detection. To form the pattern of PS in a closely packed arrangement is the critical step in the method described herein. An array of etched micro-wells is fabricated on the surface of silicon wafers. Inside the micro-wells, amino-silane is grafted on the surface while the PEG is modified on the surfaces outside the micro-wells. When the suspension of PS beads is spread on the wafer surface, the hydrophilic surfaces inside the etched micro-wells make carboxylate PS beads easily settle down and the amino groups are then attached to the carboxylate modified PS beads. By removing the excess solution, the PS beads form a monolayer inside the micro-well due to the capillary force and the special structure of the micro-wells. Meanwhile, there are no PS beads left on the surface outside the micro-wells as the surface outside of the well is highly hydrophobic.

The issue of background is very important in microarray, especially in detecting DNA at low concentrations. To reduce the background signal, novel conjugated polymers with low fluorescence at detection wavelength have been developed. For FRET applications, it is highly desirable that the polymer emission tail does not overlap with the detection wavelength. As a consequence, the conjugated polymers should possess the following properties: 1) the excitation wavelength matches the commercial laser resource 2) the emission band overlaps with the absorption spectrum of the acceptor 3) the polymers must have very low or no emission at the detection wavelength. A novel cationic conjugated polymer (PFVP) was synthesized to meet the requirements for detection in the microarray format. The maximum absorption wavelength of PFVP is 425 nm, which is compatible with commercial instruments (408 and 457 laser excitation). Furthermore, the emission of PFVP matches the fluorescent dye Cy5 for FRET application. Importantly, the fluorescent signal of PFVP at detection wavelength (640LP) is extremely weak that it is almost not detectable under the regular operation conditions.

Another objective of this invention is to develop fast and simple method for label-free DNA detection on beads array. Label-free DNA detection using conjugated polymers can provide a fast and simple approach for DNA detection on an array format. The difficulty for label-free detection is due to the limited number of conjugated polymers available that could be excited by commercial instruments.

The potential application of this invention is to provide an ultra sensitive detection method for nucleic acid detection. The limit of detection of present method is as low as $10^{-17}$ M of dye labeled target DNA in the presence of a conjugated polymer. With this detection sensitivity, DNA can be detected without PCR amplification. Moreover, the analytes can be extended to other biomolecules, such as protein and peptide, etc.

The current gene detection strategy requires PCR amplification of target copies before detection. This invention provides a polymer amplified beads array strategy that can detect several hundreds of copies of DNA, which does not require PCR amplification prior to detection, which solves the problem of low detection sensitivity for the currently available commercial methods. The advantages of the invention over other methods are the high detection sensitivity and low background signal.

Another objective of this invention is to develop fast and simple method for label free protein detection. Label-free protein detection using CPs can provide a fast and simple approach for protein detection on an array format. As there is almost no method available to amplify protein prior to detection, the demonstrated methods described herein can be used for real-time label free protein detection with high detection sensitivity.

Another objective of this invention is to present CP compositions which can be used to create highly sensitive biological probes. This could include panels of antibodies for flow cytometry markers on cells or ranges of oligonucleotide conjugates for the detection of nucleic acid targets. Methods for preparing these CPs and conjugates are also presented. Examples of the use of CP biomolecule conjugates are also demonstrated.

This invention can be commercialized as a gene detection kit for laboratory, clinic use and point of care test.

Any water-soluble PFVP (cationic, anionic or neutral) derivatives with the same or less charge density. Any polymer with the same backbone but different side chain cross-linking degree. Any polymer with the same polymer backbone, but different side chains. Any polymer with the same structure, but different counter ions. Any polymer with the same structure, but different linker groups for further conjugation.

Method Used to Synthesize the Crosslinked Polymer.

The substrate produced by the present invent include, but are not limit to, silicon wafer, glass, plastic, etc The microsphere pattern produced by the present invent include, but are not limit to, polystyrene beads, silica nanoparticle, magnetic beads, etc.

The detection produced by the present invent include, but are not limit to, confocal microscopy, confocal scanner, flow cytometer, plate reader and other optical detector.

The analytes produced by the present invent include, but are not limit to, single strand DNA, oligo, peptide, protein, etc.

The methods and materials described herein can be adapted for use with protein detection assays. The polymers described herein can be further modified with functional groups that allow further conjugation to dyes, receptors or any other recognition element. The use of various counterions with anionic and cationic polymers of the present invention is contemplated. Multiphoton excitation for higher detection sensitivity can be achieved.

In general, another aspect of the invention includes energy transfer by conjugated polymers to a bound dye or dye on a sensor which can be a biomolecule including a bioconjugate (e.g., an antibody).

Figure 20:
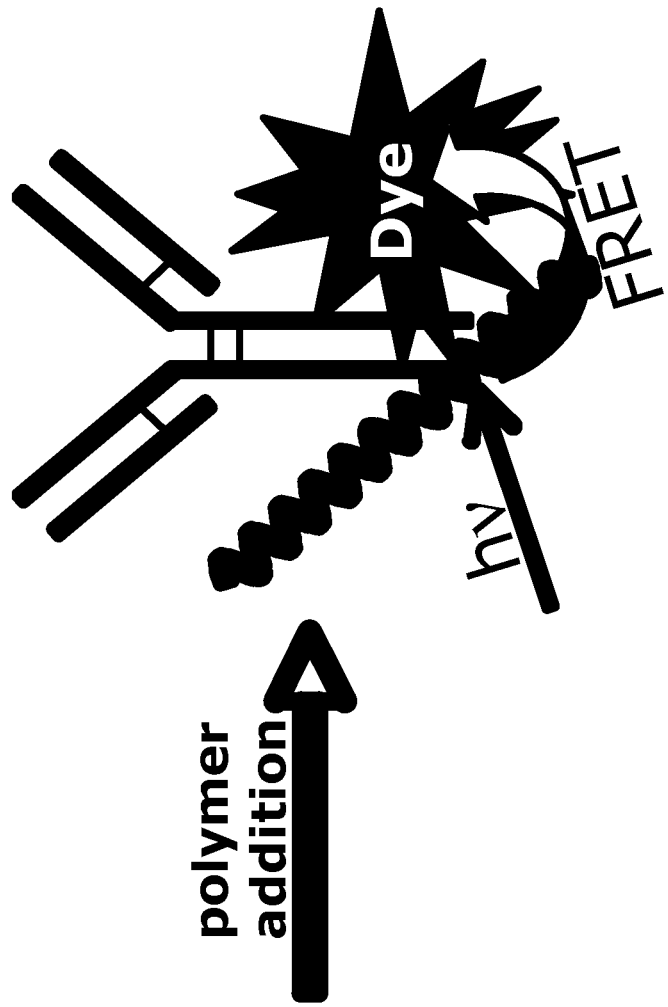
FIG. 20. Schematic of binding of a conjugated polymer in one embodiment of the invention.

In one embodiment an approach modifying a format as followed in relation to nucleic acid sensor assays as described in Gaylord, Heeger, and Bazan, J. Am. Chem. Soc., 2003 can be followed. Specifically, signal amplification of conjugated polymers can be based on binding events to indicate a hybridization event. Any established conjugated polymers can be chosen as the donor, and one or more dye, preferably a dye with a history of efficient energy transfer, for example, fluorescein and Cy3, can be chosen as the acceptors. It is envisioned that the dye can be directly conjugated to a sensor molecule. As shown schematically in FIG. 20, the sensor can be a biomolecule (e.g., an antibody) in a solution or on a substrate, to which conjugated polymers can be added. In the embodiment shown in FIG. 20, a dye can be covalently linked (bioconjugated) to an antibody (Y-shaped structure), which possesses a net negative charge. Addition of conjugated polymers (shown as wavy lines) can result in interaction or binding between the conjugated polymer and the antibody, bringing the conjugated polymers and dye into close proximity. Interaction or binding can be achieved by any known method including, but not limited to, avidin/biotin labeling. Distance requirements for fluorescence resonance energy transfer (FRET) can thus be met, and excitation of the polymer with light (shown as hv) results in amplified dye emission. It is envisioned that the conjugated polymers can be excited at a wavelength where the dye does not have significant absorbance. In one embodiment the dye emission can be at a longer wavelength than the conjugated polymer emission. In use it is envisioned that an assay method can include the steps of providing a sample that is suspected of containing a target biomolecule, providing a sensor conjugated to a signaling chromophore and capable of interacting with the target biomolecule, providing a conjugated polymer that interacts with the sensor and upon excitation is capable of transferring energy to the sensor signaling chromophore and contacting the sample with the sensor and the conjugated polymer in a solution under conditions in which the sensor can bind to the target biomolecule if present. Next, the method can include applying a light source to the sample that can excite the conjugated polymer, and detecting whether light is emitted from the signaling chromophore.

As disclosed herein, interaction or binding between conjugated polymers and dye-labeled antibodies can be a viable approach for increasing detection sensitivities, for example of a biomolecule target. In a further embodiment, covalently attaching the conjugated polymers to a dye/biomolecule (e.g., an antibody complex offers several advantages including reduced background and improved energy transfer. In the case of direct linkage to a biomolecule, biorecognition events, rather than interaction or binding events, should govern conjugated polymer presence. In this manner, nonspecific binding of conjugated polymers to biomolecules can be eliminated, reducing any background emission resulting from the conjugated polymer itself. The abovementioned biomolecules include but are not limited to proteins, peptides, affinity ligands, antibodies, antibody fragments, sugars, lipids, and nucleic acids (as hybridization probes and/or aptamers).

In another aspect of the invention are methods of conjugating a polymer to a dye, a biomolecule or a substrate. The CPs with linkers, for example succinimidyl ester (NHS), maleimide, aldehyde or hydrazine, can be reacted with dyes, substrates, or biomolecules which either have an intrinsic linking site, for example amine or carboxylic acid, or are modified with a linker, for example thiol, aldehyde, or hydrazine to produce a polymer conjugated to the dye, substrate, biomolecule or combination thereof.

Conjugation can be by any known method and can include, but is not limited to, chemistry involving maleimide/thiol, hydrazine/aldehyde, succimidylester (NHS or other activated ester)/amine, azides, carboxy/EDC (1-Ethyl-3-[3-dimethylaminopropyl]carbodiimide Hydrochloride)/amine, amine/Sulfo-SMCC (Sulfosuccinimidyl 4-[N-maleimidomethyl] cyclohexane-1-carboxylate)/thiol, and amine/BMPH (N-[β-Maleimidopropionic acid]hydrazide•TFA)/thiol.

Antigen-Antibody Interactions

The interactions between antigens and antibodies are the same as for other non-covalent protein-protein interactions. In general, four types of binding interactions exist between antigens and antibodies: (i) hydrogen bonds, (ii) dispersion forces, (iii) electrostatic forces between Lewis acids and Lewis bases, and (iv) hydrophobic interactions. Certain physical forces contribute to antigen-antibody binding, for example, the fit or complimentary of epitope shapes with different antibody binding sites. Moreover, other materials and antigens may cross-react with an antibody, thereby competing for available free antibody.

Measurement of the affinity constant and specificity of binding between antigen and antibody is a pivotal element in determining the efficacy of an immunoassay, not only for assessing the best antigen and antibody preparations to use but also for maintaining quality control once the basic immunoassay design is in place.

Antibodies

Antibody molecules belong to a family of plasma proteins called immunoglobulins, whose basic building block, the immunoglobulin fold or domain, is used in various forms in many molecules of the immune system and other biological recognition systems. A typical immunoglobulin has four polypeptide chains, containing an antigen binding region known as a variable region and a non-varying region known as the constant region.

Native antibodies and immunoglobulins are usually heterotetrameric glycoproteins of about 150,000 Daltons, composed of two identical light (L) chains and two identical heavy (H) chains. Each light chain is linked to a heavy chain by one covalent disulfide bond, while the number of disulfide linkages varies between the heavy chains of different immunoglobulin isotypes. Each heavy and light chain also has regularly spaced intrachain disulfide bridges. Each heavy chain has at one end a variable domain (VH) followed by a number of constant domains. Each light chain has a variable domain at one end (VL) and a constant domain at its other end. The constant domain of the light chain is aligned with the first constant domain of the heavy chain, and the light chain variable domain is aligned with the variable domain of the heavy chain.

Depending on the amino acid sequences of the constant domain of their heavy chains, immunoglobulins can be assigned to different classes. There are at least five (5) major classes of immunoglobulins: IgA, IgD, IgE, IgG and IgM, and several of these may be further divided into subclasses (isotypes), e.g. IgG-1, IgG-2, IgG-3 and IgG-4; IgA-1 and IgA-2. The subunit structures and three-dimensional configurations of different classes of immunoglobulins are well known. Further details regarding antibody structure, function, use and preparation are discussed in U.S. Pat. No. 6,998,241, issued Feb. 14, 2006, the entire contents of which are incorporated herein by reference.

Sandwich Assays

Antibody or multiple antibody sandwich assays are well known to those skilled in the art including a disclosed in U.S. Pat. No. 4,486,530, issued Dec. 4, 1984, and references noted therein. The structures can be used directly as described or in various sandwich configurations. A sandwich configuration or a sandwich assay refers to the use of successive recognition events to build up layers of various biomolecules and reporting elements to signal the presence of a particular biomolecule, for example a target biomolecule or a target-associated biomolecule. A standard example of this would be the successive use of antibodies. In these assays, a primary antibody binds the target, the secondary antibody binds the primary, a third antibody can bind the secondary and so on. With each successive layer additional reporting groups can be added. Another strategy is using a repetitive addition of alternating layers of two (or more) mutually-recognizable components, or more than two components in a chain-recognition relationship, which comprise one or both of the components in a form of multimeric structure. In such a setup, one or more of the functional group(s) in each of the multimeric structure can be labeled with reporting group(s) and the unoccupied functional group(s) can serve as the recognition site for the other component(s), and this system will subsequently provide a platform for signal amplification. A typical example of this approach is the use of streptavidin-reporter conjugate and biotinylated anti-streptavidin antibody. In such assays, a biotinylated sensor molecule (nucleic acid or antibody) can be used to bind a target biomolecule, which is subsequently recognized by a detection system containing a streptavidin-reporter conjugate and biotinylated anti-streptavidin antibody. The sandwich structure in this case can be built up by successive rounds of biotinylated antibodies and labeled streptavidin complexes interaction to achieve the signal amplification. With an additional conjugation of a conjugated polymer to either the biotinylated antibody or the streptavidin-reporter complex, it is possible to further increase the signal output. In essence, the integration of a conjugated polymer in this type of signal amplification system can further amplify signals to a higher level.

The bioconjugated polymer complexes described in FIGS. 6, 7, 8, 14, 20 and 21 can be used to create optically enhanced sandwich assays by directly integrating a light harvesting conjugated polymer into commonly utilized recognition elements. The benefits of the conjugated polymer conjugated structures can also be applied directly to the primary target recognition elements without the need for successive recognition elements. For example, a primary antibody can be directly conjugated to polymer-dye complex. Such a complex can be used to directly probe the presence of a target biomolecule.

Polynucleotides

Amplified target polynucleotides may be subjected to post amplification treatments. For example, in some cases, it may be desirable to fragment the target polynucleotide prior to hybridization in order to provide segments which are more readily accessible. Fragmentation of the nucleic acids can be carried out by any method producing fragments of a size useful in the assay being performed; suitable physical, chemical and enzymatic methods are known in the art.

An amplification reaction can be performed under conditions which allow the sensor polynucleotide to hybridize to the amplification product during at least part of an amplification cycle. When the assay is performed in this manner, real-time detection of this hybridization event can take place by monitoring for light emission during amplification.

Real time PCR product analysis (and related real time reverse-transcription PCR) provides a well-known technique for real time PCR monitoring that has been used in a variety of contexts, which can be adapted for use with the methods described herein (see, Laurendeau et al. (1999) "TaqMan PCR-based gene dosage assay for predictive testing in individuals from a cancer family with INK4 locus haploinsufficiency" Clin Chem 45(7):982-6; Laurendeau et al. (1999) "Quantitation of MYC gene expression in sporadic breast tumors with a real-time reverse transcription-PCR assay" Clin Chem 59(12):2759-65; and Kreuzer et al. (1999) "Light-Cycler technology for the quantitation of bcr/abl fusion transcripts" Cancer Research 59(13):3171-4, all of which are incorporated by reference).

Samples

In principle, a sample can be any material suspected of containing an aggregant capable of causing aggregation of the aggregation sensor. In some embodiments, the sample can be any source of biological material which comprises polynucleotides that can be obtained from a living organism directly or indirectly, including cells, tissue or fluid, and the deposits left by that organism, including viruses, mycoplasma, and fossils. The sample may comprise an aggregant prepared through synthetic means, in whole or in part. Typically, the sample is obtained as or dispersed in a predominantly aqueous medium. Nonlimiting examples of the sample include blood, urine, semen, milk, sputum, mucus, a buccal swab, a vaginal swab, a rectal swab, an aspirate, a needle biopsy, a section of tissue obtained for example by surgery or autopsy, plasma, serum, spinal fluid, lymph fluid, the external secretions of the skin, respiratory, intestinal, and genitourinary tracts, tears, saliva, tumors, organs, samples of in vitro cell culture constituents (including but not limited to conditioned medium resulting from the growth of cells in cell culture medium, putatively virally infected cells, recombinant cells, and cell components), and a recombinant library comprising polynucleotide sequences.

The sample can be a positive control sample which is known to contain the aggregant or a surrogate therefore. A negative control sample can also be used which, although not expected to contain the aggregant, is suspected of containing it (via contamination of one or more of the reagents) or another component capable of producing a false positive, and is tested in order to confirm the lack of contamination by the target polynucleotide of the reagents used in a given assay, as well as to determine whether a given set of assay conditions produces false positives (a positive signal even in the absence of target polynucleotide in the sample).

The sample can be diluted, dissolved, suspended, extracted or otherwise treated to solubilize and/or purify any target polynucleotide present or to render it accessible to reagents which are used in an amplification scheme or to detection reagents. Where the sample contains cells, the cells can be lysed or permeabilized to release the polynucleotides within the cells. One step permeabilization buffers can be used to lyse cells which allow further steps to be performed directly after lysis, for example a polymerase chain reaction.

Organic Dyes

Organic dyes include signaling chromophores and fluorophores. In some embodiments, a signaling chromophore or fluorophore may be employed, for example to receive energy transferred from an excited state of an optically active unit, or to exchange energy with a labeled probe, or in multiple energy transfer schemes. Fluorophores useful in the inventions described herein include any substance which can absorb energy of an appropriate wavelength and emit or transfer energy. For multiplexed assays, a plurality of different fluorophores can be used with detectably different emission spectra. Typical fluorophores include fluorescent dyes, semiconductor nanocrystals, lanthanide chelates, and green fluorescent protein.

Exemplary fluorescent dyes include fluorescein, 6-FAM, rhodamine, Texas Red, tetramethylrhodamine, a carboxyrhodamine, carboxyrhodamine 6G, carboxyrhodol, carboxyrhodamine 110, Cascade Blue, Cascade Yellow, coumarin, Cy2®, Cy3®, Cy3.5®, Cy5®, Cy5.5®, Cy-Chrome, DyLight 350, DyLight 405, DyLight 488, DyLight 549, DyLight 594, DyLight 633, DyLight 649, DyLight 680, DyLight 750, DyLight 800, phycoerythrin, PerCP (peridinin chlorophyll-a Protein), PerCP-Cy5.5, JOE (6-carboxy-4',5'-dichloro-2',7'-dimethoxyfluorescein), NED, ROX (5-(and -6)-carboxy-X-rhodamine), HEX, Lucifer Yellow, Marina Blue, Oregon Green 488, Oregon Green 500, Oregon Green 514, Alexa Fluor® 350, Alexa Fluor® 430, Alexa Fluor® 488, Alexa Fluor® 532, Alexa Fluor® 546, Alexa Fluor® 568, Alexa Fluor® 594, Alexa Fluor® 633, Alexa Fluor® 647, Alexa Fluor® 660, Alexa Fluor® 680, 7-amino-4-methylcoumarin-3-acetic acid, BODIPY® FL, BODIPY® FL-Br$_2$, BODIPY® 530/550, BODIPY® 558/568, BODIPY® 564/570, BODIPY® 576/589, BODIPY® 581/591, BODIPY® 630/650, BODIPY® 650/665, BODIPY® R6G, BODIPY® TMR, BODIPY® TR, conjugates thereof, and combinations thereof. Exemplary lanthanide chelates include europium chelates, terbium chelates and samarium chelates.

A wide variety of fluorescent semiconductor nanocrystals ("SCNCs") are known in the art; methods of producing and utilizing semiconductor nanocrystals are described in: PCT Publ. No. WO 99/26299 published May 27, 1999, inventors Bawendi et al.; U.S. Pat. No. 5,990,479 issued Nov. 23, 1999 to Weiss et al.; and Bruchez et al., Science 281:2013, 1998. Semiconductor nanocrystals can be obtained with very narrow emission bands with well-defined peak emission wavelengths, allowing for a large number of different SCNCs to be used as signaling chromophores in the same assay, optionally in combination with other non-SCNC types of signaling chromophores.

Exemplary polynucleotide-specific dyes include acridine orange, acridine homodimer, actinomycin D, 7-aminoactmomycin D (7-AAD), 9-amino-6-chlor-2-methoxyacridine (ACMA), BOBO™-1 iodide (462/481), BOBO™-3 iodide (570/602), BO-PRO™-1 iodide (462/481), BO-PRO™-3 iodide (575/599), 4',6-diamidino-2-phenylindole, dihydrochloride (DAPI), 4',6-diamidino-2-phenylindole, dihydrochloride (DAPI), 4',6-diamidino-2-phenylindole, dilactate (DAPI, dilactate), dihydroethidium (hydroethidine), dihydroethidium (hydroethidine), dihydroethidium (hydroethidine), ethidium bromide, ethidium diazide chloride, ethidium homodimer-1 (EthD-1), ethidium homodimer-2 (EthD-2), ethidium monoazide bromide (EMA), hexidium iodide, Hoechst 33258, Hoechst 33342, Hoechst 34580, Hoechst S769121, hydroxystilbamidine, methanesulfonate, JOJO™-1 iodide (529/545), JO-PRO™-1 iodide (530/546), LOLO™-1 iodide (565/579), LO-PRO™-1 iodide (567/580), NeuroTrace™ 435/455, NeuroTrace™ 500/525, NeuroTrace™ 515/535, NeuroTrace™ 530/615, NeuroTrace™ 640/660, OliGreen, PicoGreen® ssDNA, PicoGreen® dsDNA, POPO™-1 iodide (434/456), POPO™-3 iodide (534/570), PO-PRO™-1 iodide (435/455), PO-PRO™-3 iodide (539/567), propidium iodide, RiboGreen®, SlowFade®, SlowFade® Light, SYBR® Green I, SYBR® Green II, SYBR® Gold, SYBR® 101, SYBR® 102, SYBR® 103, SYBR® DX, TO-PRO®-1, TO-PRO®-3, TO-PRO®-5, TOTO®-1, TOTO®-3, YO-PRO®-1 (oxazole yellow), YO-PRO®-3, YOYO®-1, YOYO®-3, TO, SYTOX® Blue, SYTOX® Green, SYTOX® Orange, SYTO® 9, SYTO® BC, SYTO® 40, SYTO® 41, SYTO® 42, SYTO® 43, SYTO® 44, SYTO® 45, SYTO® Blue, SYTO® 11, SYTO® 12, SYTO® 13, SYTO® 14, SYTO® 15, SYTO® 16, SYTO® 20, SYTO® 21, SYTO® 22, SYTO® 23, SYTO® 24, SYTO® 25, SYTO® Green, SYTO® 80, SYTO® 81, SYTO® 82, SYTO® 83, SYTO® 84, SYTO® 85, SYTO® Orange, SYTO® 17, SYTO® 59, SYTO® 60, SYTO® 61, SYTO® 62, SYTO® 63, SYTO® 64, SYTO® Red, netropsin, distamycin, acridine orange, 3,4-benzopyrene, thiazole orange, TOMEHE, daunomycin, acridine, pentyl-TOTAB, and butyl-TOTIN. Asymmetric cyanine dyes may be used as the polynucleotide-specific dye. Other dyes of interest include those described by Geierstanger, B. H. and Wemmer, D. E., Annu. Rev. Vioshys. Biomol. Struct. 1995, 24, 463-493, by Larson, C. J. and Verdine, G. L., Bioorganic Chemistry: Nucleic Acids, Hecht, S. M., Ed., Oxford University Press: New York, 1996; pp 324-346, and by Glumoff, T. and Goldman, A. Nucleic Acids in Chemistry and Biology, 2$^{nd}$ ed., Blackburn, G. M. and Gait, M. J., Eds., Oxford University Press: Oxford, 1996, pp 375-441. The polynucleotide-specific dye may be an intercalating dye, and may be specific for double-stranded polynucleotides.

The term "green fluorescent protein" refers to both native *Aequorea* green fluorescent protein and mutated versions that have been identified as exhibiting altered fluorescence characteristics, including altered excitation and emission maxima, as well as excitation and emission spectra of different shapes (Delagrave, S. et al. (1995) Bio/Technology 13:151-154; Heim, R. et al. (1994) Proc. Natl. Acad. Sci. USA 91:12501-12504; Heim, R. et al. (1995) Nature 373: 663-664). Delgrave et al. isolated mutants of cloned *Aequorea victoria* GFP that had red-shifted excitation spectra. Bio/Technology 13:151-154 (1995). Heim, R. et al. reported a mutant (Tyr66 to His) having a blue fluorescence (Proc. Natl. Acad. Sci. (1994) USA 91:12501-12504).

Substrates

In some embodiments, an assay component can be located upon a substrate. The substrate can comprise a wide range of material, either biological, nonbiological, organic, inorganic, or a combination of any of these. For example, the substrate may be a polymerized Langmuir Blodgett film, functionalized glass, Si, Ge, GaAs, GaP, SiO$_2$, SiN$_4$, modified silicon, or any one of a wide variety of gels or polymers such as (poly) tetrafluoroethylene, (poly)vinylidenedifluoride, polystyrene, cross-linked polystyrene, polyacrylic, polylactic acid, polyglycolic acid, poly(lactide coglycolide), polyanhydrides, poly (methyl methacrylate), poly(ethylene-co-vinyl acetate), polysiloxanes, polymeric silica, latexes, dextran polymers, epoxies, polycarbonates, or combinations thereof. Conducting polymers and photoconductive materials can be used.

Substrates can be planar crystalline substrates such as silica based substrates (e.g. glass, quartz, or the like), or crystalline substrates used in, e.g., the semiconductor and microprocessor industries, such as silicon, gallium arsenide, indium doped GaN and the like, and includes semiconductor nanocrystals.

The substrate can take the form of a photodiode, an optoelectronic sensor such as an optoelectronic semiconductor chip or optoelectronic thin-film semiconductor, or a biochip. The location(s) of probe(s) on the substrate can be addressable; this can be done in highly dense formats, and the location(s) can be microaddressable or nanoaddressable.

Silica aerogels can also be used as substrates, and can be prepared by methods known in the art. Aerogel substrates may be used as free standing substrates or as a surface coating for another substrate material.

The substrate can take any form and typically is a plate, slide, bead, pellet, disk, particle, microparticle, nanoparticle, strand, precipitate, optionally porous gel, sheets, tube, sphere, container, capillary, pad, slice, film, chip, multiwell plate or dish, optical fiber, etc. The substrate can be any form that is rigid or semi-rigid. The substrate may contain raised or depressed regions on which an assay component is located. The surface of the substrate can be etched using well known techniques to provide for desired surface features, for example trenches, v-grooves, mesa structures, or the like.

Surfaces on the substrate can be composed of the same material as the substrate or can be made from a different material, and can be coupled to the substrate by chemical or physical means. Such coupled surfaces may be composed of any of a wide variety of materials, for example, polymers, plastics, resins, polysaccharides, silica or silica-based materials, carbon, metals, inorganic glasses, membranes, or any of the above-listed substrate materials. The surface can be optically transparent and can have surface Si—OH functionalities, such as those found on silica surfaces.

The substrate and/or its optional surface can be chosen to provide appropriate characteristics for the synthetic and/or detection methods used. The substrate and/or surface can be transparent to allow the exposure of the substrate by light applied from multiple directions. The substrate and/or surface may be provided with reflective "mirror" structures to increase the recovery of light.

The substrate and/or its surface is generally resistant to, or is treated to resist, the conditions to which it is to be exposed in use, and can be optionally treated to remove any resistant material after exposure to such conditions.

Polynucleotide probes can be fabricated on or attached to the substrate by any suitable method, for example the methods described in U.S. Pat. No. 5,143,854, PCT Publ. No. WO 92/10092, U.S. patent application Ser. No. 07/624,120, filed Dec. 6, 1990 (now abandoned), Fodor et al., Science, 251: 767-777 (1991), and PCT Publ. No. WO 90/15070). Techniques for the synthesis of these arrays using mechanical synthesis strategies are described in, e.g., PCT Publication No. WO 93/09668 and U.S. Pat. No. 5,384,261.

Still further techniques include bead based techniques such as those described in PCT Appl. No. PCT/US93/04145 and pin based methods such as those described in U.S. Pat. No. 5,288,514.

Additional flow channel or spotting methods applicable to attachment of sensor polynucleotides to the substrate are described in U.S. patent application Ser. No. 07/980,523, filed Nov. 20, 1992, and U.S. Pat. No. 5,384,261. Reagents are delivered to the substrate by either (1) flowing within a channel defined on predefined regions or (2) "spotting" on predefined regions. A protective coating such as a hydrophilic or hydrophobic coating (depending upon the nature of the solvent) can be used over portions of the substrate to be protected, sometimes in combination with materials that facilitate wetting by the reactant solution in other regions. In this manner, the flowing solutions are further prevented from passing outside of their designated flow paths.

Typical dispensers include a micropipette optionally robotically controlled, an ink-jet printer, a series of tubes, a manifold, an array of pipettes, or the like so that various reagents can be delivered to the reaction regions sequentially or simultaneously.

The substrate or a region thereof may be encoded so that the identity of the sensor located in the substrate or region being queried may be determined Any suitable coding scheme can be used, for example optical codes, RFID tags, magnetic codes, physical codes, fluorescent codes, and combinations of codes.

Excitation and Detection

Any instrument that provides a wavelength that can excite the aggregation sensor and is shorter than the emission wavelength(s) to be detected can be used for excitation. Commercially available devices can provide suitable excitation wavelengths as well as suitable detection components.

Exemplary excitation sources include a broadband UV light source such as a deuterium lamp with an appropriate filter, the output of a white light source such as a xenon lamp or a deuterium lamp after passing through a monochromator to extract out the desired wavelengths, a continuous wave (cw) gas laser, a solid state diode laser, or any of the pulsed lasers. Emitted light can be detected through any suitable device or technique; many suitable approaches are known in the art. For example, a fluorimeter or spectrophotometer may be used to detect whether the test sample emits light of a wavelength characteristic of the signaling chromophore upon excitation of the conjugated polymer.

Compositions of Matter

Also provided are compositions of matter of any of the molecules described herein in any of various forms. The conjugated polymers and complexes including conjugated polymers as described herein may be provided in purified and/or isolated form. The conjugated polymers and complexes including conjugated polymers may be provided in either crystalline or amorphous form.

The conjugated polymers and complexes including conjugated polymers may be provided in solution, which may be a predominantly aqueous solution, which may comprise one or more of the additional solution components described herein, including without limitation additional solvents, buffers, biomolecules, polynucleotides, fluorophores, etc. In addition, a mixture of CPs in solution is also able to provide improved detection sensitivity as compared to that for a single CP/dye system. The conjugated polymers and complexes including conjugated polymers can be present in solution at a concentration at which a first emission from the first optically active units can be detected in the absence of biomolecule target or a biomolecule associated therewith. The solution may comprise additional components as described herein, including labeled probes such as fluorescently labeled antibodies or polynucleotides, specific for a species of a class of biomolecule target or a biomolecule associated therewith for the conjugated polymers and complexes including conjugated polymers.

The conjugated polymers and complexes including conjugated polymers may be provided in the form of a film. The compositions of matter may be claimed by any property described herein, including by proposed structure, by method of synthesis, by absorption and/or emission spectrum, by elemental analysis, by NMR spectra, or by any other property or characteristic.

In some embodiments expression of a gene is detected in a sample. In a further embodiment, a measured result of detecting a biomolecule target or a biomolecule associated therewith can be used to diagnose a disease state of a patient. In yet another embodiment the detection method of the invention can further include a method of diagnosing a disease state. In a related embodiment, the method of diagnosing a disease can include reviewing or analyzing data relating to the presence of a biomolecule target or a biomolecule associated therewith and providing a conclusion to a patient, a health care provider or a health care manager, the conclusion being based on the review or analysis of data regarding a disease diagnosis. Reviewing or analyzing such data can be facilitated using a computer or other digital device and a network as described herein. It is envisioned that information relating to such data can be transmitted over the network.

In practicing the methods of the present invention, many conventional techniques in molecular biology are optionally utilized. These techniques are well known and are explained in, for example, Ausubel et al. (Eds.) Current Protocols in Molecular Biology, Volumes I, II, and III, (1997), Ausubel et al. (Eds.), Short Protocols in Molecular Biology: A Compendium of Methods from Current Protocols in Molecular Biology, $5^{th}$ Ed., John Wiley & Sons, Inc. (2002), Sambrook et al., Molecular Cloning: A Laboratory Manual, 3rd Ed., Cold Spring Harbor Laboratory Press (2000), Innis et al. (Eds.) PCR Protocols: A Guide to Methods and Applications, Elsevier Science & Technology Books (1990), and Greg T. Hermanson, Bioconjugate Techniques, $2^{nd}$ Ed., Academic Press, Inc. (2008) all of which are incorporated herein by reference.

In one embodiment, a computer-readable medium includes a medium suitable for transmission of a result of an analysis of a biological sample. The medium can include a result regarding a disease condition or state of a subject, wherein such a result is derived using the methods described herein.

Kits

Kits comprising reagents useful for performing described methods are also provided.

In some embodiments, a kit comprises reagents including conjugated polymers or conjugated polymers complexes, bioconjugates, for example, antibodies, and other components as described herein.

The kit may optionally contain one or more of the following: one or more labels that can be incorporated into conjugated polymers or conjugated polymers complexes; and one or more substrates which may or may not contain an array, etc.

The components of a kit can be retained by a housing. Instructions for using the kit to perform a described method can be provided with the housing, and can be provided in any fixed medium. The instructions may be located inside the housing or outside the housing, and may be printed on the interior or exterior of any surface forming the housing that renders the instructions legible. A kit may be in multiplex form for detection of one or more different target biomolecules or biomolecules associated therewith.

ADDITIONAL EXAMPLES

Example 1

Synthesis of monomer, 2,7-dibromo-9,9-di(2',5',8', 11',14',17',23',26',29',32',35'-dodecaoxaoctatriacontan-38'-yl)fluorene (A) for subsequent polymerization

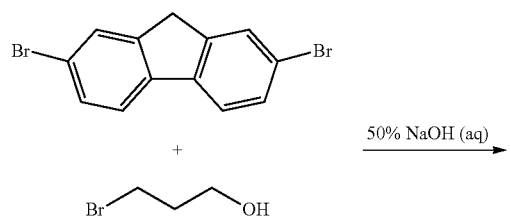

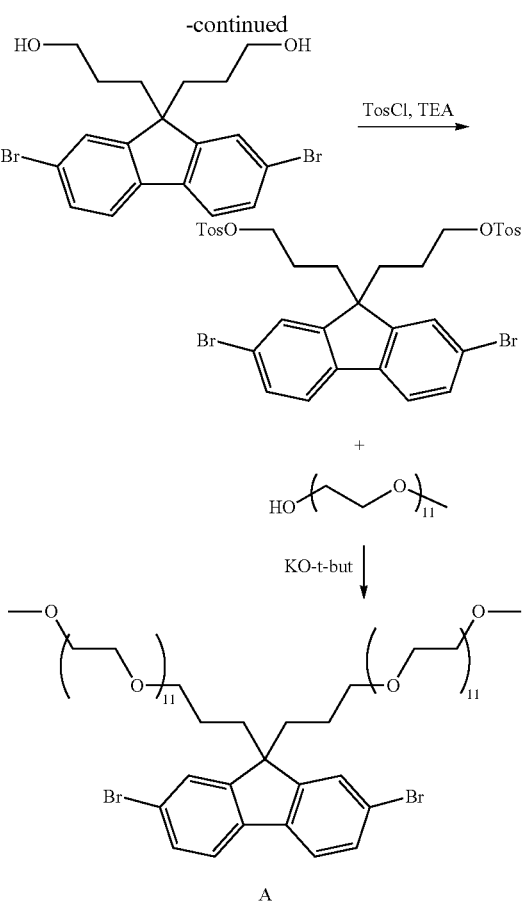

Step 1: 2,7-dibromo-9,9-di(3'-hydroxypropanyl)fluorene 2,7-dibromofluorene (9.72 g, 30 mmol), tetrabutylammonium bromide (300 mg, 0.93 mmol), and DMSO (100 mL) were added to a 3-neck flask under nitrogen (g), followed by the addition of 50% NaOH (15 mL, 188 mmol) via syringe. The mixture was heated to 80° C., and 3-bromopropanol (6.70 mL, 77 mmol) was added dropwise via addition funnel, and the reaction mixture was stirred at 80° C. for another 2 hours. Upon completion, the mixture was cooled to room temperature and quenched with water (250 mL). The aqueous layer was extracted with ethyl acetate (3 150 mL portions). The organic layers were combined, washed with water, then dried over $MgSO_4$, and filtered. The solvent was removed and the residual was recrystallized in chloroform to yield pale yellow needle crystals (9.20 g, 70%).

Step 2: 2,7-dibromo-9,9-di(3'-methylbenzenesulfonatopropanyl)fluorene 2,7-dibromo-9,9-di(3'-hydroxypropanyl)fluorene (500 mg, 1.14 mmol) was dissolved in dichloromethane (5 mL) at 0° C. under nitrogen (g). To the mixture, added p-toluenesulfonyl chloride (650 mg, 3.40 mmol), followed by pyridine (0.39 mL, 4.77 mmol). Allowed reaction to stir at 0° C. and naturally rise to room temperature over night. The reaction was quenched with water (15 mL). Removal of solvent by vacuum resulted solids formation. Filtered off solids to yield white solids (758 mg, 89%).

Step 3: 2,7-dibromo-9,9-di(2',5',8',11',14',17',23',26', 29',32',35'-dodecaoxaoctatriacontan-38'-yl)fluorene (A)

mPEG11 alcohol (770 mg, 1.49 mmol) was dissolved in anhydrous THF (2 mL) at 0° C. under nitrogen. To the mixture, was added potassium tert-butoxide (1.63 mmol, 1.63 mL, 1M in THF). After 10 min stirring, 2,7-dibromo-9,9-di (3'-methylbenzenesulfonatopropanyl)fluorene (504 mg, 0.673 mmol) in 10 mL of THF was added via a syringe. The mixture was allowed to room temperature and stirred overnight. The reaction mixture was diluted with THF. The insoluble inorganic salt was removed by filtration. Concentration of the filtrate yielded crude product, which was purified by column chromatography (DCM-MeOH) to yield a colorless oil (605 mg, 62.5%).

Example 2

Synthesis of a branched monomer, 2,7-dibromo-9,9-bis(3,5-(2,5,8,11,14,17,20,23,26,29,32-undecaoxatetratriacontan-34-yl)benzyl)-9H-fluorene, for subsequent polymerization Step 1: 2,7-dibromo-9,9-bis(3,5-dimethoxybenzyl)-9H-fluorene 2,7-dibromofluorene (4.16 g, 12.8 mmol) and tetrabutylammonium bromide (362 mg, 1.12 mmol) were added to a round bottom flask charged with a Teflon stirbar. Next, 60 mL of dimethylsulfoxide was added to the flask and the mixture was stirred for 5 minutes. A portion of 50% NaOH aqueous solution (5.2 mL) was added followed immediately by 3,5-dimethoxybenzyl bromide (7.14 g, 31 mmol). Over the course of 2 hours the solution changes color from orange to blue. The reaction is stirred overnight. The resulting mixture is slowly poured into 200 mL of water and then extracted with three 100 mL portions of dichloromethane. The organic layers are combined and dried over magnesium sulfate and then filtered. The crude product is purified by column chromatography using hexanes and dichloromethane as eluent to give a pale yellow solid (6.63 g, 79% yield).

Step 2: 2,7-dibromo-9,9-bis(3,5-dihydroxybenzyl)-9H-fluorene 2,7-dibromo-9,9-bis(3,5-dimethoxybenzyl)-9H-fluorene (1.3 g, 2.08 mmol) was added to a round bottom flask charged

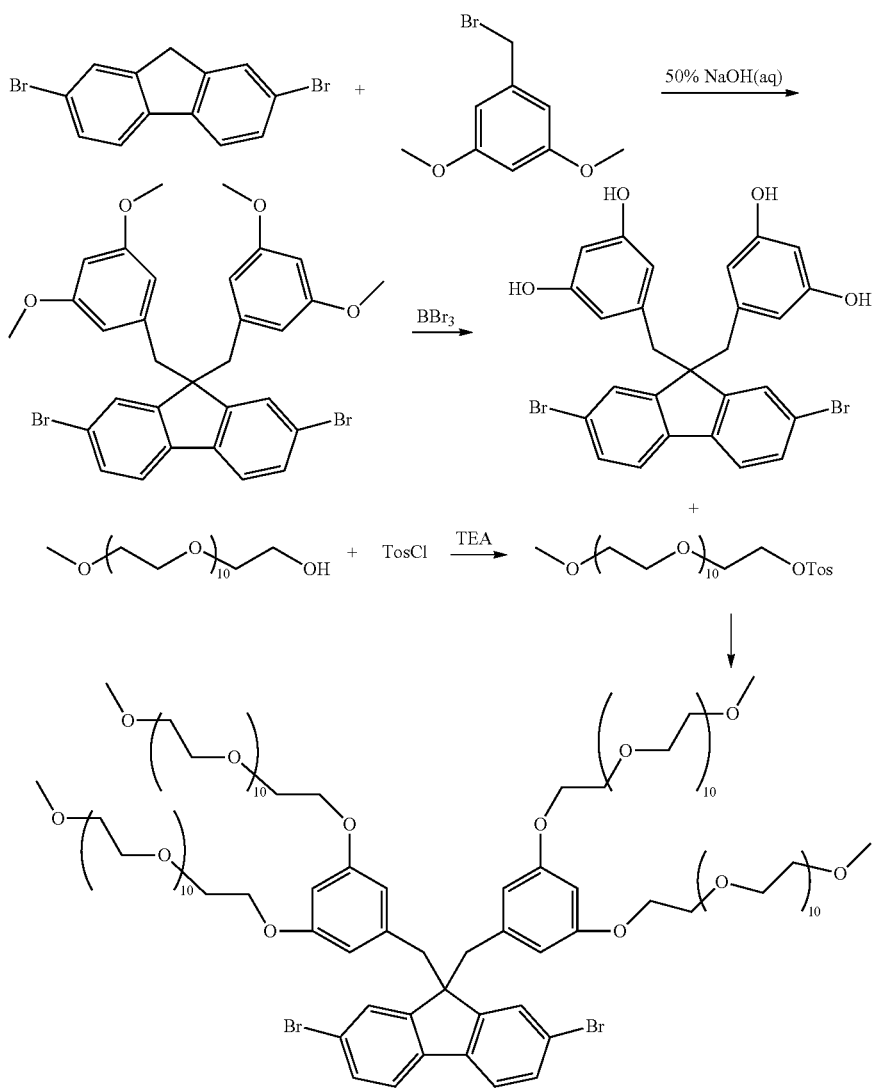

with a stirbar and equipped with a rubber septum. The flask is purged with nitrogen for 10 min. Anhydrous dichloromethane (20 mL) is transferred to the flask via cannula and the mixture is stirred until the solids are completely dissolved. The solution is then cooled with a dry ice/acetone bath for 10 minutes. BBr$_3$ (6.1 mL, 63.3 mmol) is added dropwise via cannula with constant stirring. The bath is allowed to warm to room temperature and the mixture is stirred overnight. The reaction is quenched with the slow addition of 125 mL of water. The solution is then extracted with 3 portions of ethyl acetate (50 mL). The organic layer is dried over MgSO$_3$, filtered, and dried onto silica. Flash chromatography of the crude using ethyl acetate in dichloromethane gives an off-white crystalline solid (800 mg, 68% yield).

Step 3: 2,7-dibromo-9,9-bis(3,5-(2,5,8,11,14,17,20, 23,26,29,32-undecaoxatetratriacontan-34-yl)benzyl)-9H-fluorene 2,7-dibromo-9,9-bis(3,5-dihydroxybenzyl)-9H-fluorene (537 mg, 0.945 mmol), 2,5,8,11,14,17,20,23,26,29,32-undecaoxatetratriacontan-34-yl 4-methylbenzenesulfonate (2.788 g, 4.156 mmol), potassium carbonate (1.57 g, 11.34 mmol) and acetone (80 mL) are transferred to a round bottom flask charged with a Teflon stirbar and equipped with a reflux condenser. The mixture is refluxed with constant stirring overnight. The mixture is then allowed to cool to room temperature and the acetone is removed under vacuum. After extracting with 3 portions of dichloromethane, the organic layer is dried over MgSO$_4$, filtered, and the filtrate is concentrated onto silica. Column chromatography using methanol and dichloromethane affords the product as a slightly colored thick oil (1.69 g, 70% yield).

Example 3

Synthesis of a Neutral Base Polymer

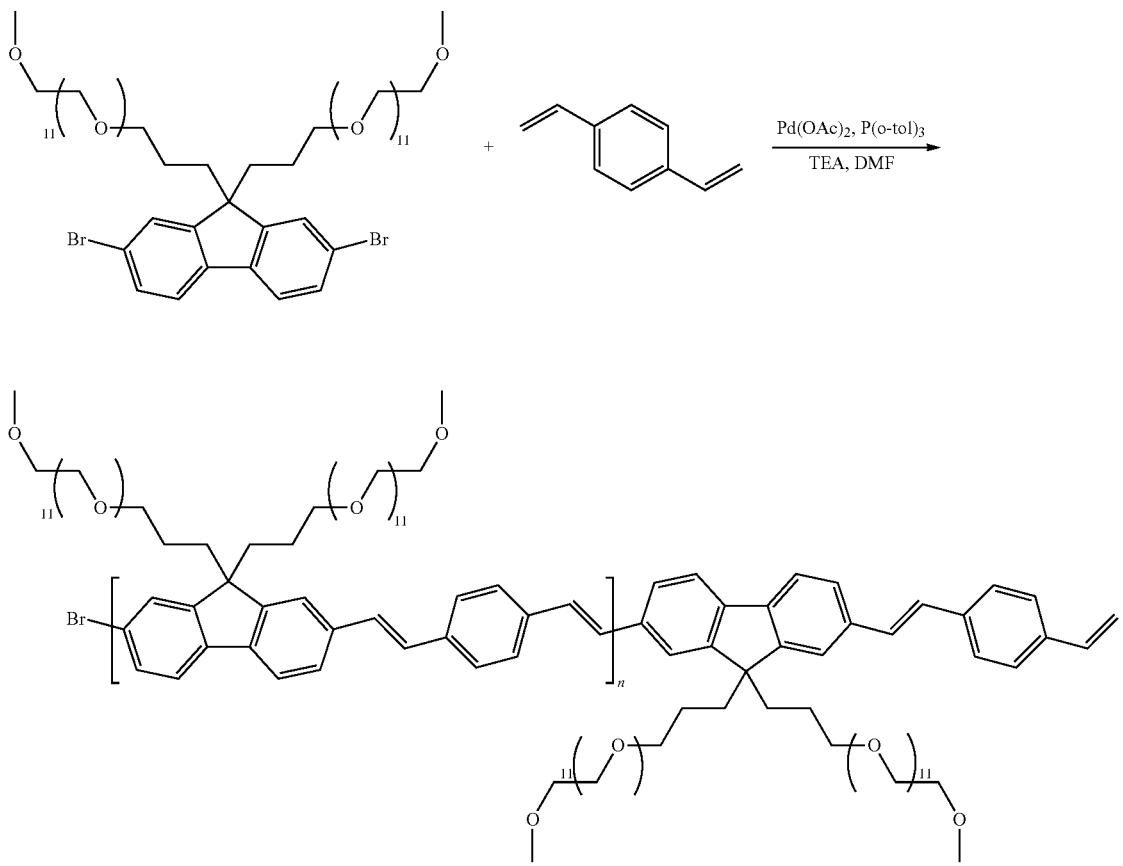

Polymerization 2,7-dibromo-9,9-di(2',5',8',11',14',17',23',26',29',32',35'-dodecaoxaoctatriacontan-38'-yl)fluorene (0.25 mmol), 1,4-divinylbenzene (32.3 mg, 0.25 mmol), palladium acetate (3 mg, 0.013 mmol), tri-ortho-tolylphosphine, (10 mg, 0.033 mmol), and potassium carbonate (162 mg, 1.2 mmol) are combined with 5 mL of DMF in a small round bottom flask charged with a Teflon coated stirbar. The flask is fitted with a needle valve and put in a Schlenk line. The solution is degassed by three cycles of freezing, pumping, and thawing. The mixture is then heated to 100° C. overnight. The polymer can be subsequently reacted with terminal linkers or capping units using similar (in situ) protocols to those provided in Example 5 or by modifying them post polymerization work up as a separate set of reactions.

Example 4

Synthesis of a Branched Polymer

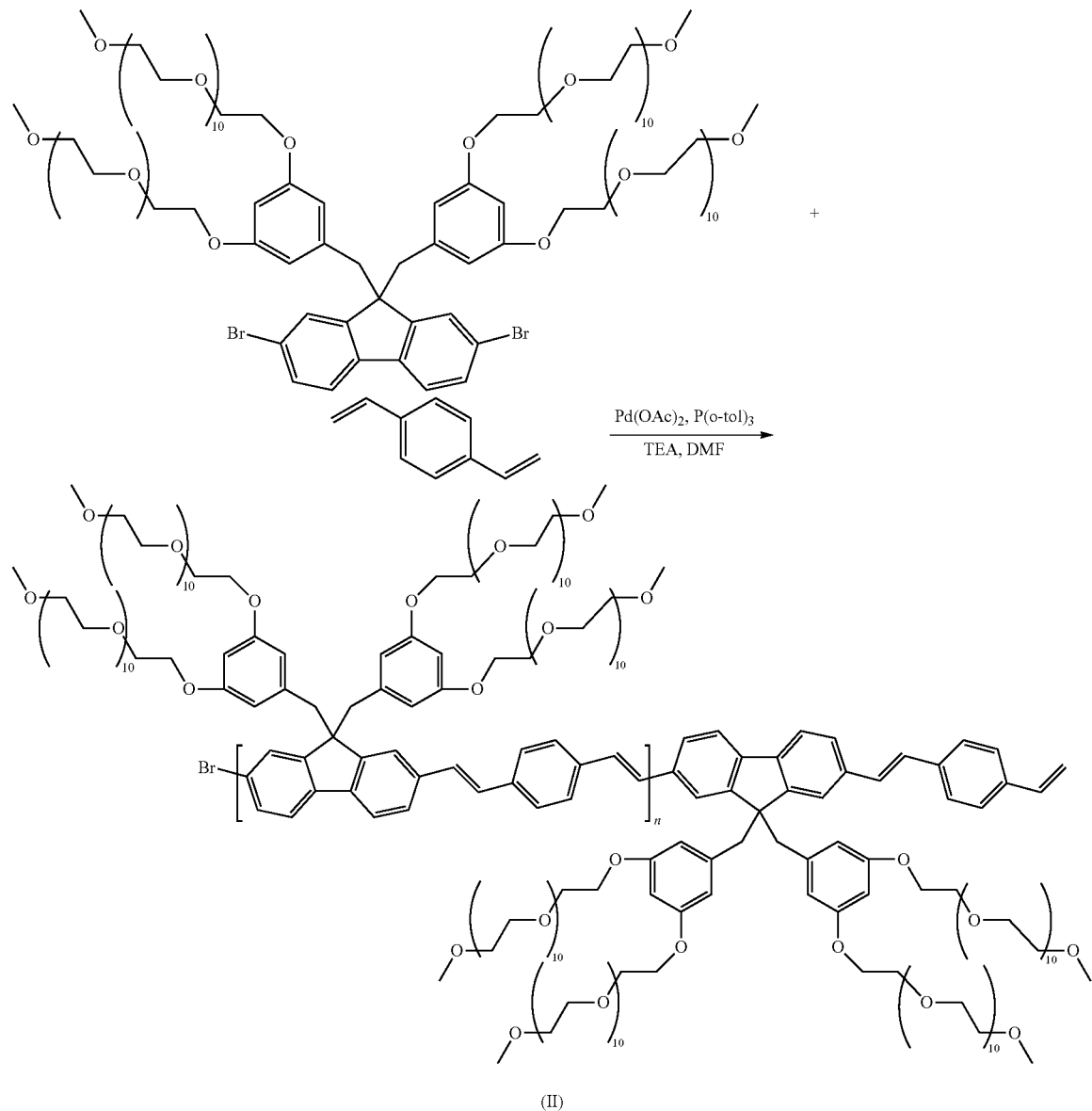

Polymerization 2,7-dibromo-9,9-bis(3,5-(2,5,8,11,14,17,20,23,26,29,32-undecaoxatetratriacontan-34-yl)benzyl)-9H-fluorene (636 mg, 0.25 mmol), 1,4-divinylbenzene (32.3 mg, 0.25 mmol), palladium acetate (3 mg, 0.013 mmol), tri-ortho-tolylphosphine, (10 mg, 0.033 mmol), and potassium carbonate (162 mg, 1.2 mmol) were combined with 5 mL of DMF in a small round bottom flask charged with a Teflon coated stirbar. The flask was fitted with a needle valve and put in a Schlenk line. The solution was degassed by three cycles of freezing, pumping, and thawing. The mixture was then heated to 100° C. overnight. The polymer can be subsequently reacted with terminal linkers or capping units using similar (in situ) protocols to those provided in Example 5 or by modifying them post polymerization work up as a separate set of reactions.

Example 5

Synthesis of a Branched Polymer with Functional Amines for Covalent Conjugation, Poly[2,7-divinyl{9,9-bis(3,5-(2,5,8,11,14,17,20, 23,26,29,32-undecaoxatetratriacontan-34-yl)benzyl)-9H-fluorene}-alt-1,4-benzene-co-4-phenoxybutyl-N-t-butylcarbamate]

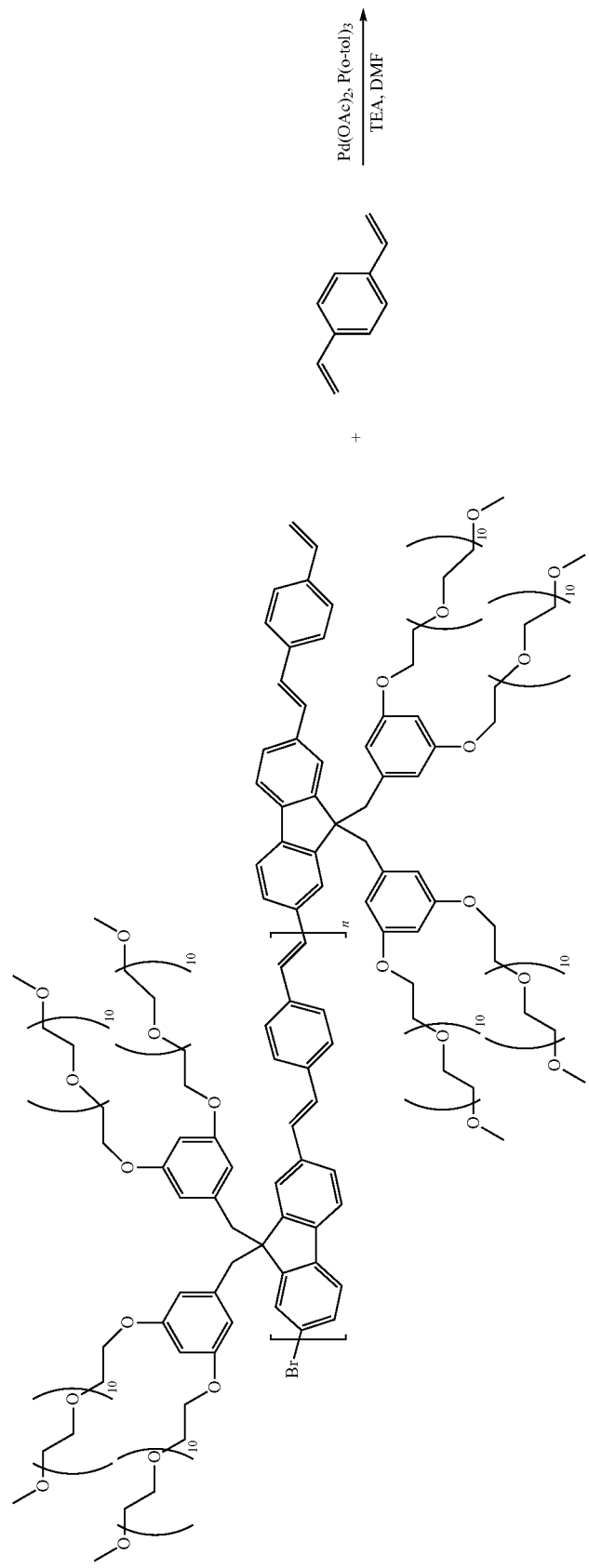

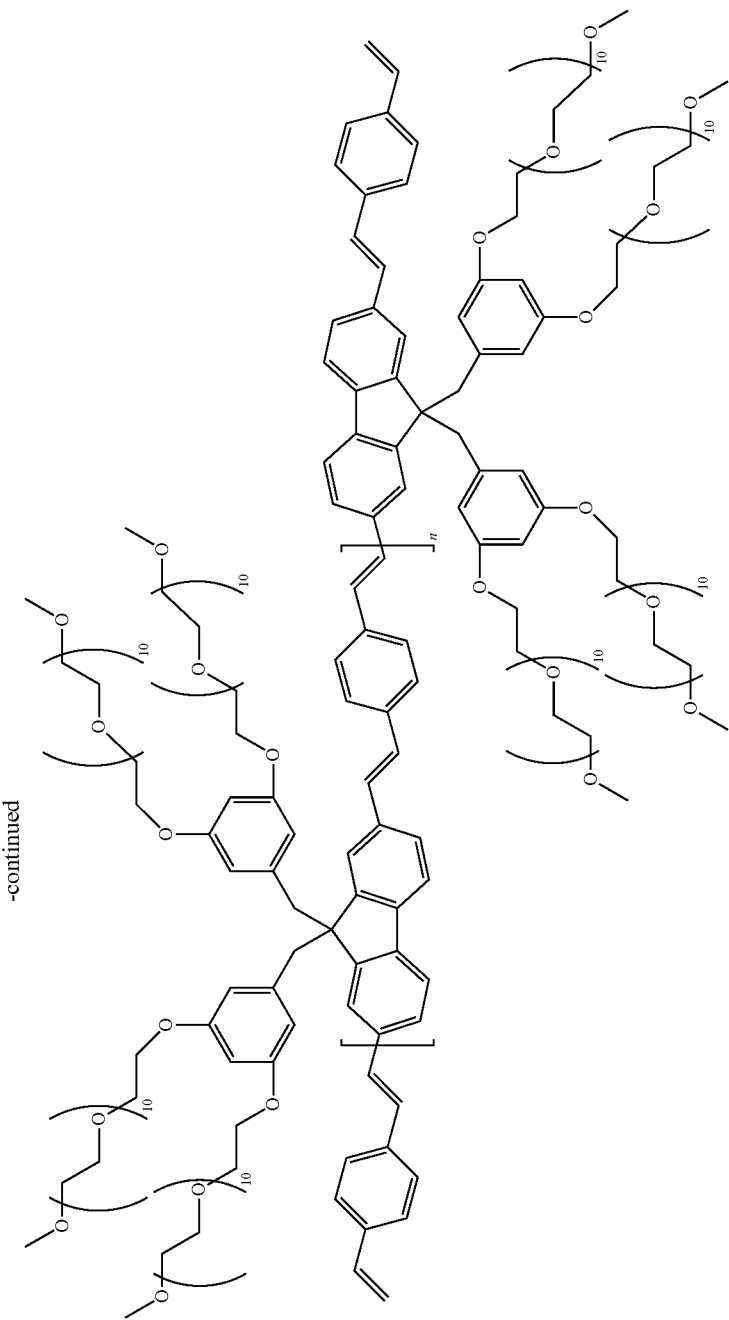

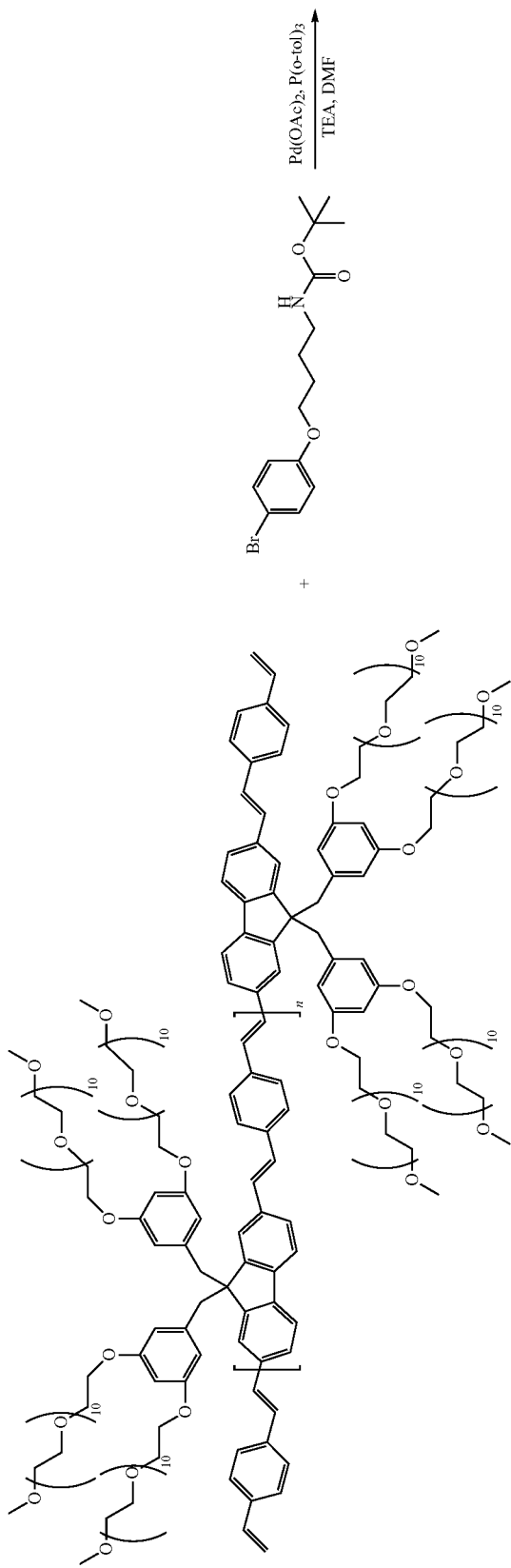

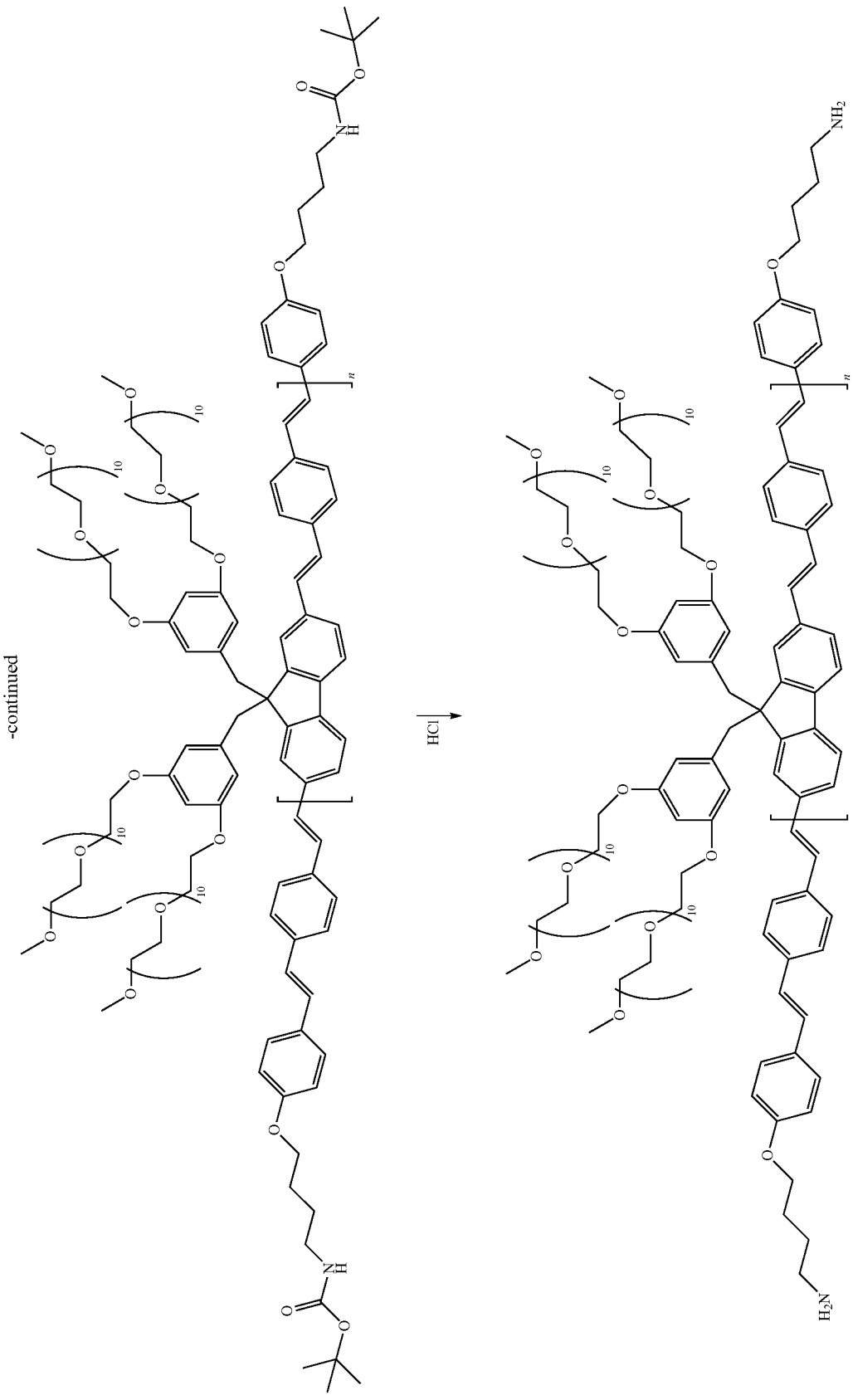

Step 1: Polymerization 2,7-dibromo-9,9-bis(3,5-(2,5,8,11,14,17,20,23,26,29,32-undecaoxatetratriacontan-34-yl)benzyl)-9H-fluorene (636 mg, 0.25 mmol), 1,4-divinylbenzene (32.3 mg, 0.25 mmol), palladium acetate (3 mg, 0.013 mmol), tri-ortho-tolylphosphine, (10 mg, 0.033 mmol), and potassium carbonate (162 mg, 1.2 mmol) were combined with 5 mL of DMF in a small round bottom flask charged with a Teflon coated stirbar. The flask was fitted with a needle valve and put in a Schlenk line. The solution was degassed by three cycles of freezing, pumping, and thawing. The mixture was then heated to 100° C. overnight.

Step 2: Linker Addition

The next morning divinylbenzene (10 mg, 0.077 mmol) was transferred to a small round bottom flask with 1 mL of DMF. The flask was fitted with a needle valve and put in a Schlenk line. The solution was degassed by three cycles of freezing, pumping, and thawing. The solution was transferred via cannula through the needle valves and into the polymerization reaction. After this addition the reaction was allowed to continue at 100° C. overnight. The next day tert-butyl 4-(4-bromophenoxy)butylcarbamate (53 mg, 0.15 mmol) and 1 mL of DMF were transferred to a small round bottom flask. The flask was fitted with a needle valve and put in a Schlenk line. The solution was degassed by three cycles of freezing, pumping, and thawing. The solution was transferred via cannula through the needle valves and into the polymerization reaction. After this addition the reaction was allowed to continue at 100° C. overnight.

Step 3: Work Up

The reaction is then cooled and diluted with 100 mL of water. The aqueous solution was filtered twice through G-6 glass fiber filter paper. The filtrate was evaporated to dryness and re-diluted with dichloromethane. The organic layer was dried over $MgSO_4$ and filtered. The filtrate was evaporated to yield an amber colored oil (342 mg, 56% yield).

A 4 mL portion of 4M HCl in dioxane was added to the polymer residue and stirred for a minimum of 4 hours. The solution was neutralized with 2 M potassium carbonate (aq) and then the solvent was removed under vacuum. The resulting residue was diluted to ~30 mL with 20% ethanol in water and filtered. Preparative gel permeation chromatography is performed with G-25 desalting medium to remove excess salts from the polymer. Solvent in the fractions is removed with rotary evaporation and the polymer is collected as an amber oil.

The linker or capping unit addition steps can be performed in the polymerization reaction as presented above or alternatively, in some embodiments, can be performed in a separate set of reactions after the polymerization work up. In the latter case, the polymer is reacted under the analogous conditions as those provided in the example. In other embodiments, it is also possible to react with a combination of terminal monomers to introduce polymers with bi-functionality, allowing the polymer to be conjugated to more than one entity.

Example 6

Synthesis of Linker or Capping Unit, Tert-butyl 4-(3,5-dibromophenoxy)butylcarbamate

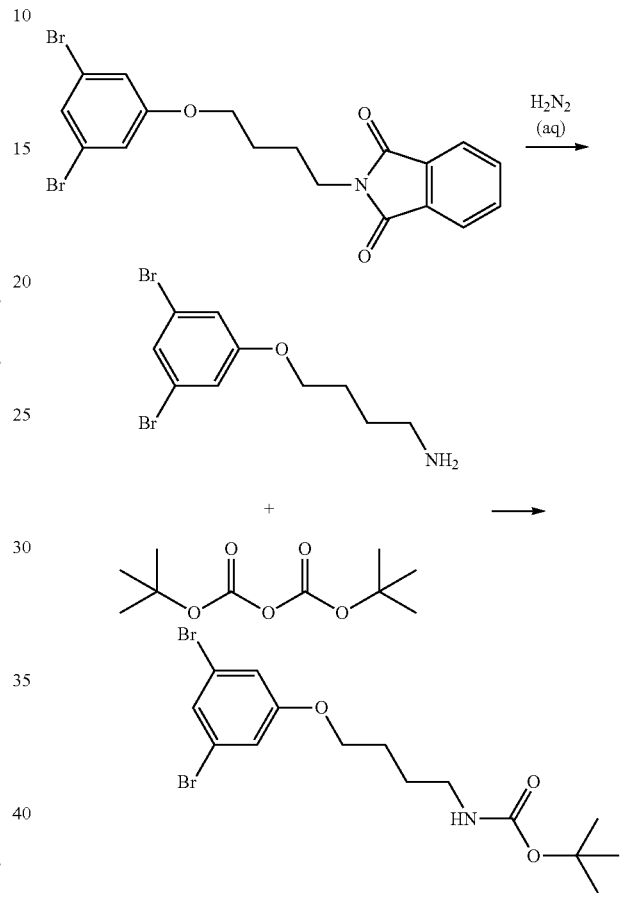

Step 1: 4-(3,5-dibromophenoxy)butan-1-amine 1-(4'-Phthalimidobutoxy)3,5-dibromobenzene (1.0 g, 2.20 mmol) was dissolved in ethanol (45 mL) for 5 minutes under nitrogen. Hydrazine monohydrate (610 mg, 12.1 mmol) was added and the reaction was refluxed at 80° C. for 2 hours. To the reaction aqueous 1M HCl (17.7 mL, 17.7 mmol) was added and refluxed at 105° C. for another 2 hours. The aqueous layer was extracted with dichloromethane (2×150 mL). The organic layers were combined, washed with saturated $NaHCO_3$ (3×), water, and brine, then dried over $MgSO_4$, and filtered. Removal of solvent yielded a yellow oil (560 mg, 78%).

Step 2: Tert-butyl 4-(3,5-dibromophenoxy)butylcarbamate 4-(3,5-Dibromophenoxy)butan-1-amine (397 mg, 1.23 mmol) was dissolved in anhydrous THF (24.6 mL) under nitrogen. Di-tert-butyl dicarbonate (423 mL, 1.84 mmol) was added to the mixture and refluxed reaction at 40° C. for 2 hours. After extraction of the reaction with dichloromethane (2×50 mL), the organic layers were combined, washed with saturated NaHCO$_3$, water, and brine, then dried over MgSO$_4$, and filtered. The solvent is removed and the residue is purified by column chromatography (9:1, hexanes:EtOAc) to give a white solid (306 mg, 59%).

Example 7

Synthesis of Linker or Capping Unit, Tert-butyl 4-(4-bromophenoxy)butylcarbamate

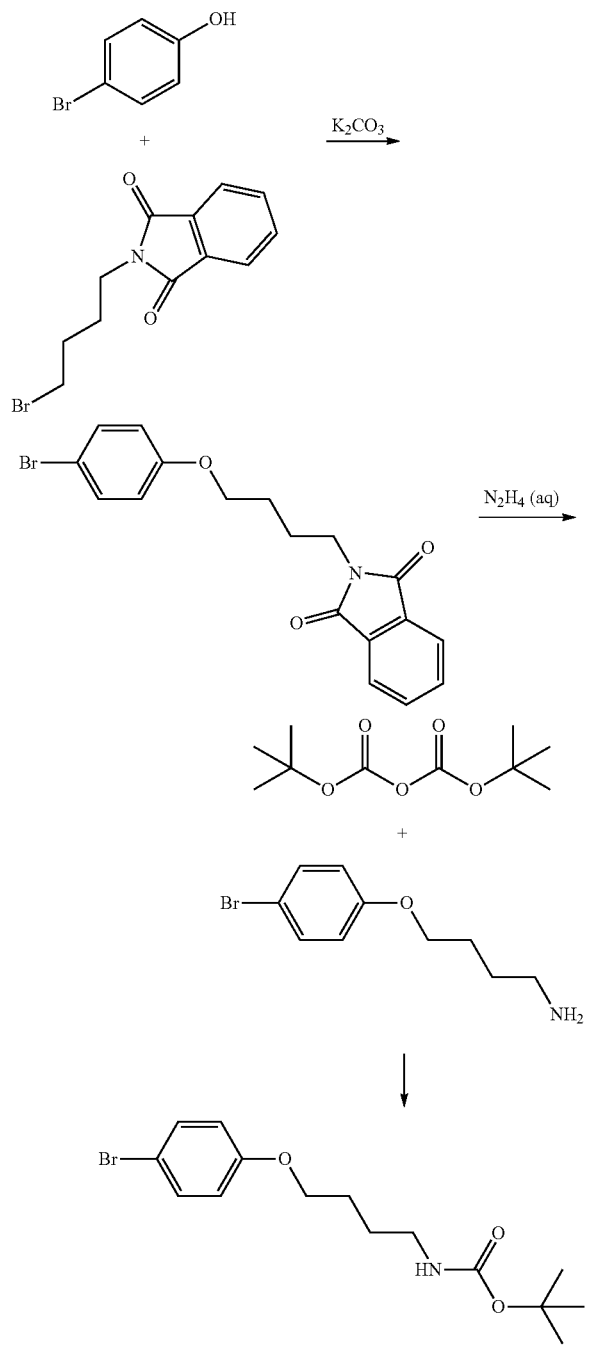

Step 1: N(4-(4-Bromophenoxy)butyl)phthalimide

Combined 4-bromophenol (4.64 g, 26.8 mmol), N-(4-bromobutylphthalimide) (6.30 g, 22.33 mmol), K$_2$CO$_3$ (11.09 g, 80.38 mmol), 18-crown-6 (265 mg, 1.00 mmol), and acetone (100 mL), and refluxed reaction under nitrogen at 70° C. over night. The reaction was cooled to room temperature and removed solvent by vacuum. The crude mixture was diluted with dichloromethane (200 mL) and washed with water (3×), then dried over MgSO$_4$, and filtered. Removal of solvent, followed by trituration with hexanes, and filtered using Buchner funnel to yield a white solid (6.03 g, 71%).

Step 2: 4-(4-Bromophenoxy)butan-1-amine

N(4-(4-bromophenoxy)butyl)phthalimide (6.01 g, 16.1 mmol) is dissolved in ethanol (200 mL) under nitrogen, followed by the addition of hydrazine monohydrate (7.8 mL, 161 mmol). The reaction was refluxed at 80° C. for 2 hours. Once reaction completed (solids formed at the top layer), cooled reaction to room temperature and neutralized with 1M HCl (50 mL). The mixture is allowed to stir until all solids are completely dissolved and diluted with dichloromethane (150 mL). The solution was extracted with two portions of saturated NaHCO$_3$ (2×). The organic layers were combined, washed with brine and water, then dried over MgSO$_4$, and filtered. Removal of solvent yields a yellow oil (2.93 g, 75%).

Step 3: Tert-butyl 4-(4-Bromophenoxy)butylcarbamate 4-(4-bromophenoxy)butan-1-amine (1.0 g, 4.09 mmol) was dissolved in anhydrous THF (20 mL) under nitrogen and stirred until solution is homogenous. Di-tert-butyl-dicarbonate (1.34 g, 6.14 mmol) was added and the reaction was stirred at 40° C. for 2 hours. The reaction was quenched with water (30 mL) and stirred at room temperature for 1.0 hour. The aqueous layer was extracted with ethyl acetate (50 mL×2). The organic layers were combined, washed with saturated NaHCO$_3$, water, and brine, then dried over MgSO$_4$, and filtered. Removal of solvent yield a solid, which was purified by column chromatography (9:1, hexanes:EtOAc) to yield white solids (1.0 g, 71%).

Example 8

Synthesis of Linker or Capping Unit, Tert-butyl 4-(4-(4,4,5,5-tetramethyl-1,3,2-dioxaborolan-2-yl)phenoxy)butylcarbamate

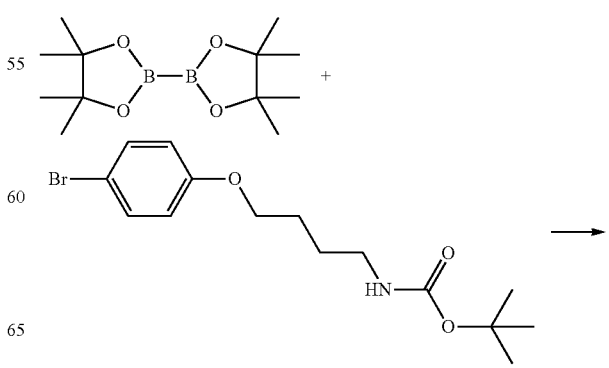

51
-continued

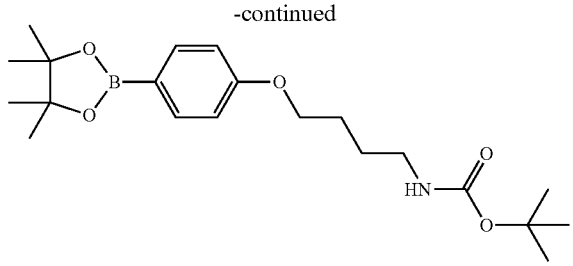

Combined tert-butyl 4-(4-bromophenoxy)butylcarbamate from Example 4 (500 mg, 1.45 mmol), potassium acetate (428 mg, 4.36 mmol), bis(pinacolato)diboron (737 mg, 2.90 mmol) and DMSO (12 mL), and purged mixture with nitrogen for 10 minutes at room temperature. To mixture was added Pd(dppf)Cl$_2$ (59.3 mg, 0.07 mmol) and continued to stir solution at room temperature under nitrogen for another 20 minutes. After refluxing at 80° C. for 3 hours, the reaction was cooled to room temperature and quenched with water (30 mL). The aqueous layer was extracted with dichloromethane (50 mL×2). The organic layers were combined, washed with brine, then dried over MgSO$_4$, and filtered. Removal of solvent yield a dark brown oil, which was purified by column chromatography (9:1, hexanes:EtOAc) to yield a light yellow oil (539 mg, 95%).

52

Example 9

Preparation of Polymer with an Internal Conjugation or Linking Site

The incorporation of internal conjugation sites into conjugated polymer backbones is described in U.S. application Ser. No. 11/868,870, filed Oct. 8, 2007 and published as U.S. Application No. 2008/0293164, which application is herein incorporated by reference in its entirety. Provided is a modified synthesis based on the protocol presented in Example 3 and for PVFP-1-NH$_2$ (FIG. 19).

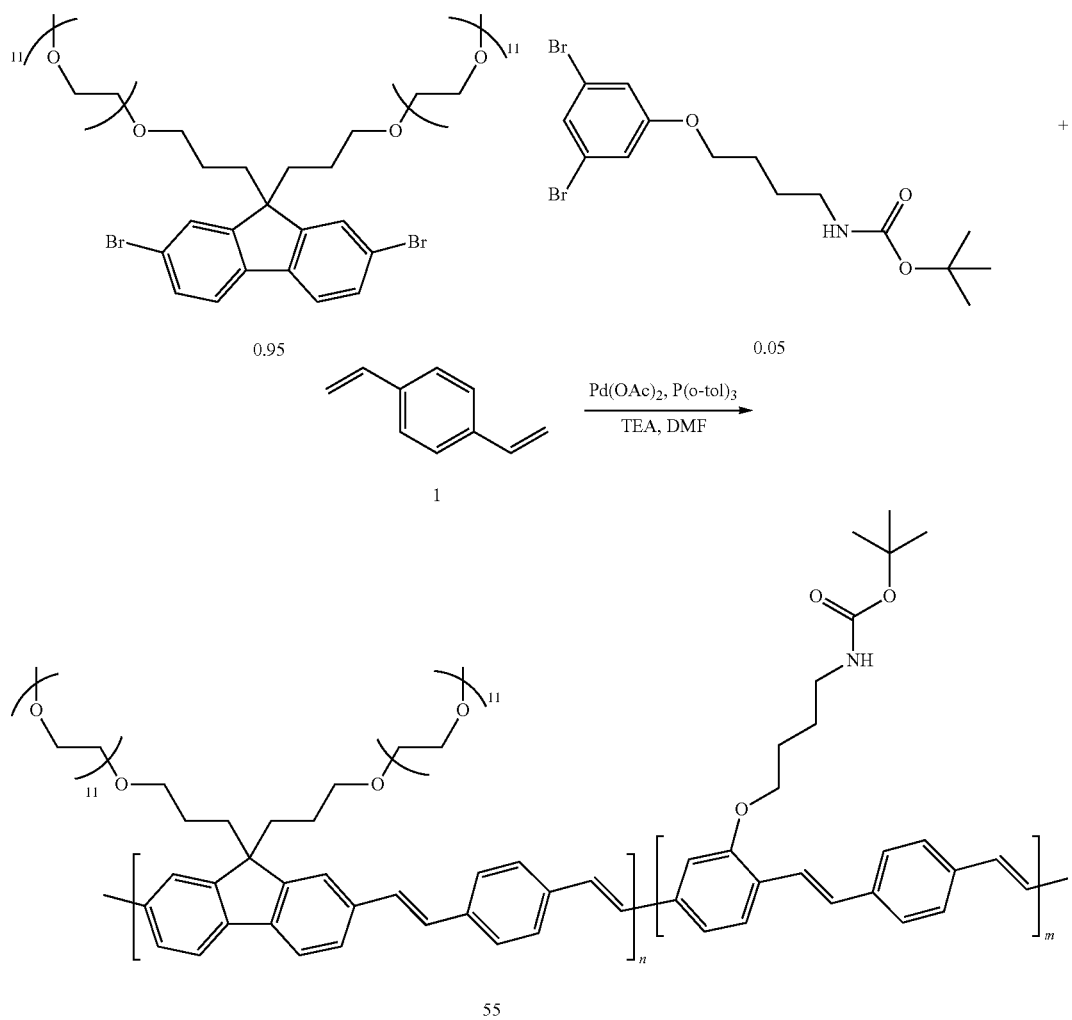

The internal linker is incorporated by substituting a small percentage (5% in this example) of one of the bi-functional monomers with a similar bi-functional monomer which comprises the conjugation site of interest (Tert-butyl 4-(3,5-dibromophenoxy)butylcarbamate in this example, used to create a free amine post deprotection). The number and type of linking site included in the polymer is controlled by the feed ratio of the monomers in the polymerization reaction. Both monomer can be substituted and several different linking chemistries can be included in the same polymer chain. In further embodiments, an internal linker allows covalent attachment of the resulting polymer to biomolecules, secondary reporters or other assay components.

In alternative embodiments, the approach described in this example can be used in combination with the end linking or capping protocol presented in Example 5 to produce polymers with both internal and terminal linking sites for conjugation. A non-limiting application of a polymer with both internal and terminal linking sites for conjugation are polymer-dye-biomolecule tandem conjugates where the polymer is used as a FRET donor to a secondary dye acceptor thus shifting the emission wavelength to that of the corresponding dye.

Example 10

Preparation of Polymer-Streptavidin Conjugates

Step 1: Streptavidin-4FB Modification

Streptavidin protein is reconstituted at 1.7 mg/mL and exchange into reaction buffer, 50 mM $NaHCO_3$, pH 8. 15 molar equivalents of bifunctional benzaldehyde/succinimidyl linker, S-4FB (Solulink, San Diego, Calif.) 20 mg/mL in anhydrous DMSO is added to streptavidin, ensuring that the organic phase is less than 10% of the total volume. Reaction is mixed on shaker for 4 hours at room temperature and unreacted linker is subsequently filtered away via Amicon Ultra filter, 10 kD MWCO with 50 mM MES buffer, pH 5; centrifuged at 2400 rpm and a repeated wash ×3. Streptavidin protein is recovered in its initial volume, targeting 1.7 mg/mL in conjugation buffer, 50 mM $NaPO_4$, pH 6.5.

Step 2: Polymer Modification

Polymer with terminal amine group (1 molar eq) is dissolved with DMF to make a 10 mg/mL solution. 20 molar equivalents of a bifunctional hydrazine/succinimidyl linker, SHTH (Solulink, San Diego, Calif.) at 80 mg/mL in anhydrous DMSO is added to the polymer solution. 1 drop of DIPEA is added to the reaction by a syringe and 22 g needle. The solution is agitated at room temperature for 4 hr and the reaction transferred to a Amicon Ultra filter (MWCO=10 kDa) filled with 25 mM MES pH 5 buffer. The solution is then centrifuged. The filter is refilled and washed with the following wash buffers:
1×DI H2O+1 drop 1 M HCl
1×DI H2O+1 drop 1M NaOH
3×50 mM MES, pH 5

Step 3: Protein-Polymer Conjugation 15 equivalents of modified polymer from Step 2 are added with desired amount of modified protein from Step 1. Aniline is added to the reaction for a final concentration of 10 mM and allowed to mix for 12 hours. The reaction is purified with Amicon Ultra filter (MWCO=10 kDa) to remove DMF and recovered with 25 mM $PO_4$ pH 6.5 buffer.

Step 4: Purification of the Protein-Polymer Conjugate

A 1 mL HiTrap SP Sepharose FF column is equilibrated with 20 mM Na Citrate pH 3 buffer. 1 mL (0.3-1 mg/mL) of Streptavidin-polymer conjugate is loaded in 25 mM $NaHPO_4$ pH 6.5. The sample is wash through column with 20 mM Na Citrate pH 3 buffer until a stable baseline is obtained. Multiple 1 mL aliquots of sample may subsequently be loaded and washed. The column is washed with a minimum of 10 column volumes of 20 mM Na Citrate pH 3 buffer. The conjugate is eluted with 10 column volumes of 20 mM Na Citrate in 0.6 M NaCl pH 7.6 buffer and the column is stripped with 10 column volumes of 20% ethanol in the elution buffer. The elution peak is concentrated with an Amicon Ultra filter (MWCO=10 kDa) to reduce the volume to ~200 µl. A 10×300 mm Superose 12 column is equilibrated with 20 mM Na Citrate in 0.6 M NaCl pH 7.6 buffer. 200 µL of concentrated Streptavidin-polymer conjugate is loaded and eluted with 20 mM Na Citrate in 0.6 M NaCl pH 7.6 buffer. Fractions are pooled and buffer exchanged into PBS+0.05% $NaN_3$ using Amicon Ultra Centrifugation filters (10 kD MWCO). Elutions are concentrated to desired concentration for testing; at around 2 µM Streptavidin.

Step 5: Characterization of a Purified Protein-Polymer Conjugate

Figure 21:
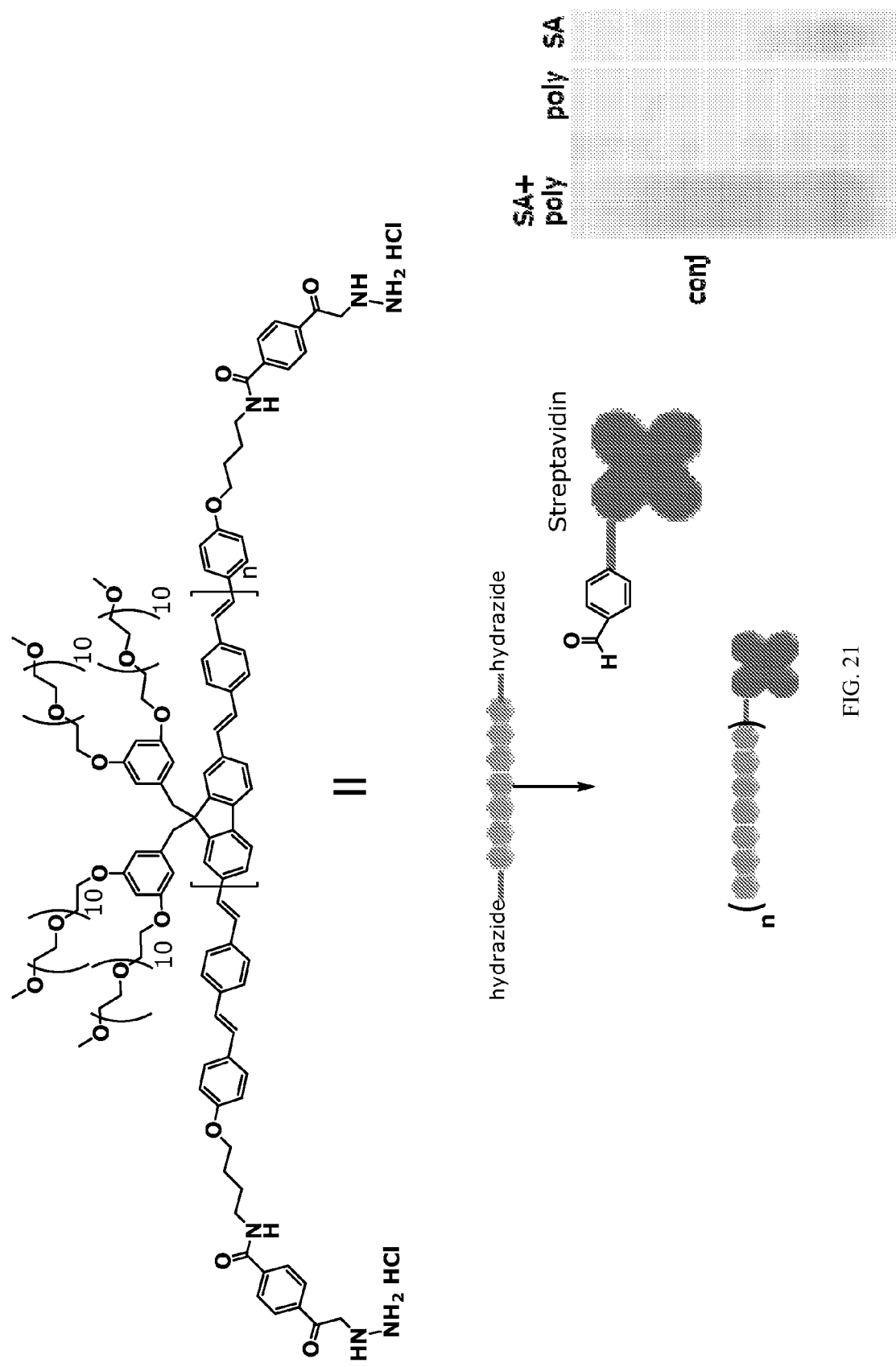
FIG. 21. Schematic of a conjugated polymer-streptavidin conjugation and the resulting conjugate structure (top) and Coomassie stained agarose gel representative of the streptavidin-attached CP (below).

A 4-20% acrylamide Tris-HCl Ready Gel (BioRad) is prepared and the gel is loaded with the conjugate along with free streptavidin and free polymer in separate lanes. Gel electrophoresis is performed in 25 mM Tris 192 mM, Glycine pH 8.3 and stained with Coomassie to visualize the protein. The gel is stained for 30 minutes then destained with commercial destain overnight. FIG. 21 top, depicts conjugation of streptavidin to a conjugated polymer of formula in cartoon format. FIG. 21, bottom, is a Coomassie stain of acrylamide gel which depicts the mobility of the conjugate is retarded relative to the free protein indicating an increase in mass. A neutral polymer alone shows no evidence of staining and without a formal charge, the polymer is not mobile in the electrophoritic field.

In alternative embodiments, the above example can be adapted to allow for conjugation of the polymer to biomolecules or dyes, including but not limited to, antibodies and nucleic acids. The amine on the polymer is converted to a maleimide and a carboxylic acid (further activated to form the NHS ester) using alternative crosslinkers or modifiers. In certain embodiments, conjugation of the same polymer to other biomolecules (streptavidin, antibody fragments, nucleic acids) is facilitated using malimide-thiol chemistry (using SATA linkers to convert free amines on the biomolecule or TCEP reduction of an antibody to create free thiols) and NHS-amine chemistry (reacting the NHS polymer directly with lysines on the protein or nucleic acid).

Example 11

Preparation of Biotin-Labeled Polymers

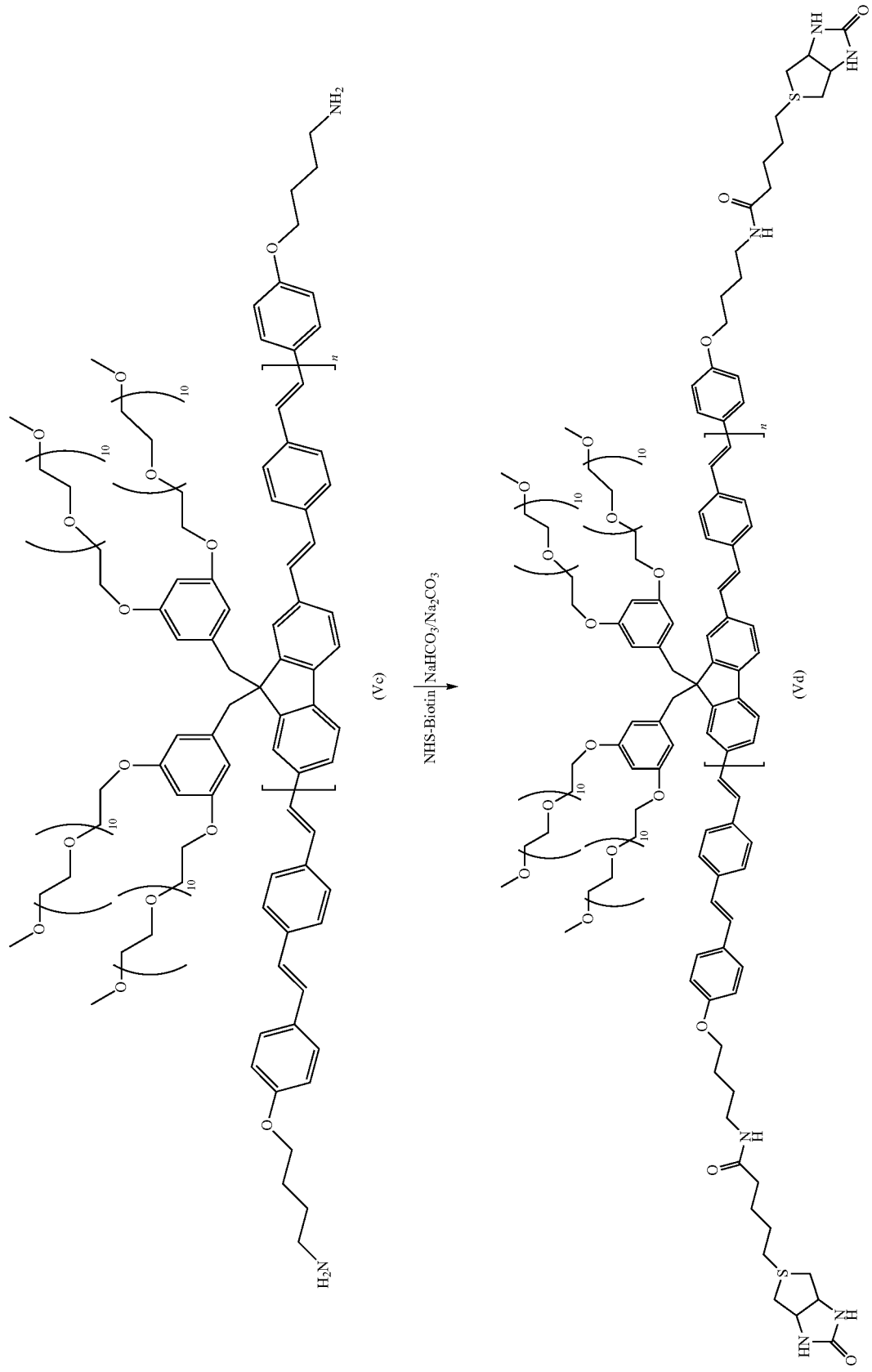

Amine functionalized polymer of formula (Vc) is dissolved at 10 mg/mL in anhydrous DMF and divided into two portions. NHS-biotin (0.9 mg in 90 μL, 88 equivalents) (Pierce, 20217) and NHS-LC-LC-biotin (Pierce, 21343) at 10 mg/mL (1.5 mg in 150 μL, 88 equivalents) are dissolved in anhydrous DMF. The NHS-biotin and NHS-LC-LC-biotin solutions are immediately added to the two portions of polymer solution and allowed to mix on a shaker overnight in the dark.

Excess reactant is removed by washing the solution using Amicon Ultra-4 mL 10 kD MWCO filter cartridges in a series of wash steps:

1. The cartridge is first filled approximately halfway with water, and the reaction solution (by pipette) subsequently added directly into the water.
2. The cartridge is filled with water until it was full. The solution is mixed by pipetting up and down.
3. The cartridge is centrifuged at 2400 rpm for 30 minutes, or until the volume is reduced to 250 μL.
4. The cartridge is refilled with water 1 drop of 1M HCl is added; the solution is mixed, and centrifuged at 2400 rpm for 30 minutes, or until the volume was reduced to 250 μL.
5. The cartridge is refilled with water, 1 drop of 1M NaOH is added; the solution is mixed, and centrifuged at 2400 rpm for 30 minutes, or until the volume is reduced to 250 μL.
6. The cartridge is refilled with water, mixed and centrifuged at 2400 rpm for 30 minutes, or until the volume was reduced to 250 μL. The last step is repeated for a total of 5 washes.

Characterization of a Purified Biotin-Labeled Polymer

Excess biotin-labeled polymer is incubated with a Cy5-labeled streptavidin in DPBS buffer plus 0.2% BSA and 0.05% NaN$_3$.

Figure 22:
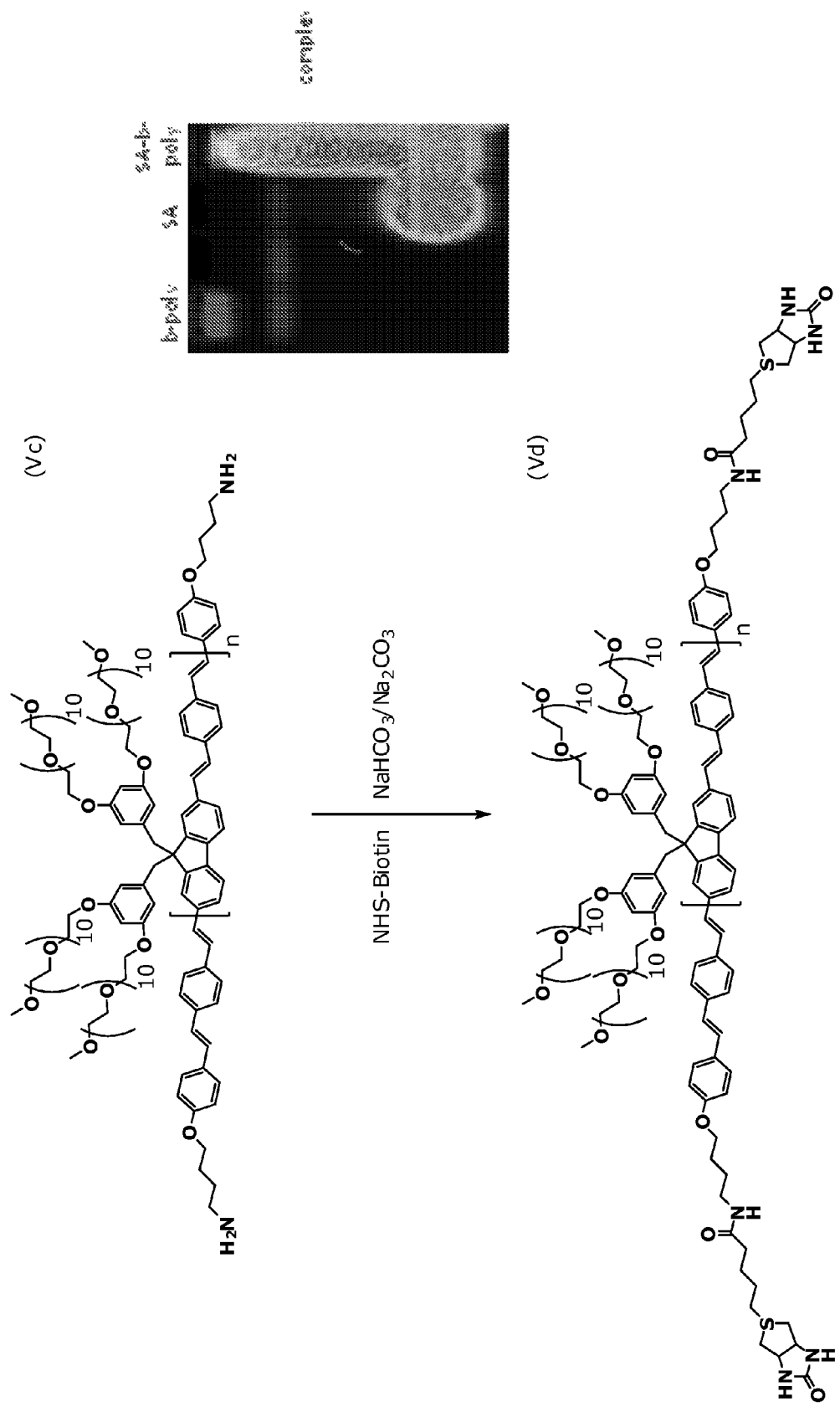
FIG. 22. Representative acrylamide gel depiction of biotinylated polymer alone or bound to Cy5-labeled streptavidin.

A 0.8% agarose gel is prepared and the gel is loaded with the conjugate along with free Cy5-streptavidin and free biotinylated polymer in separate lanes. Gel electrophoresis is performed in 10 mM NaHCO$_3$ pH 10 and visualized using a Typhoon gel imager with 457 nm and 635 nm laser excitation. FIG. 22 (bottom) depicts retardation of mobility of the polymer-streptavidin complex relative to the free protein indicating an increase in mass. The polymer alone shows little mobility on its own due to a lack of formal charge.

Example 12

Functional Testing of Covalent Polymer Streptavidin Conjugates by Selective Binding to Biotinylated Microspheres Materials Required:

1×TBST: 50 mM Tris-HCl, 150 mM NaCl, 0.1% Tween20, pH 7.5
Biotin microspheres (10 mg/mL in TBST)
BSA (1 mg/mL)
AvDN (220 μM)
Polymer-Strepavidin (SA) conjugate: (1 μM with regard to SA, provided at 5 μM)

Preparation of Master Mixes:
Prepare in labelled 1.5 mL microfuge tubes:

| Experimental master mix | Negative control master mix |
|---|---|
| 14 μl TBST | 9 μl TBST |
| 6 μl BSA stock | 6 μl BSA stock |
| 5 μl bead stock | 5 μl avidin stock |
|  | 5 μl bead stock |

Briefly vortex both tubes and allow 20-30 minutes to pre-incubate the negative control beads with excess avidin before proceeding. A variable speed orbital mixer at 800 RPM for incubation is suggested to keep beads from settling.

Bead Hybridization:
1. Pipette 10 μL of each master mix into separate labelled 1.5 ml microfuge tubes.
2. Add 2 μL of polymer-SA conjugate to each.
3. Prepare additional tube containing 10 μL master mix and no polymer to be used as a blank.
4. Briefly vortex and pulse spin all tubes.
5. Transfer to variable speed orbital mixer and incubate for 30 mins at 800 RPM.

Bead Processing/Washing:
1. Add 0.5 ml TBST to all samples and controls and vortex briefly.
2. Centrifuge at 1200 g for 2 min and remove 480 μl supernatant being diligent not to disturb bead pellet.
3. Add 0.5 ml TBST to all samples and controls and vortex briefly.
4. Centrifuge at 1200 g for 2 min and remove 500 μl supernatant being diligent not to disturb bead pellet.
5. Repeat steps 3 and 4.
6. Remove as much of remaining supernatant as possible using P200 pipette without disturbing bead pellet.
7. Add 100 μL TBST and vortex briefly to re-suspend beads.

Bead Measurement:
1. Transfer 100 μL of positive, negative and blank beads to a BLACK 96 well plate.
2. Excite wells at 430 nm and collect emission in the range 450-650 nm using required slit widths and/or sensitivity setting to achieve measurable signals above background.
3. Compare emission of positive and negative control beads.

Figure 23:
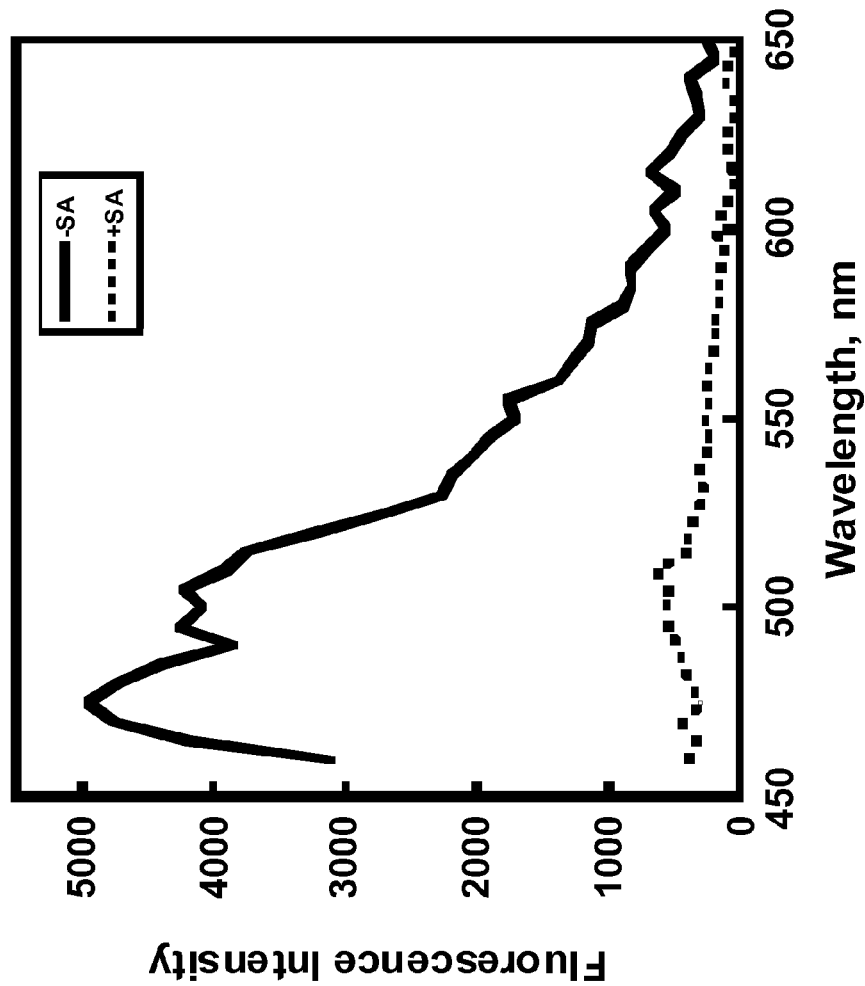
FIG. 23. Schematic of streptavidin-attached conjugated polymer binding to biotinylated microspheres (top) and plot of fluorescence excitation of control biotinylated microspheres and microspheres bound to streptavidin-attached conjugated polymer.
Figure 23:
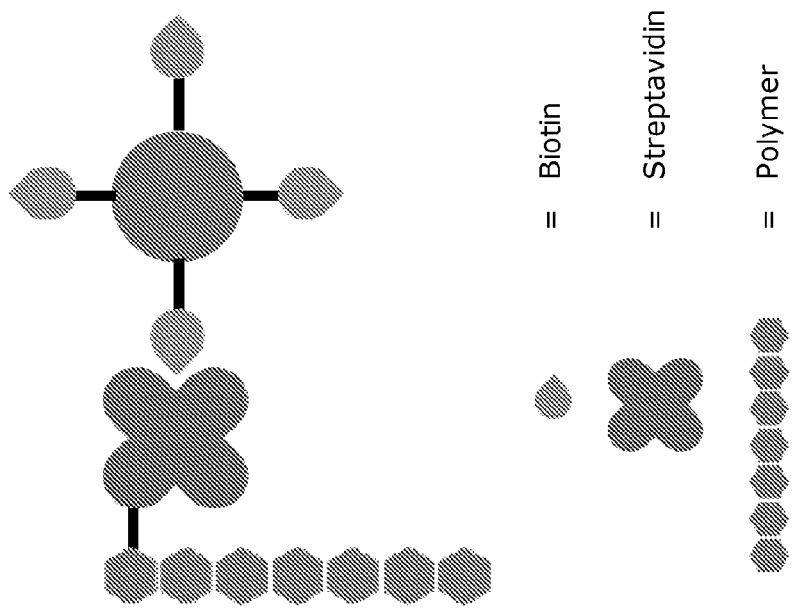

FIG. 23. The polymer streptavidin conjugate was bound to a biotinylated microsphere. Excitation at 440 nm in a florometer resulted in emission from the polymer as indicated by the solid curve. The dashed curve represents the negative control where the biotin bead was first treated with excess avidin to block the biotin binding sites prior to treatment with the polymer streptavidin conjugate.

Example 13

Functional Testing of Covalent Polymer Streptavidin Conjugates by Selective Binding to Biotinylated Microspheres and FRET to Dye Acceptors on Co-Localized Streptavidin-Dye Conjugates Materials Required:

1×TBST: 50 mM Tris-HCl, 150 mM NaCl, 0.1% Tween20, pH 7.5
Biotin microspheres (10 mg/mL in TBST)
Cy3-SA (1 μM or 50 μg/mL)
Polymer-Strepavidin (SA) conjugate: (1 μM with regard to SA, provided at 5 μM)

Bead Preparation and Hybridization:

| Prepare in labelled 1.5 mL microfuge tubes: Blank control | Cy3-SA control | FRET-SA Control |
|---|---|---|
| 16 µl TBST 4 µl bead stock | 14 µl TBST 2 µl Cy3-SA stock 4 µl bead stock | 14 µl TBST 2 µl Cy3-SA stock 2 µl polymer-SA stock 4 µl bead stock |

Briefly vortex all tubes and transfer to variable speed orbital mixer for incubation of at least 30 mins at 800 RPM.

Bead Processing/Washing:
1. Add 0.5 ml TBST to all samples and controls and vortex briefly.
2. Centrifuge at 1200 g for 2 min and remove 480 µl supernatant being diligent not to disturb bead pellet.
3. Add 0.5 ml TBST to all samples and controls and vortex briefly.
4. Centrifuge at 1200 g for 2 min and remove 500 µl supernatant being diligent not to disturb bead pellet.
5. Repeat steps 3 and 4.
6. Remove as much of remaining supernatant as possible using P200 pipette without disturbing bead pellet.
7. Add 100 µL TBST and vortex briefly to re-suspend beads.

Bead Measurement:
1. Transfer 100 µL of all samples to a BLACK 96 well plate.
2. Excite wells at 430 nm and collect emission in the range 450-650 nm using required slit widths and/or sensitivity setting to achieve measurable signals above background.
3. Detect and record polymer emission in the range of 480-500 nm and Cy3 emission at the expected 570 nm.

Figure 24:
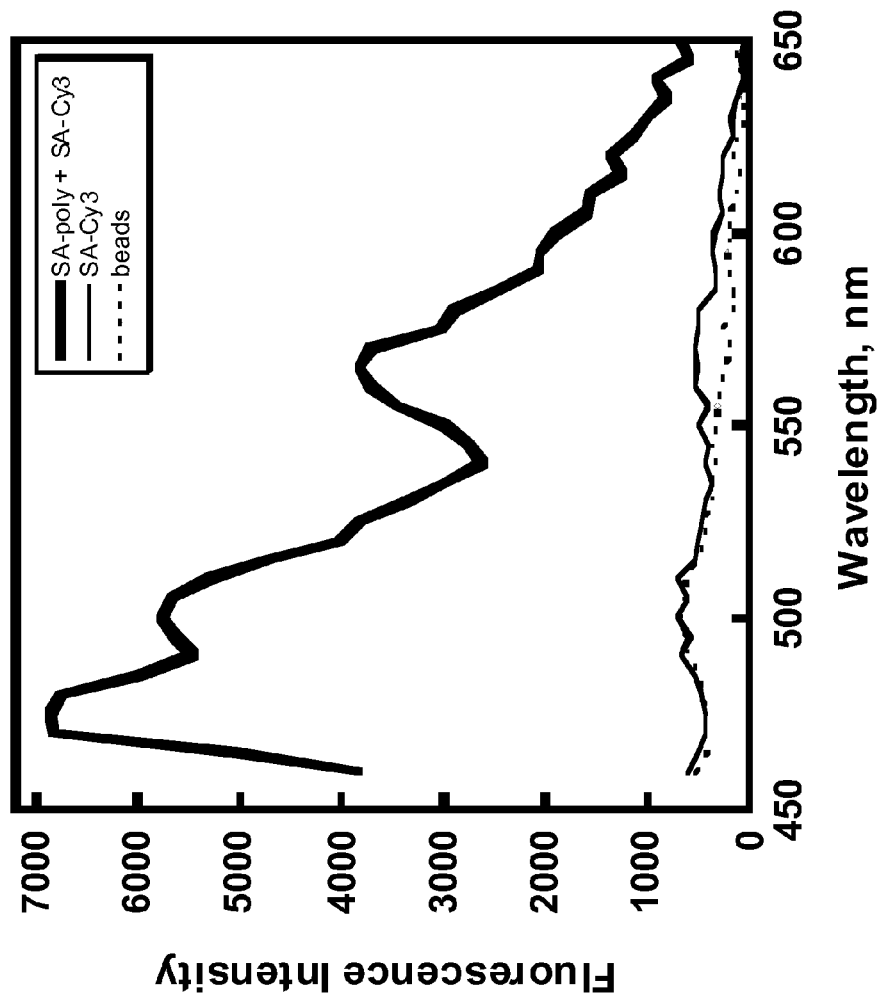
FIG. 24. Schematic of streptavidin-attached conjugated polymer selectively bound to biotinylated microspheres and FRET to dye acceptors on co-localized streptavidin-dye conjugates (top) and plot of energy transfer from streptavidin conjugated polymer to dye acceptor (bottom).
Figure 24:
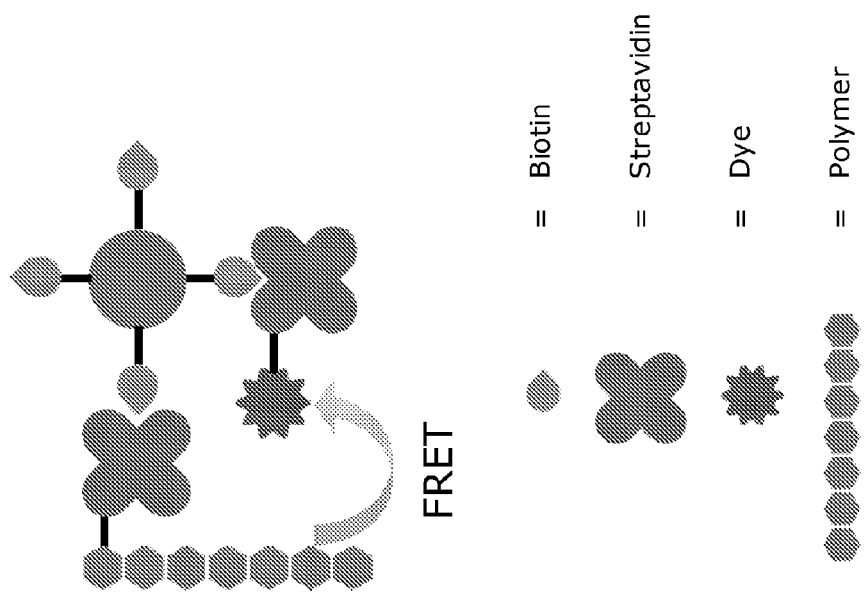

FIG. 24. The polymer streptavidin conjugate was bound to a biotinylated microsphere. Excitation at 440 nm in a florometer resulted in energy transfer between the polymer and a Cy3 dye conjugated to a different streptavidin protein as indicated by the solid upper curve. The dashed curve shows beads alone and the lower solid curve direct excitation of the Cy3-streptavidin conjugate at 440 nm.

Example 14

Functional Testing of Biotin-Labeled Polymers by Selective Binding to Avidin Coated Microspheres Materials Required:
1×TBST: 50 mM Tris-HCl, 150 mM NaCl, 0.1% Tween20, pH 7.5
SA microspheres (10 mg/mL in TBST)
Biotin (1 mM)
440 nm biotin-polymer conjugate: (46 µM)
Bead Preparation and Hybridization:

| Prepare in labelled 1.5 mL microfuge tubes: Blank control | Negative control | Positive Control |
|---|---|---|
| 16 µl TBST 4 µl bead stock | 11 µl TBST 4 µl biotin stock 4 µl bead stock | 15 µl TBST 4 µl bead stock |

Briefly vortex all tubes and transfer to variable speed orbital mixer for incubation of 20-30 mins at 800 RPM to ensure biotin has blocked all SA sites on negative control beads. Add 1 uL of polymer-biotin stock to both positive and negative control tubes. Vortex briefly and transfer to variable speed orbital mixer and incubate for 30 mins at 800 RPM.

Bead Processing/Washing:
1. Add 0.5 ml TBST to all samples and controls and vortex briefly.
2. Centrifuge at 1200 g for 2 min and remove 480 µl supernatant being diligent not to disturb bead pellet.
3. Add 0.5 ml TBST to all samples and controls and vortex briefly.
4. Centrifuge at 1200 g for 2 min and remove 500 µl supernatant being diligent not to disturb bead pellet.
5. Repeat steps 3 and 4.
6. Remove as much of remaining supernatant as possible using P200 pipette without disturbing bead pellet.
7. Add 100 µL TBST and vortex briefly to re-suspend beads.

Bead Measurement:
1. Transfer 100 µL of all samples to a BLACK 96 well plate.
2. Excite wells at 430 nm and collect emission in the range 450-650 nm using required slit widths and/or sensitivity setting to achieve measurable signals above background.
3. Compare emission of positive and negative control beads.

Figure 25:
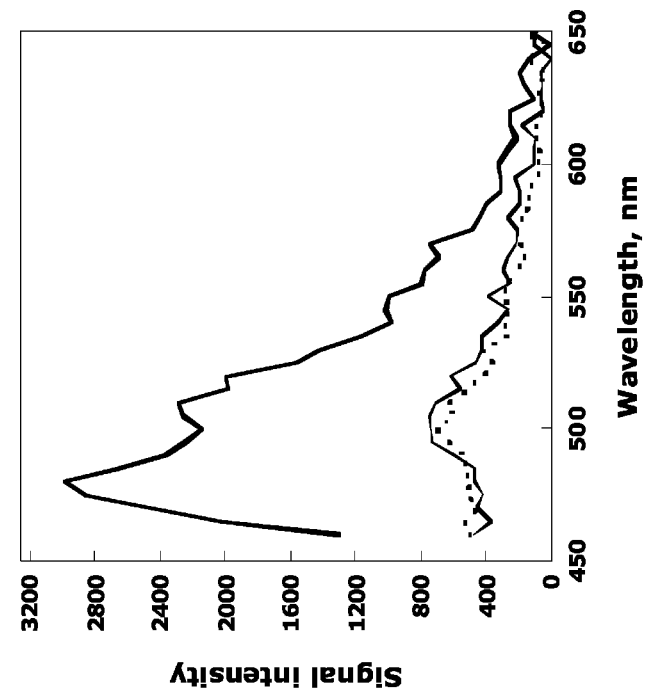
FIG. 25. Schematic of biotinylated polymer binding to streptavidin coated microspheres (top) and plot of fluorescence excitation of control streptavidin coated microspheres and microspheres bound to biotinylated polymer.
Figure 25:
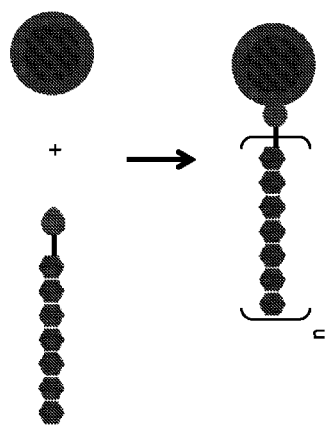
Figure 26:
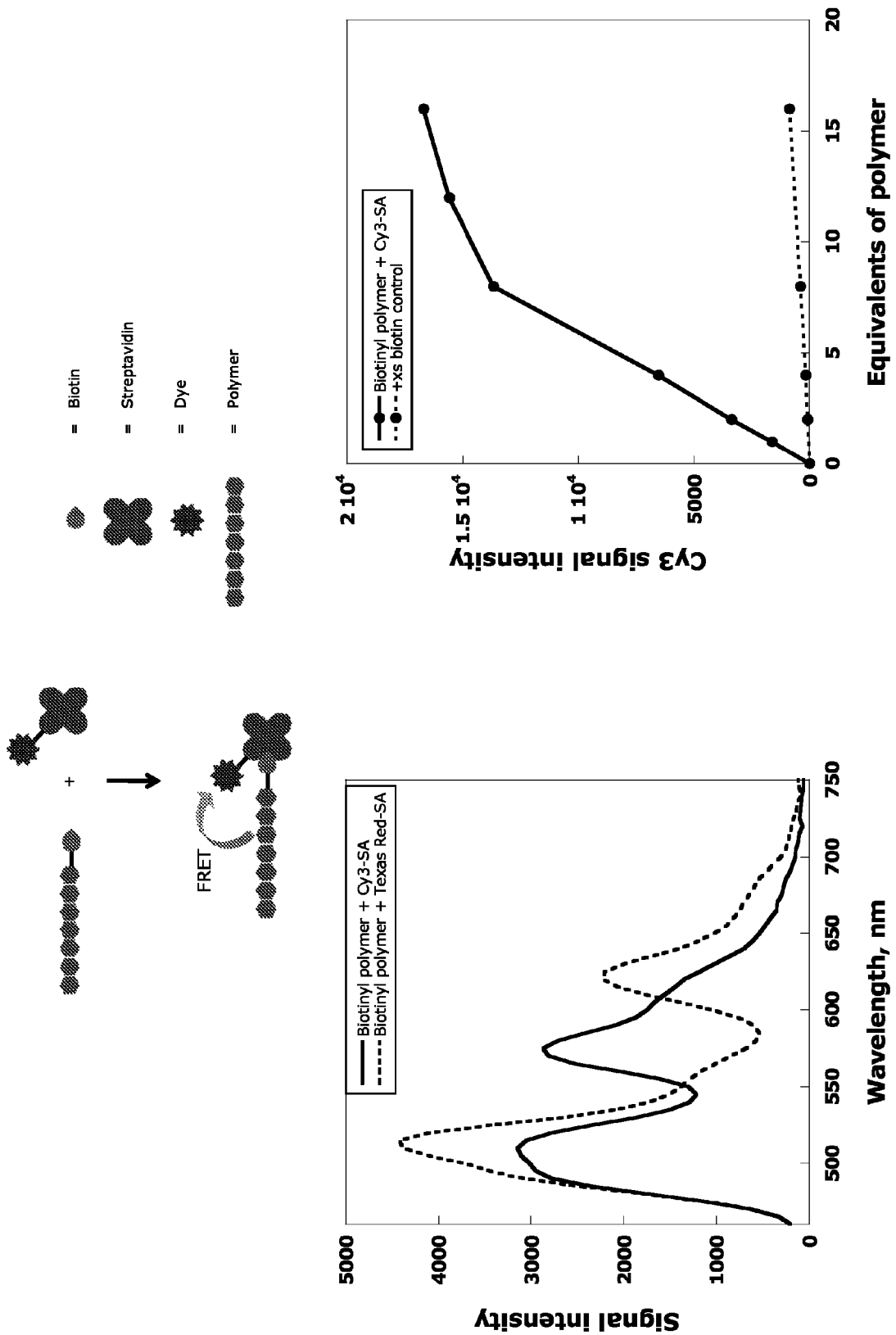
FIG. 26. Schematic of biotinylated polymer binding to dye-labeled streptavidin conjugates and FRET (top); plot of energy transfer from biotinylated polymer to two different dye acceptors (bottom left) and titration plot of polymer saturation (bottom right).

FIG. 25. The biotin modified polymer was bound to a streptavidin microsphere (top). In FIG. 25 (bottom), excitation at 440 nm in a florometer resulted in emission from the polymer as indicated by the solid upper curve. The lower solid curve represents the negative control where the streptavidin bead was first treated with excess biotin to block the binding sites prior to treatment with the biotinylated polymer. The lower solid curve represents beads alone.

Example 15

Selective Binding of Biotin-Labeled Polymer to Dye-Labeled SA Conjugates to Validate FRET Properties and Functional Activity of the Polymer Modification Materials Required:
Biotin-Polymer Conjugate: (46 µM)
Cy3-SA conjugate (1 mg/mL or 18.9 µM)
BLACK 96-well plate Forming the Biotin-Streptavidin Complex:
In a 1.5 mL microfuge tube, combine 9.4 µL of the biotin-polymer conjugate and 2.9 µL of the Cy3-SA. Vortex to mix, then incubate on a shaker (under foil) for 0.5 h. Longer incubation times are also suitable.

Instrument Settings:
Model experiments were conducted on a BioTek Synergy 4 in the Fluorescence mode with the following settings:
Emission: 400-750 nm in 5 nm steps
Sensitivity level: 50
Plate Layout:
Prepare solutions in a BLACK 96-well plate as in the below table. Take care to add the A+B solution last, after all other materials have been added:

| Material | Well 1 | Well 2 | Well 3 |
|---|---|---|---|
| Polymer-biotin | 9.4 µL* | 9.4 µL | — |
| Cy3-SA | 2.9 µL* | — | 2.9 µL |
| Buffer | 100 µL | 100 µL | 100 µL |

*Pre-incubated in the first step, forming the biotin-Streptavidin complex.

FIG. 22. The biotin modified polymer was bound to a dye labeled streptavidin (Cy3 or Texas Red—top). Excitation at 440 nm in a fluorometer resulted in emission from the dye acceptors at their respective emission wavelength (approximately 570 nm and 620 nm respectively—bottom left) as well as some residual emission from the polymer (approximately 520 nm). A titration was also performed to saturate the binding of polymer to the streptavidin (bottom right). The solid curve indicates the emission from the Cy3 label on the streptavidin via energy transfer from the polymer at 440 nm excitation. The dotted curve represents the negative control where the streptavidin was first treated with excess biotin to block the binding sites prior to treatment with the biotinylated polymer.

Example 16

Polymer-Streptavidin Conjugates for Use in Flow Cytometry

CD4 marking was measured on Cyto-trol cells, lyophilized human lymphocytes for analysis of polymer performance in flow. Cyto-trol cells, Beckman Coulter #, were reconstituted in the provided reconstitution buffer and allowed to swell for 15 minutes at room temperature. Cells were then spun down at 250 rcf for 3 minutes, washed in DPBS+0.2% BSA and 0.05% $NaN_3$ (staining/testing buffer), then resuspended in staining buffer at $1 \times 10^7$ cells/mL. Cell suspension was divided in two; half the cells were incubated with biotinylated anti-CD4 at 0.4 ug/uL, the other half of the cells were incubated with staining buffer as a negative control for 30 min. Following primary incubation, cells were rinsed with 5 volumes staining buffer and spun down at 250 rcf for 3 minutes; this rinse was repeated three times. Cells were resuspended at prior volume in staining buffer. $4 \times 10^5$ cells were measured per test and divided out accordingly, streptavidin-fluorophore conjugates prepared in Example 10 were incubated at 100 nM with each aliquot of cells for 30 min, allowing the avidin-biotin complex to form. Following the secondary incubation, cells were rinsed and detailed previously. Final cell suspensions were made for testing at $8 \times 10^5$ cells/mL.

Figure 27:
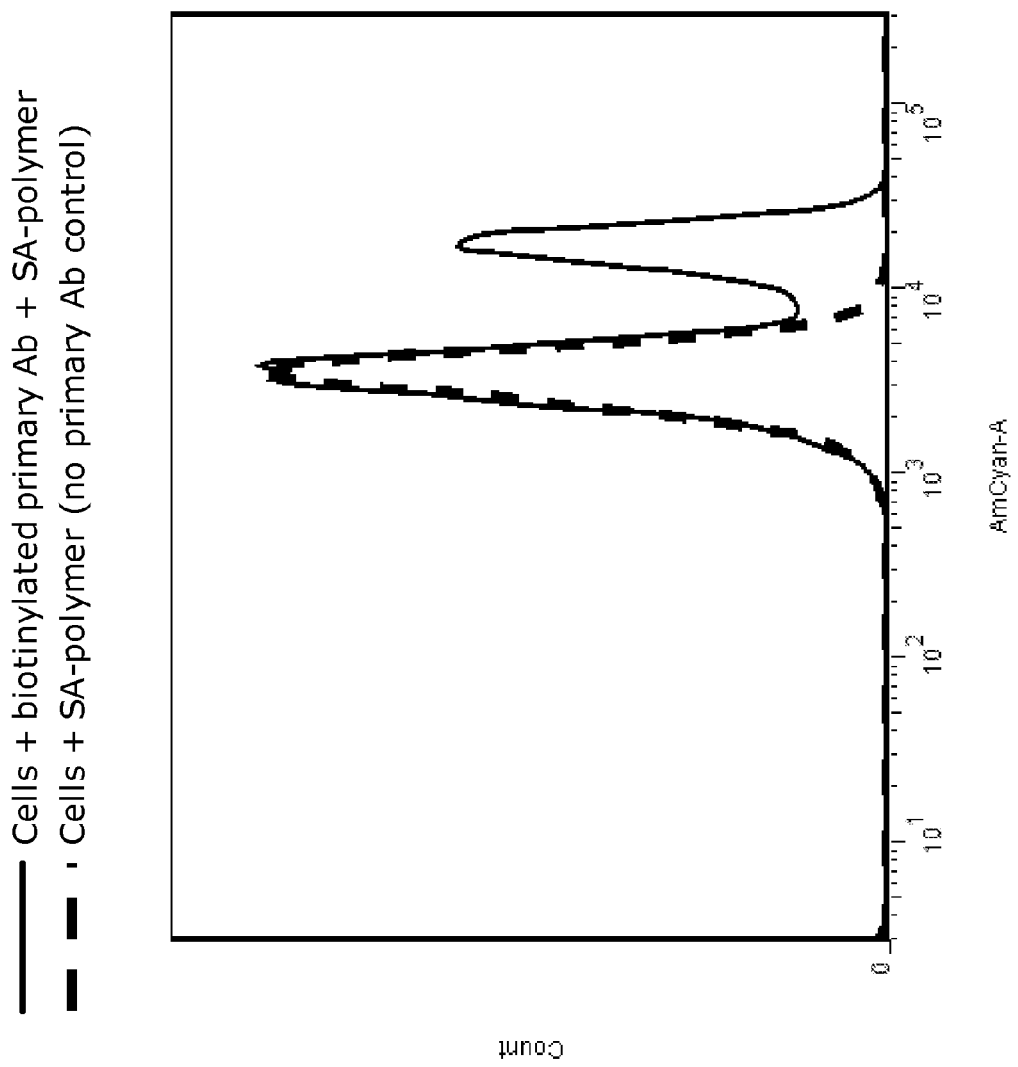
FIG. 27. Flow cytometry analysis of CD4 marking of Cytotrol cells with 440 nm polymer-streptavidin-conjugates.

Flow analysis was performed on a BD LSR II flow cytometer at The Scripps Research Institute (TSRI), San Diego, Calif. Routine calibration with Rainbow fluorescent particles for aligning fluorescent channels on the cytometer was performed by staff at TSRI, all calibrated voltages were used, per staff recommendation. All samples were excited with a 408 nm Violet laser, the polymer conjugate was measured in the AmCyan channel with a 525/50 filter. All samples were initially referenced to unstained cells. The 440-streptavidin conjugate showed specific secondary labeling of the primary identified CD4 positive cells, with the positive cells as 44% of the population. The 440-streptavidin conjugate demonstrated a positive stain index showed low non-specific binding with reference to unstained cells and its respective negative control (FIG. 27). This provides evidence that the polymer, although its peak absorbance is a 440 nm, is a viable fluorescent material for use in flow cytometry with Violet laser excitation.

Example 17

Preparation of Polymer Conjugated to —COOH Beads Via EDC Coupling

Materials (Per 100 µL of Beads):
LodeStars —COOH functionalized magnetic beads (Varian, Inc. PL6727-0001) (100 µL of suspension at spec'd 30 mg/mL)
Polymer with amine terminal ends from Example 5 (125 µL at 1.6 µM in 25 mM MES pH 5, for a 10-fold excess over theoretical bead capacity)
10 mM NaOH (2 mL)
DI H2O (3 mL)
25 mM cold MES, pH 5
EDC at 50 mg/mL in 25 mM cold MES, pH 5 (100 µL)
NHS at 50 mg/mL in 25 mM cold MES, pH 5 (100 µL)
100 mM Tris/HCl pH 7.4 (1 mL)
Centrifuge
Black flat-bottom 96-well plate Antibody capacity was given at 10 ug/mg bead, giving an amine coupling capacity of 2 nmol polymer/mL bead (at 30 mg/mL). A 10 fold-excess of polymer over the suggested capacity was used to target the antibody concentration given in Varian's protocol.

Bead Washing

Beads were washed collectively as 600 µL and then split into 6×100 µL samples for coupling. Beads were washed 2× with 1 mL 10 mM NaOH, then 3× with 1 mL DI H2O; in between washes, the tube was centrifuged 1 min at 3000 rpm to recollect the beads as a pellet, supernatant was discarded and beads were resuspended in the next wash. After the final wash, beads were resuspended in 600 µL cold 25 mM MES, pH 5 and aliquoted into 6×100 µL volumes in microcentrifuge tubes. Beads were centrifuged again 1 min at 3000 rpm and supernatant was discarded.

EDC Activation

100 µL of the EDC solution was added to each reaction set. 100 µL of the NHS solution was added to each reaction set. Beads were resuspended by vortexing and then allowed to mix on a rotator for 30 minutes. Beads were washed 2× in cold 25 mM MES pH 5, pelleted by centrifuging for 1 min at 3000 rpm and the supernatant was discarded. Beads were resuspended in 125 µL cold 25 mM MES, pH 5.

Polymer Coupling

125 µL of polymer at 1.6 µM was added. Samples were vortexed to mix thoroughly and then reacted at RT on a mixer for 3 hours. Beads were pelleted by centrifuging for 1 min at 3000 rpm; supernatant was discarded. Beads were resuspended in 1 mL 100 mM Tris/HCl to block unreacted —COOH sites, vortexed and mixed for 1 hour.

Beads were recollected by centrifugation and resuspended in 100 µL 25 mM MES. At this point, the supernatant of several tubes were yellow in color and had significant absorbance at 440 nm; the beads were washed 6 times until absorbance was at baseline. Beads sat for an additional 2 days prior to fluorescence measurement, after sitting in solution for 2 days, the supernatant was again yellow in color and had measureable absorbance. Beads were washed 3 more times with 30 minute mixes in between until no absorbance was measureable. At 2 days following fluorescence measurements, the supernatant remained clear and free of measureable absorbance.

Glossary of Terms

As used herein, the term "ammonium group" includes $—NH_3^+$, $—NRH_2^+$, $—NHR_2^+$ and $—NR_3^+$, wherein R an alkyl group, preferably C1-C6 alkyl group. The term "ammonium group" can also include a moiety having multiple ammonium groups linked by a spacer group, such as an alkylene group. For example, the ammonium group can include diammonium group or a triammonium group. A "diammonium group" refers to a moiety having two ammonium groups independently selected from $—NH_3^+$, $—NRH_2^+$, $—NHR_2^+$ and $—NR_3^+$, which are linked by an alkylene group. A "triammonium group" refers to a moiety having three ammonium groups independently selected from —$NH_3^+$, —$NRH_2^+$, —$NHR_2^+$ and —$NR_3^+$, which are linked by two alkylene group.

The term "alkyl", as used herein, unless otherwise indicated, means straight or branched saturated monovalent hydrocarbon radicals, typically C1-C12, preferably C1-C6. Examples of alkyl groups include, but are not limited to, methyl, ethyl, propyl, isopropyl, and t-butyl. Alkyl can optionally be substituted with —OH, —SH, halogen (—F, —Cl, —Br, —I), amino, cyano, a C1-C12 alkyl, C1-C12 haloalkyl, C1-C12 alkoxy, C1-C12 haloalkoxy or C1-C12 alkyl sulfanyl. In some embodiments, alkyl can optionally be substituted with one or more halogen, hydroxyl, C1-C12 alkyl, C2-C12 alkenyl or C2-C12 alkynyl group, C1-C12 alkoxy, or C1-C12 haloalkyl.

The term "cycloalkyl", as used herein, means saturated cyclic hydrocarbons, i.e. compounds where all ring atoms are carbons. Examples of cycloalkyl include, but are not limited to, cyclopropyl, cyclobutyl, cyclopentyl, cyclohexyl, and cycloheptyl. In some embodiments, cycloalkyl can optionally be substituted with one or more halogen, hydroxyl, C1-C12 alkyl, C2-C12 alkenyl or C2-C12 alkynyl group, C1-C12 alkoxy, or C1-C12 haloalkyl.

The term "haloalkyl", as used herein, includes an alkyl substituted with one or more F, Cl, Br, or I, wherein alkyl is defined above.

The terms "alkoxy", as used herein, means an "alkyl-O—" group, wherein alkyl is defined above. Examples of alkoxy group include methoxy or ethoxy groups.

The term "aryl", as used herein, refers to a carbocyclic aromatic group. Examples of aryl groups include, but are not limited to phenyl and naphthyl. Examples of aryl groups include optionally substituted groups such as phenyl, biphenyl, naphthyl, phenanthryl, anthracenyl, pyrenyl, fluoranthyl or fluorenyl. Examples of suitable substituents on an aryl include halogen, hydroxyl, C1-C12 alkyl, C2-C12 alkene or C2-C12 alkyne, C3-C12 cycloalkyl, C1-C12 haloalkyl, C1-C12 alkoxy, aryloxy, arylamino or aryl group The term "aryloxy", as used herein, means an "aryl-O—" group, wherein aryl is defined above. Examples of an aryloxy group include phenoxy or naphthoxy groups.

The term "arylamine", as used herein, means an "aryl-NH-", an "aryl-N(alkyl)-", or an "(aryl)$_2$-N-" groups, wherein aryl and alkyl are defined above.

The term "heteroaryl", as used herein, refers to aromatic groups containing one or more heteroatoms (O, S, or N). A heteroaryl group can be monocyclic or polycyclic, e.g. a monocyclic heteroaryl ring fused to one or more carbocyclic aromatic groups or other monocyclic heteroaryl groups. The heteroaryl groups of this invention can also include ring systems substituted with one or more oxo moieties. Examples of heteroaryl groups include, but are not limited to, pyridinyl, pyridazinyl, imidazolyl, pyrimidinyl, pyrazolyl, triazolyl, pyrazinyl, quinolyl, isoquinolyl, tetrazolyl, furyl, thienyl, isoxazolyl, thiazolyl, oxazolyl, isothiazolyl, pyrrolyl, quinolinyl, isoquinolinyl, indolyl, benzimidazolyl, benzofuranyl, cinnolinyl, indazolyl, indolizinyl, phthalazinyl, pyridazinyl, triazinyl, isoindolyl, purinyl, oxadiazolyl, thiazolyl, thiadiazolyl, furazanyl, benzofurazanyl, benzothiophenyl, benzotriazolyl, benzothiazolyl, benzoxazolyl, quinazolinyl, quinoxalinyl, naphthyridinyl, dihydroquinolyl, tetrahydroquinolyl, dihydroisoquinolyl, tetrahydroisoquinolyl, benzofuryl, furopyridinyl, pyrolopyrimidinyl, and azaindolyl.

The foregoing heteroaryl groups may be C-attached or N-attached (where such is possible). For instance, a group derived from pyrrole may be pyrrol-1-yl (N-attached) or pyrrol-3-yl (C-attached).

Suitable substituents for heteroaryl are as defined above with respect to aryl group.

As used herein, the term "alkylene" refers to an alkyl group that has two points of attachment to the rest of the compound. Non-limiting examples of alkylene groups include methylene (—CH2-), ethylene (—CH2CH2-), n-propylene (—CH2CH2CH2-), isopropylene (—CH2CH(CH3)-), and the like. Alkylene groups may be optionally substituted with one or more substituents.

As used herein, the term "cycloalkylene" means saturated cyclic hydrocarbon (i.e. all ring atoms are carbons) having two points of attachment to the rest of the compound.

As used herein, the term "arylalkylene" means an aryl group attached to an alkylene or a cycloalkylene group, where aryl, alkylene, and a cycloalkylene are defined above. When referring to the number of carbon atoms in an arylalkylene, the number refers to the alkylene portion of the moiety. For example, a C1-C12 arylalkylene means an aryl group attached to a C1-C12 alkylene or cycloalkylene group.

As used herein, the term "alkenyl" means a saturated straight chain or branched non-cyclic hydrocarbon having from 2 to 12 carbon atoms and having at least one carbon-carbon double bond. Alkenyl groups may be optionally substituted with one or more substituents.

As used herein, the term "alkynyl" means a saturated straight chain or branched non-cyclic hydrocarbon having from 2 to 12 carbon atoms and having at least one carbon-carbon triple bond. Alkynyl groups may be optionally substituted with one or more substituents.

Suitable substituents for an alkyl, alkylene, alkenyl, alkynyl, cycloalkyl, cycloalkenyl, and the alkylene portion of arylalkylene groups include any substituent which 1) does not react under conditions which induce or initiate cationic polymerization of epoxides; 2) does not interfere with acid initiated cationic polymerization of epoxides; 3) and does not interfere with chemical segregation of the binder of the present invention from polymer formed during cationic polymerization of epoxides. Examples of such substituents include a halogen, an alkyl, an alkenyl, a cycloalkyl, cycloalkenyl, an aryl, a heteroaryl, a haloalkyl, cyano, nitro, haloalkoxy.

Suitable substituents on an aryl, heteroaryl, and aryl portion of arylalkenyl groups include any substituent which 1) does not react under conditions which induce or initiate cationic polymerization of epoxides; 2) does not interfere with acid initiated cationic polymerization of epoxides; 3) and does not interfere with chemical segregation of the binder of the present invention from polymer formed during cationic polymerization of epoxides. An aryl or a heteroaryl may have one or more substituents, which can be identical or different.

Further examples of suitable substituents for a substitutable carbon atom in an aryl, a heteroaryl, or a non-aromatic heterocyclic group include but are not limited to —OH, halogen (—F, —Cl, —Br, and —I), —R, —OR, —$CH_2R$, —$CH_2OR$, —$CH_2CH_2OR$. Each R is independently an alkyl group.

In some embodiments, suitable substituents for a substitutable carbon atom in an aryl, a heteroaryl or an aryl portion of an arylalkenyl include halogen, hydroxyl, C1-C12 alkyl, C2-C12 alkenyl or C2-C12 alkynyl group, C1-C12 alkoxy, aryloxy group, arylamino group and C1-C12 haloalkyl.

In addition, alkyl, alkenyl, alkynyl, cycloalkyl, alkylene, a heterocyclyl, and any saturated portion of alkenyl, cycloalkenyl, alkynyl, arylalkyl, and heteroaralkyl groups, may also be substituted with =O, =S, =N—R.

As used herein, a substituent on a carbon atom that forms an unsaturated carbon-carbon bond and whose attachment to such carbon atom is denoted by the symbol ︎︎︎ can be in either cis or trans substituent.

As used herein, the term "end-group" or "E" can be halogen, hydrogen, vinylene, trialkylsiloxy, or an aryl moiety which may optionally be substituted with a reactive group capable of undergoing chain extension, conjugation or crosslinking. As used herein, a reactive group capable of undergoing chain extension, conjugation or crosslinking refers to any group which is capable of reacting with another of the same group or another group so as to form a link to prepare oligomers, polymers or conjugates (biological or chemical). Preferably, such reactive group is a hydroxy, cyano, glycidyl ether, acrylate ester, methacrylate ester, ethenyl, ethynyl, maleimide, nadimide, trifluorovinyl ether moiety, a cyclobutene moiety fused to one of the aromatic rings or selected from the structures consisting of a-k. E is preferably halogen, trialkylsiloxy, aryl or aryl substituted with a reactive group capable of undergoing chain extension, conjugation or, crosslinking. E is even more preferably aryl or aryl substituted with a reactive group capable of undergoing chain extension, conjugation or crosslinking or a trialkylsiloxy. E is most preferably hydrogen, halogen, vinylene, phenol, a cyano-substituted phenyl or a benzylcyclobutene moiety.

As used herein, the term "charged group" refers to a chemical moiety having either a positive (cationic group) or a negative (anionic group) charge. A charged group can be covalently linked to a molecule (preferably, to a carbon atom) and may, by electrostatic or other type of physical force, be associated with a counterion of an opposite charge. Examples of charged groups contemplated by the present invention include positive charged groups, such as ammonium and sulfonium groups and N-protonated or N-alkylated cationic nitrogen-containing heteroaryl group, and negative groups, such as carboxyl groups, sulfonic groups, phosphoric groups and amino acids such as glutamic acid or aspartic acid. The associated counterions include halides ($F^-$, $Cl^-$, $Br^-$, $I^-$, perchlorate, tetraphenylborate tetrakis(1-imidazolyl)borate, $BF_4^-$, $CF_3SO_3^-$, $PF_6^-$, $BPh_4^-$, $B(3,5-(CF_3)_2C_6H_3)_4^-$), alkali or alkaline earth metals ($Na^+$, $K^+$, $Ca^+$), ammonium ion, as well as conjugated acids and bases of organic and mineral bases and acids, respectively.

As used herein, the term N-protonated or N-alkylated cationic nitrogen-containing heteroaryl group refers to a nitrogen-containing heteroaryl group wherein the nitrogen atom is positively charged by N-protonation or N-alkylation. For example, such cationic heteroaryl groups include, but not limited to, pyridinium, N-alkyl pyridinium, quinolinium, imidazolium, benzoimidazolium, thiozolium and oxazolium. The N-protonated or N-alkylated cationic nitrogen-containing heteroaryl group can also include molecules represented by the following structural formulas:

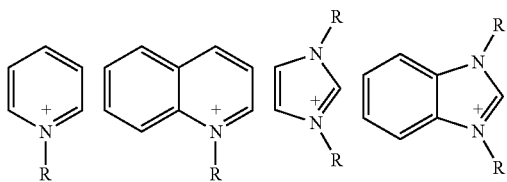

-continued

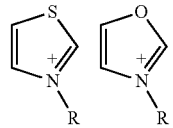

wherein R is —H or a C1-C6 alkyl and each of the structural formula is optionally substituted.

The polymer of the present invention comprises at least one repeat unit. The number of repeat units or "n" can be an integer from 1 to about 10,000, preferably n is an integer from 1 to about 1000, more preferably n is an integer from 1 about 100.

As used herein, the term "peptide nucleic acid" (PNA) is an artificially synthesized polymer similar to DNA or RNA, characterized in that DNA and RNA have a deoxyribose and ribose sugar backbone, respectively, whereas PNA's backbone is composed of repeating N-(2-aminoethyl)-glycine units linked by peptide bonds. The various purine and pyrimidine bases are linked to the backbone by methylene carbonyl bonds.

As used herein, the term "peptide" refers to polymers formed from the linking, in a defined order, of amino acids, preferably α-amino acids. The link between one amino acid residue and the next is known as an amide bond or a peptide bond. Proteins are polypeptide molecules (or consist of multiple polypeptide subunits). The distinction is that peptides are short and polypeptides/proteins are long.

The terms "polynucleotide," "oligonucleotide," "nucleic acid" and "nucleic acid molecule" are used interchangeably herein to refer to a polymeric form of nucleotides of any length, and may comprise ribonucleotides, deoxyribonucleotides, analogs thereof, or mixtures thereof. These terms refer only to the primary structure of the molecule. Thus, the terms includes triple-, double- and single-stranded deoxyribonucleic acid ("DNA"), as well as triple-, double- and single-stranded ribonucleic acid ("RNA"). It also includes modified, for example by alkylation, and/or by capping, and unmodified forms of the polynucleotide.

Whether modified or unmodified, in some embodiments the target nucleotide can have a polyanionic backbone, preferably a sugar-phosphate background, of sufficient negative charge to electrostatically interact with a charged multichromophore in the methods described herein, although other forces may additionally participate in the interaction. The sensor polynucleotide is exemplified as a peptide nucleic acid, although other polynucleotides which minimally interact with the multichromophore in the absence of target can be used. Suitable hybridization conditions for a given assay format can be determined by one of skill in the art; nonlimiting parameters which may be adjusted include concentrations of assay components, pH, salts used and their concentration, ionic strength, temperature, etc.

As used herein, the terms "complementary" or "substantially complementary" refers to the ability to hybridize or base pair between nucleotides or nucleic acids, such as, for instance, between a sensor polynucleotide and a target polynucleotide. Complementary nucleotides are, generally, A and T (or A and U), or C and G. Two single-stranded polynucleotides or PNAs are said to be substantially complementary when the bases of one strand, optimally aligned and compared and with appropriate insertions or deletions, pair with at least about 80% of the bases of the other strand, usually at least about 90% to 95%, and more preferably from about 98 to 100%.

Alternatively, substantial complementarity exists when a polynucleotide or PNA will hybridize under selective hybridization conditions to its complement. Typically, selective hybridization will occur when there is at least about 65% complementary over a stretch of at least 14 to 25 bases, preferably at least about 75%, more preferably at least about 90% complementary. See, M. Kanehisa, *Nucleic Acids Res.* 12:203 (1984).

As used herein, the terms "binding" and "conditions that promote binding" refer to conditions under which binding or hybridization occur. Binding or hybridization is the increased propensity of one polynucleotide or PNA to bind to its complement in a sample as compared to a noncomplementary polymer in the sample. Hybridization conditions will typically include salt concentrations of less than about 1M, more usually less than about 500 mM and preferably less than about 200 mM. In the case of hybridization between a peptide nucleic acid and a polynucleotide, the hybridization can be done in solutions containing little or no salt. Hybridization temperatures can be as low as 5° C., but are typically greater than 22° C., more typically greater than about 30° C., and preferably in excess of about 37° C. Longer fragments may require higher hybridization temperatures for specific hybridization. Other factors may affect the stringency of hybridization, including base composition and length of the complementary strands, presence of organic solvents and extent of base mismatching, and the combination of parameters used is more important than the absolute measure of any one alone. Other hybridization conditions which may be controlled include buffer type and concentration, solution pH, presence and concentration of blocking reagents to decrease background binding such as repeat sequences or blocking protein solutions, detergent type(s) and concentrations, molecules such as polymers which increase the relative concentration of the polynucleotides, metal ion(s) and their concentration(s), chelator(s) and their concentrations, and other conditions known in the art.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A polymer represented by the following formula:

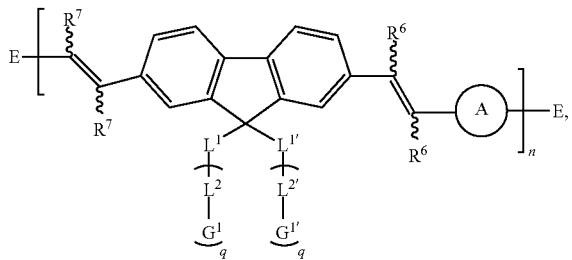

wherein:
E, for each occurrence, is independently ethynyl, —$N_3$, a trialkylsiloxy or an aryl group optionally substituted with a reactive group or a pendent reactive group capable of undergoing chain extension, conjugation, or crosslinking;

A is an aryl or a heteroaryl, optionally substituted with one or more substituents selected from halogen, hydroxyl, C1-C12 alkyl, C2-C12 alkene, C2-C12 alkyne, C3-C12 cycloalkyl, C1-C12 haloalkyl, C1-C12 alkoxy, C6-C18 (hetero)aryloxy, C6-C18 (hetero)arylamino, a C6-C18 (hetero)aryl group and an ethylene glycol polymer; wherein the substituents for ring A are not ammonium group;

$L^1$, $L^{1'}$, $L^2$ and $L^{2'}$ are each independently a covalent bond, a C1-C12 alkylene, a C3-C12 cycloalkylene, a C2-C12 alkenylene, a C2-C12 alkynylene, a (C6-C18)aryl(C1-C12)alkylene, a (C6-C18)aryl(C2-C12)alkenylene, a (C6-C18)aryl(C1-C12)alkynylene, a C6-C18 arylene group, —$Y_1$-[O—$Y_2$]$_p$—, —O—$Y_1$-[O—$Y_2$]$_p$— wherein each C1-C12 alkylene, C3-C12 cycloalkylene, (C6-C18)aryl(C1-C12)alkylene, or C6-C18 arylene group is optionally substituted with one or more halogen, hydroxyl, C1-C12 alkyl, C2-C12 alkenyl, C2-C12 alkynyl group, C1-C12 alkoxy, C1-C12 haloalkyl, —$Y_1$-[O—$Y_2$]$_p$— or —O—$Y_1$—[O—$Y_2$]$_p$—;

q is 0 or an integer from 1 to 8;
p is 0 or an integer from 1 to 24;
$Y_1$ and $Y_2$ are each independently a covalent bond, or a C1-12 alkylene group, a C3-C12 cycloalkylene, a C6-C18 (hetero)arylene, a (C6-C18)aryl(C1-C12)alkylene, wherein each C1-12 alkylene group, C3-C12 cycloalkylene, C6-C18 (hetero)arylene, (C6-C18)aryl(C1-C12)alkylene is optionally substituted with one or more halogen, hydroxyl, C1-C12 alkyl, C2-C12 alkenyl, C2-C12 alkynyl group, C1-C12 alkoxy, or C1-C12 haloalkyl;

each $R^6$ and $R^7$ is independently hydrogen, C1-C12 alkyl, C2-C12 alkene, C2-C12 alkyne, C3-C12 cycloalkyl or a C6-C18 (hetero)aryl group, wherein each C1-C12 alkyl, C2-C12 alkene, C2-C12 alkyne, C3-C12 cycloalkyl or C6-C18 (hetero)aryl group is optionally substituted with one or more halogen, hydroxyl, C1-C12 alkyl, C2-C12 alkenyl, C2-C12 alkynyl group, C1-C12 alkoxy, C1-C12 haloalkyl, cyano, or C2-C12 (hetero)alkynl;

$G^1$ and $G^{1'}$ are each independently, ethynyl, —$N_3$, hydrogen, C1-C6 alkyl, —OH, —OR, —COOH, —SH, —SR, —$SHR^+$, $SR_2^+$, —$SO_3^-$, —$PO_4^-$, Br, —$NH_2$, —NHR, —$NR_2$, —$NH_3^+$, —$NH_2R^+$, —$NHR_2^+$ or —$NR_3^+$, wherein each R is independently a C1-C6 alkyl and —$SHR^+$, $SR_2^+$, —$SO_3^-$, —$PO_4^-$, —$NH_3^+$, —$NH_2R^+$, —$NHR_2^+$ or —$NR_3^+$ each optionally has an associated counterion; and n is an integer from 1 to about 1,000.

2. The polymer of claim 1, comprising a repeat unit represented by the following formula:

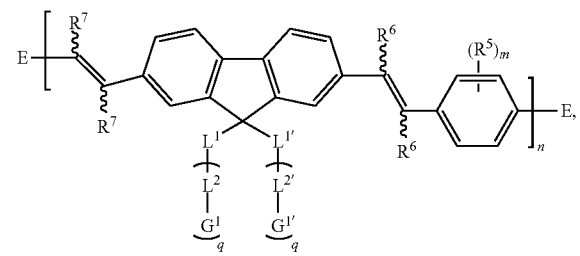

wherein:

each $R^5$ is independently a halogen, hydroxyl, C1-C12 alkyl, C2-C12 alkene, C2-C12 alkyne, C3-C12 cycloalkyl, C1-C12 haloalkyl, C1-C12 alkoxy, C6-C18 (hetero)aryloxy, C6-C18 (hetero)arylamino or a C6-C18 (hetero)aryl group, and wherein each C1-C12 alkyl, C2-C12 alkene, C2-C12 alkyne, C3-C12 cycloalkyl, C1-C12 haloalkyl, C1-C12 alkoxy, C6-C18 (hetero)aryloxy, C6-C18 (hetero)arylamino or a C6-C18 (hetero)aryl group is further optionally substituted with one or more one or more halogen, hydroxyl, C1-C12 alkyl, C2-C12 alkenyl, C2-C12 alkynyl group, C1-C12 alkoxy, or C1-C12 haloalkyl group; and m is 0 or an integer from 1 to 4.

3. The polymer of claim 2, wherein $G^1$ and $G^{1'}$, are each independently, —SHR⁺, SR₂⁺, —NH₃⁺, —NH₂R⁺, —NHR₂⁺ or —NR₃⁺ with an associated counterion.

4. The polymer of claim 3, wherein each $R^6$ and each $R^7$ is hydrogen.

5. The polymer of claim 4, wherein each $R^5$ is hydrogen.

6. The polymer of claim 3, wherein $L^1$ and $L^{1'}$, are each independently, a C1-C12 alkylene or —Y₁-[O—Y₂]ₚ—.

7. The polymer of claim 6, wherein $L^1$ and $L^{1'}$, are each independently —Y₁-[O—Y₂]ₚ—, and $Y_1$ and $Y_2$ are each independently, a C1-C12 alkylene.

8. The polymer of claim 6, wherein $L^1$ and $L^{1'}$, are each independently a C1-C12 alkylene.

9. The polymer of claim 8, wherein $G^1$ and $G^{1'}$, are each independently —NH₃⁺, —NH₂R⁺, —NHR₂⁺ or —NR₃⁺.

10. The polymer of claim 1, comprising a repeat unit represented by the following formula:

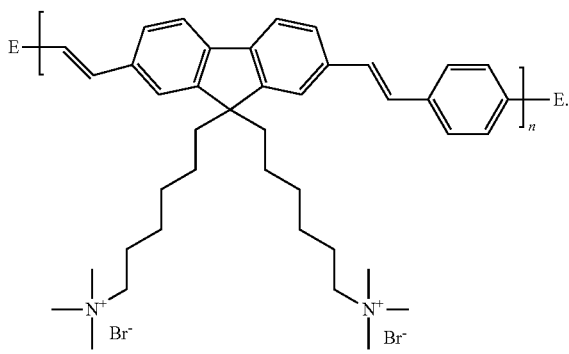

11. The polymer of claim 1, comprising a repeat unit represented by the following formula:

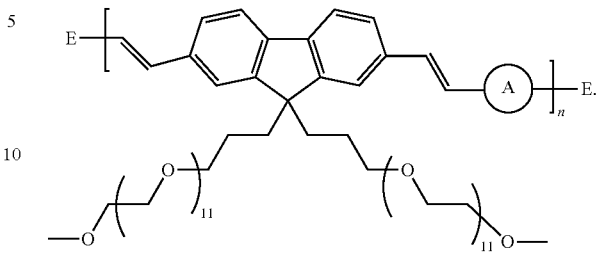

12. The polymer of claim 1, comprising a repeat unit represented by the following formula:

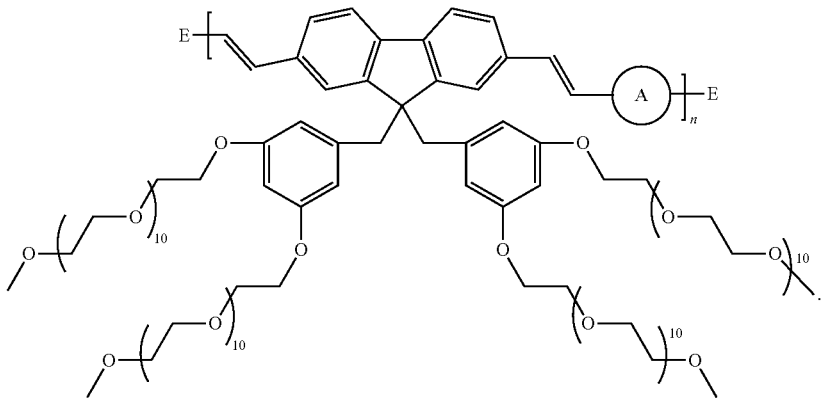

13. The polymer of claim 1, wherein E, for each occurrence, is independently represented by formula (VI):

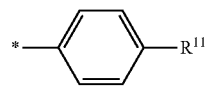

wherein $R^{11}$ is a halogen, hydroxyl, C1-C12 alkyl, C2-C12 alkene, C2-C12 alkyne, C3-C12 cycloalkyl, C1-C12 haloalkyl, C1-C12 alkoxy, C6-C18 (hetero)aryloxy, C6-C18 (hetero)arylamino, C6-C18 (hetero)aryl group —[O—CH₂—CH₂]ₜ—Z, or (C1-C12)alkoxy-X;

and wherein Z is —OH or —COOH;

X is —NH₂, —NHCOOH, —NHCOOC(CH₃)₃, —NHCO(C3-C12)cycloalkyl(C1-C4)alkyl-N-maleimide; or —NHCO[CH₂—CH₂—O]ₛNH₂;

t is an integer from 1 to 20; and s is an integer from 1 to 8.

14. The polymer of claim 1, wherein E, for each occurrence, is independently selected from the group consisting of a-h having the structure a
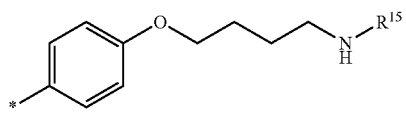
b
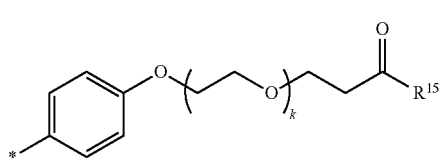
c
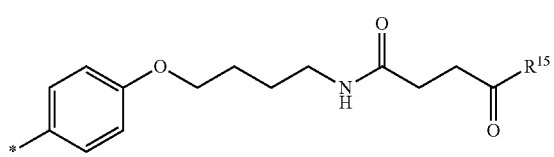
d
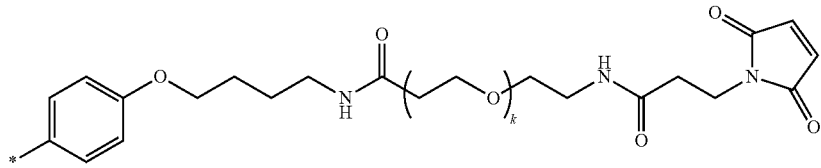
e
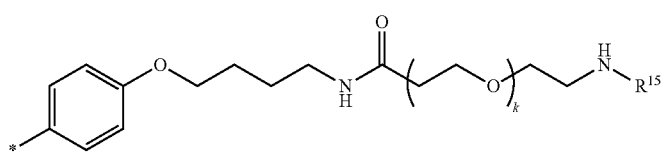
f
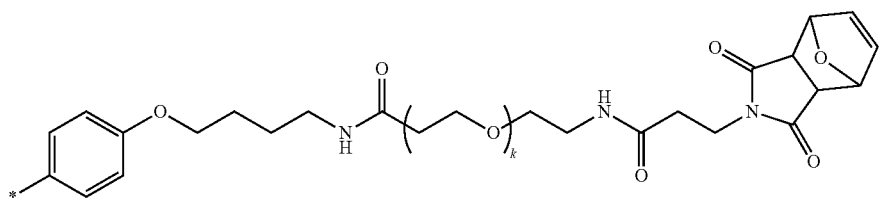
g
h
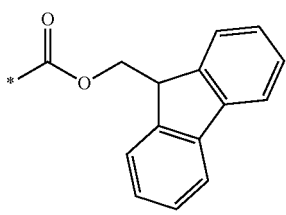
* = site for covalent attachment
wherein k=2, 4, 8, 12 or 24 and $R^{15}$ is selected from the group consisting of 1-t having the structure
l
*—OH
m
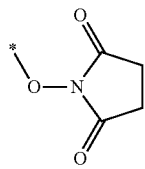
n
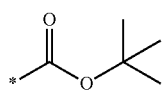
-continued
o
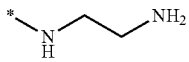
p
*—NH—CH₂CH₂—NH₂
q
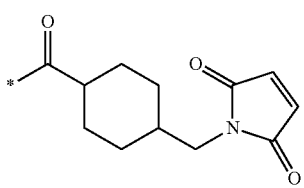

-continued

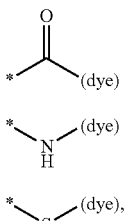

wherein (dye) is an organic dye with covalent linker.

15. A method of preparing a polymer represented by formula (I), comprising reacting a compound of formula (II)

Br—(A)—Br    (II), with a compound of formula (III)

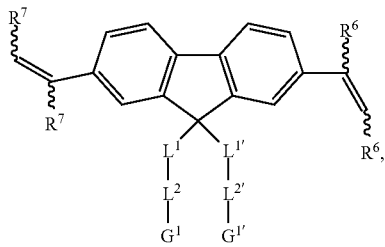

thereby producing a polymer represented by the following formula:

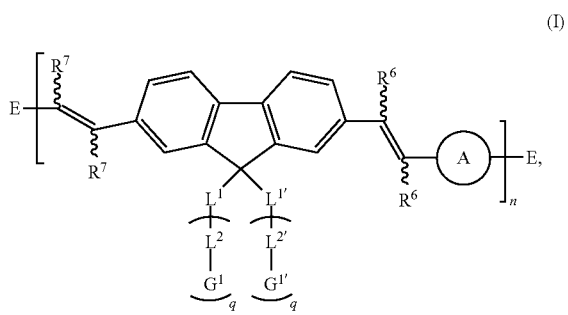

wherein:
E, for each occurrence, is independently halogen, hydrogen, vinylene group, a trialkylsiloxy or an aryl group optionally substituted with a reactive group or a pendent reactive group capable of undergoing chain extension, conjugation, or crosslinking;
A is an aryl or a heteroaryl, optionally substituted with one or more substituents selected from halogen, hydroxyl, C1-C12 alkyl, C2-C12 alkene, C2-C12 alkyne, C3-C12 cycloalkyl, C1-C12 haloalkyl, C1-C12 alkoxy, C6-C18 (hetero)aryloxy, C6-C18 (hetero)arylamino, a C6-C18 (hetero)aryl group and an ethylene glycol polymer; wherein the substituents for ring A are not ammonium group;
$L^1$, $L^{1'}$, $L^2$ and $L^{2'}$ are each independently a covalent bond, a C1-C12 alkylene, a C3-C12 cycloalkylene, a C2-C12 alkenylene, a C2-C12 alkynylene, a (C6-C18)aryl(C1-C12)alkylene, a (C6-C18)aryl(C2-C12)alkenylene, a (C6-C18)aryl(C1-C12)alkynylene, a C6-C18 arylene group, $-Y_1-[O-Y_2]_p-$, $-O-Y_1-[O-Y_2]_p-$ wherein each C1-C12 alkylene, C3-C12 cycloalkylene, (C6-C18)aryl(C1-C12)alkylene, or C6-C18 arylene group is optionally substituted with one or more halogen, hydroxyl, C1-C12 alkyl, C2-C12 alkenyl, C2-C12 alkynyl group, C1-C12 alkoxy, C1-C12 haloalkyl, $-Y_1-[O-Y_2]_p-$ or $-O-Y_1-[O-Y_2]_p-$;
q is 0 or an integer from 1 to 8;
p is 0 or an integer from 1 to 24;
$Y_1$ and $Y_2$ are each independently a covalent bond, or a C1-12 alkylene group, a C3-C12 cycloalkylene, a C6-C18 (hetero)arylene, a (C6-C18)aryl(C1-C12)alkylene, wherein each C1-12 alkylene group, a C3-C12 cycloalkylene, a C6-C18 (hetero)arylene, a (C6-C18)aryl(C1-C12)alkylene is optionally substituted with one or more halogen, hydroxyl, C1-C12 alkyl, C2-C12 alkenyl, C2-C12 alkynyl group, C1-C12 alkoxy, or C1-C12 haloalkyl;
each $R^6$ and $R^7$ is independently hydrogen, C1-C12 alkyl, C2-C12 alkene, C2-C12 alkyne, C3-C12 cycloalkyl or a C6-C18 (hetero)aryl group, wherein each C1-C12 alkyl, C2-C12 alkene, C2-C12 alkyne, C3-C12 cycloalkyl or a C6-C18 (hetero)aryl group is optionally substituted with one or more halogen, hydroxyl, C1-C12 alkyl, C2-C12 alkenyl, C2-C12 alkynyl group, C1-C12 alkoxy, C1-C12 haloalkyl, cyano, or C2-C12 (hetero)alkynl;
$G^1$ and $G^{1'}$ are each independently, hydrogen, C1-C6 alkyl, —OH, —COOH, —SH, —SR, —SHR$^+$, SR$_2^+$, —SO$_3^-$, —PO$_4^-$, Br, —NH$_2$, —NHR, —NR$_2$, —NH$_3^+$, —NH$_2$R$^+$, —NHR$_2^+$ or —NR$_3^+$, wherein and each R is independently a C1-C6 alkyl and —SHR$^+$, SR$_2^+$, —SO$_3^-$, —PO$_4^-$, —NH$_3^+$, —NH$_2$R$^+$, —NHR$_2^+$ or —NR$_3^+$ each optionally has an associated counterion; and
n is an integer from 1 to about 1,000.

16. The method of claim 15, wherein:
the compound of formula (II) is represented by the following formula

the compound of formula (III) is represented by the following formula

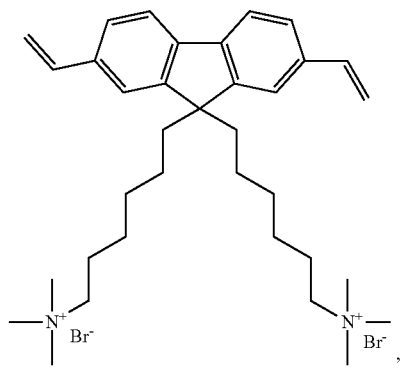

and the polymer of formula (I) comprises a repeat unit represented by the following formula

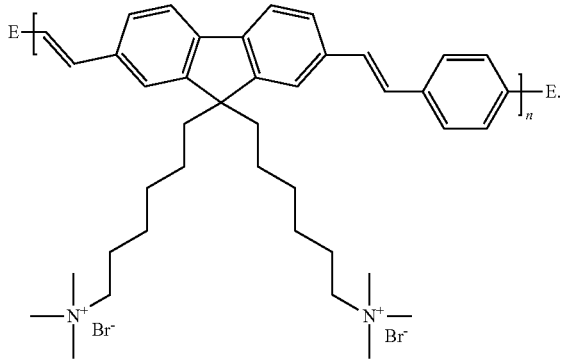

17. The method of claim 15, wherein E, for each occurrence, is independently represented by formula (VI):

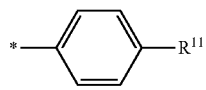

wherein $R^{11}$ is a hydrogen, halogen, hydroxyl, C1-C12 alkyl, C2-C12 alkene, C2-C12 alkyne, C3-C12 cyclo alkyl, C1-C12 halo alkyl, C1-C12 alkoxy, C6-C18 (hetero)aryloxy, C6-C18 (hetero)arylamino, C6-C18 (hetero)aryl group, [O—CH$_2$—CH$_2$]$_q$—Z, or (C1-C12) alkoxy-X;

and wherein Z is —OH or —COOH; X is —NH$_2$, —NH-COOH, —NHCOOC(CH$_3$)$_3$, —NHCO(C3-C12)cycloalkyl (C1-C4)alkyl-N-maleimide; or —NHCO[CH$_2$—CH$_2$—O]$_k$NH$_2$; q is an integer from 1 to 20; and k is an integer from 1 to 8.

18. The method of claim 15, wherein E, for each occurrence, is independently selected from the group consisting of a-k having the structure

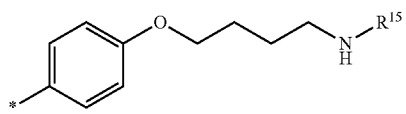

a

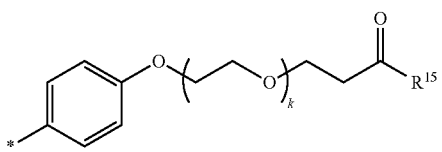

b

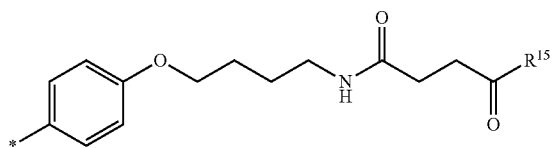

c

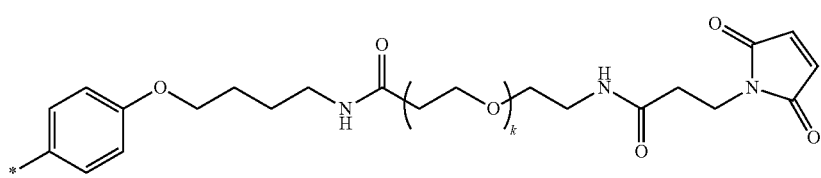

d

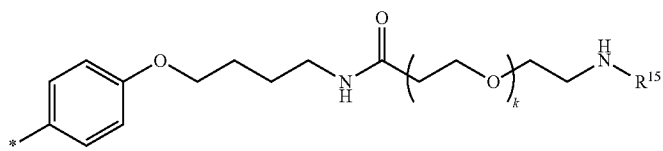

e

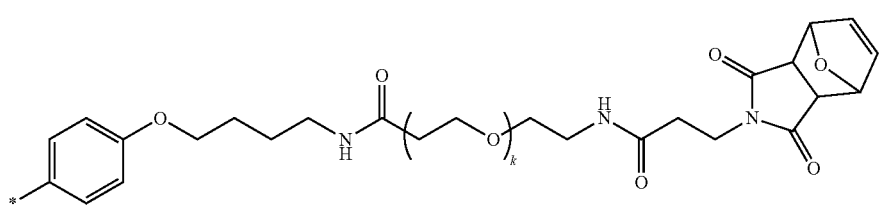

f

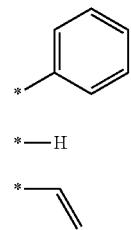

g

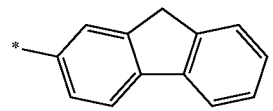

h

*—H   i

*—Br, *—I, or *—Cl   j

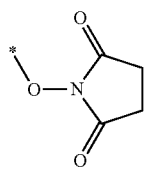

k

* = site for covalent attachment wherein k=2,4,8,12 or 24 and $R^{15}$ is selected from the group consisting of 1-t having the structure

*—OH   l

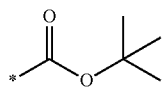   m

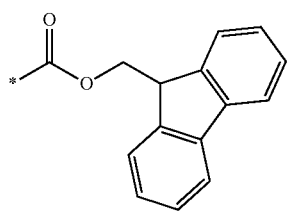   n

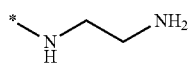   o

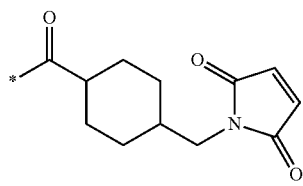   p

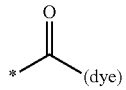   q (dye)   r

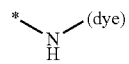   s

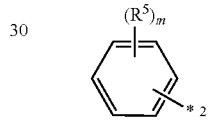   t

* = covalent attachment where (dye) is an organic dye with covalent linker.

19. The polymer of claim 1, wherein A, for each occurrence, is independently represented by:

wherein each $R^5$ is independently a hydrogen, halogen, hydroxyl, C1-C12 alkyl, C2-C12 alkene, C2-C12 alkyne, C3-C12 cycloalkyl, C1-C12 haloalkyl, C1-C12 alkoxy, C6-C18 (hetero)aryloxy, C6-C18 (hetero)arylamino, C6-C18 (hetero)aryl group, —[O—CH$_2$—CH$_2$]$_t$—Z, or (C1-C12)alkoxy-X;
and wherein
Z is —OH or —COOH;
X is —NH$_2$, —NHCOOH, —NHCOOC(CH$_3$)$_3$, —NHCO(C3-C12)cycloalkyl(C1-C4)alkyl-N-maleimide; or —NHCO[CH$_2$—CH$_2$—O]$_s$NH$_2$;
t is an integer from 1 to 20;
s is an integer from 1 to 8;
m is 0 or an integer from 1 to 4; and
*=site for covalent attachment to unsaturated backbone.

20. The polymer of claim 1, wherein the polymer is further covalently attached to a dye, antibody, nucleic acid, substrate or biomolecule or combination thereof.

21. The polymer of claim 1, wherein E, for each occurrence, is independently an aryl group optionally substituted with a reactive group or a pendent reactive group capable of undergoing chain extension, conjugation, or crosslinking.

* * * * *